US011855364B2

(12) United States Patent
Lilja

(10) Patent No.: US 11,855,364 B2
(45) Date of Patent: Dec. 26, 2023

(54) MICROWAVE TRANSFORMER AND A SYSTEM FOR FABRICATING THE SAME

(71) Applicant: StealthCase Oy, Tampere (FI)

(72) Inventor: Juha Lilja, Tampere (FI)

(73) Assignee: StealthCase Oy, Tampere (FI)

(*) Notice: Subject to any disclaimer, the term of this patent is extended or adjusted under 35 U.S.C. 154(b) by 274 days.

(21) Appl. No.: 17/605,492

(22) PCT Filed: Mar. 16, 2020

(86) PCT No.: PCT/FI2020/050163
§ 371 (c)(1),
(2) Date: Oct. 21, 2021

(87) PCT Pub. No.: WO2020/221955
PCT Pub. Date: Nov. 5, 2020

(65) Prior Publication Data
US 2022/0209410 A1    Jun. 30, 2022

(30) Foreign Application Priority Data
Apr. 29, 2019  (FI) ..................................... 20195349

(51) Int. Cl.
*H01Q 7/00* (2006.01)
*H01Q 1/22* (2006.01)
(Continued)

(52) U.S. Cl.
CPC ................ *H01Q 7/00* (2013.01); *H01Q 1/22* (2013.01); *H01Q 1/00* (2013.01); *H01Q 13/10* (2013.01);
(Continued)

(58) Field of Classification Search
CPC ............ H01Q 7/00; H01Q 1/22; H01Q 13/10; H01Q 1/00; H01Q 13/103; H01Q 15/013
See application file for complete search history.

(56) References Cited

U.S. PATENT DOCUMENTS

2004/0107641 A1   6/2004   Walton et al.
2011/0279335 A1   11/2011  Degen et al.
(Continued)

FOREIGN PATENT DOCUMENTS

WO   WO-8806343 A  *  8/1988  .............. H01P 5/10
WO   2019073116 A2   4/2019

OTHER PUBLICATIONS

Burnier L. et al. "Energy saving glazing with a wide band-pass FSS allowing mobile communication: up-scaling and characterisation" In: IET Microwaves, Antennas & Propagation Aug. 3, 2017, vol. 11, No. 10, DOI: 10.1049/iet-map.2016.0685, E-First on Jul. 17, 2017, 8 pages.

(Continued)

*Primary Examiner* — Joseph J Lauture
(74) *Attorney, Agent, or Firm* — ZIEGLER IP LAW GROUP LLC

(57) ABSTRACT

A conductive layer includes a microwave transformer for scaling the intensity of a microwave signal of a first frequency by a scaling factor. The transformer includes a first physical area delimited with a closed curve on the conductive layer for receiving the microwave signal from a first space angle and re-emitting a ray of the microwave signal to a second space angle. A ratio of the first physical area to the second physical area is smaller than 0.5. The ratio of the first effective area to the first physical area is larger than the ratio of the second effective area to the second physical area. The scaling factor is the ratio of the maximal intensity of the re-emitted ray and the intensity of a ray through an open aperture having a physical area equivalent to the second physical area in the same direction than the re-emitted ray.

20 Claims, 22 Drawing Sheets

(51) Int. Cl.
　　　*H01Q 13/10*　　　(2006.01)
　　　*H01Q 1/00*　　　(2006.01)
　　　*H01Q 15/00*　　　(2006.01)
(52) U.S. Cl.
　　　CPC ....... *H01Q 13/103* (2013.01); *H01Q 15/0013* (2013.01)

(56) References Cited

U.S. PATENT DOCUMENTS

2016/0043473  A1　　2/2016　Walker
2017/0250456  A1　　8/2017　Dai et al.

OTHER PUBLICATIONS

International Search Report, Finnish Patent and Registration Office, Application No. PCT/FI2020/050163, dated Sep. 21, 2020, 5 pages.

\* cited by examiner

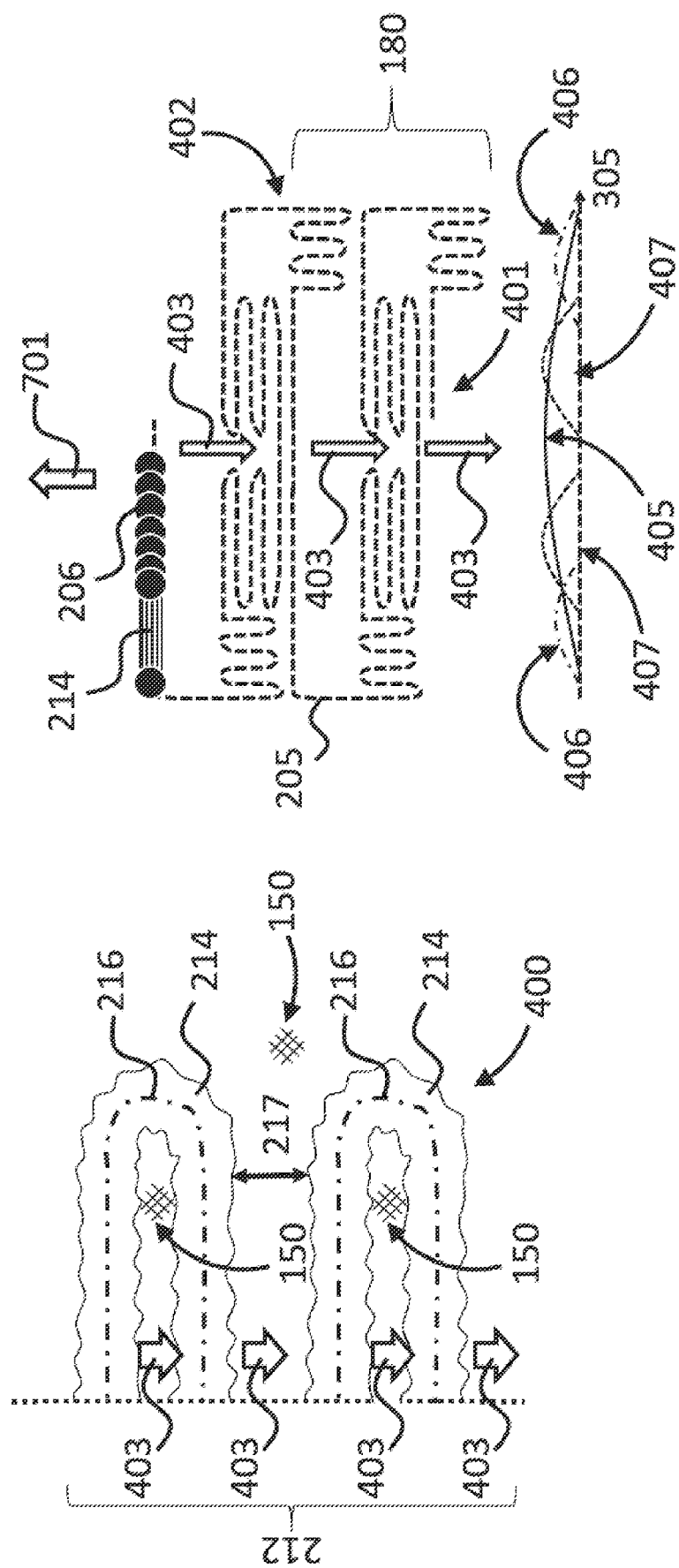

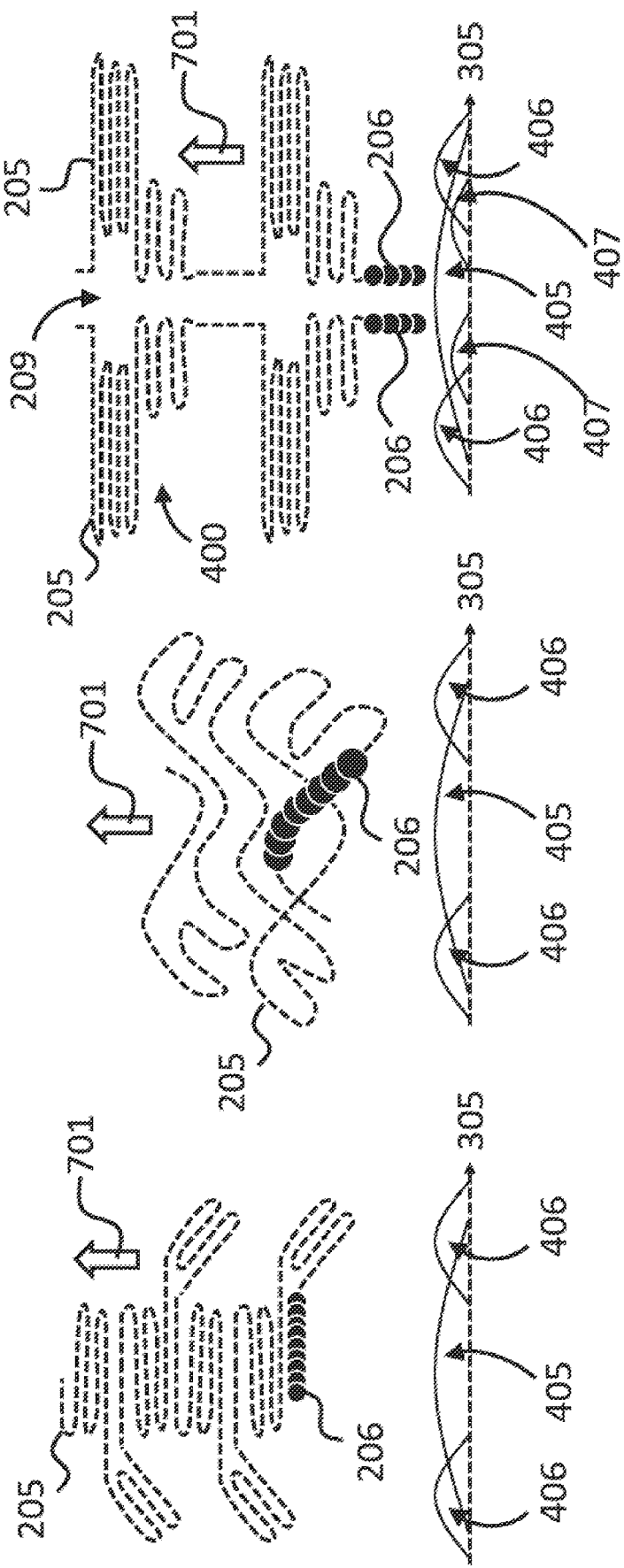

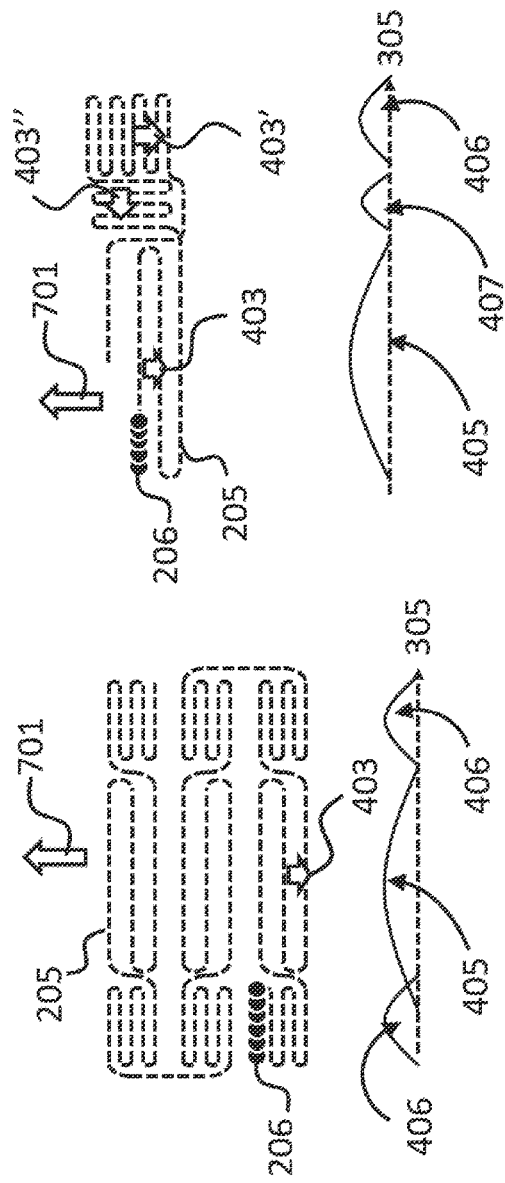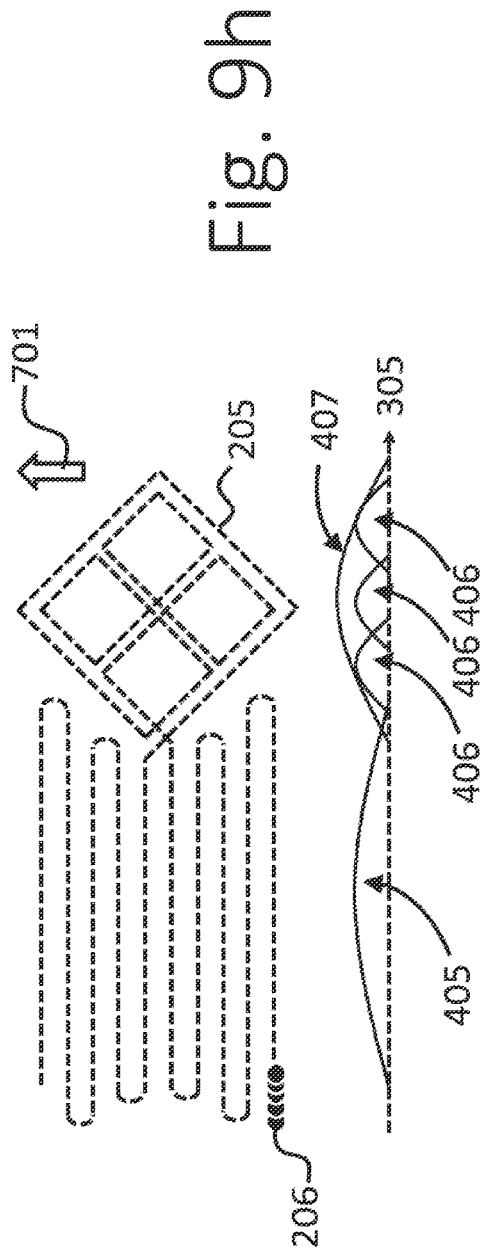

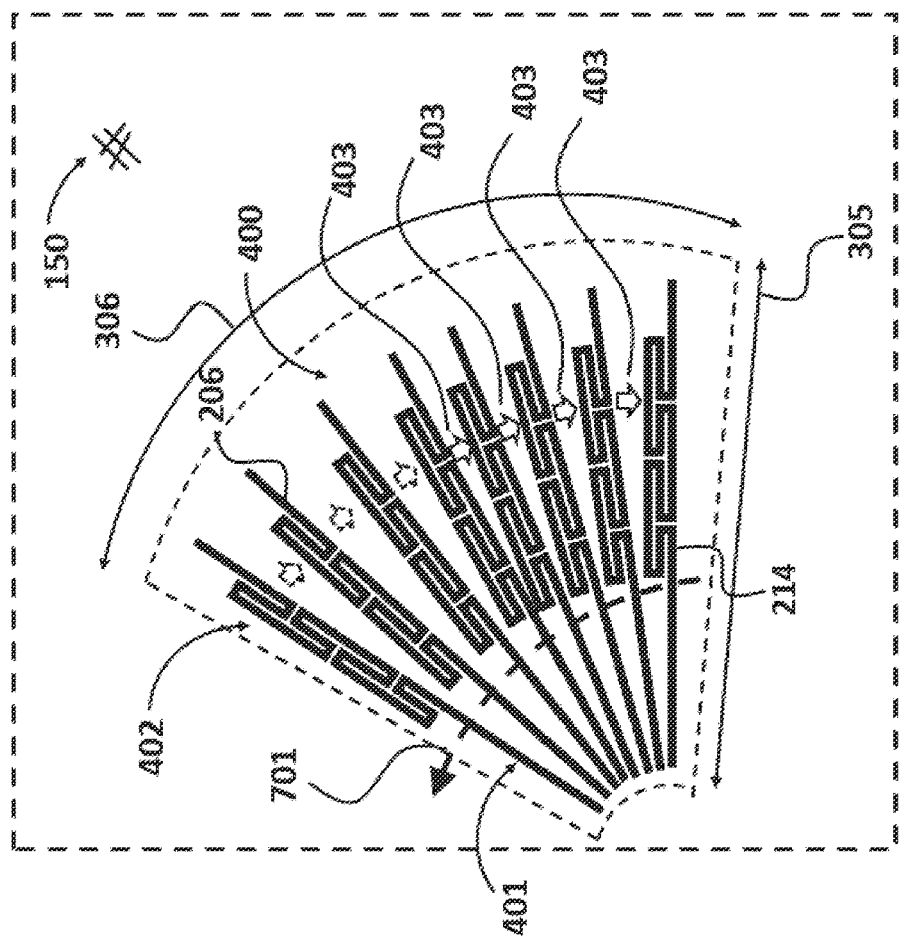
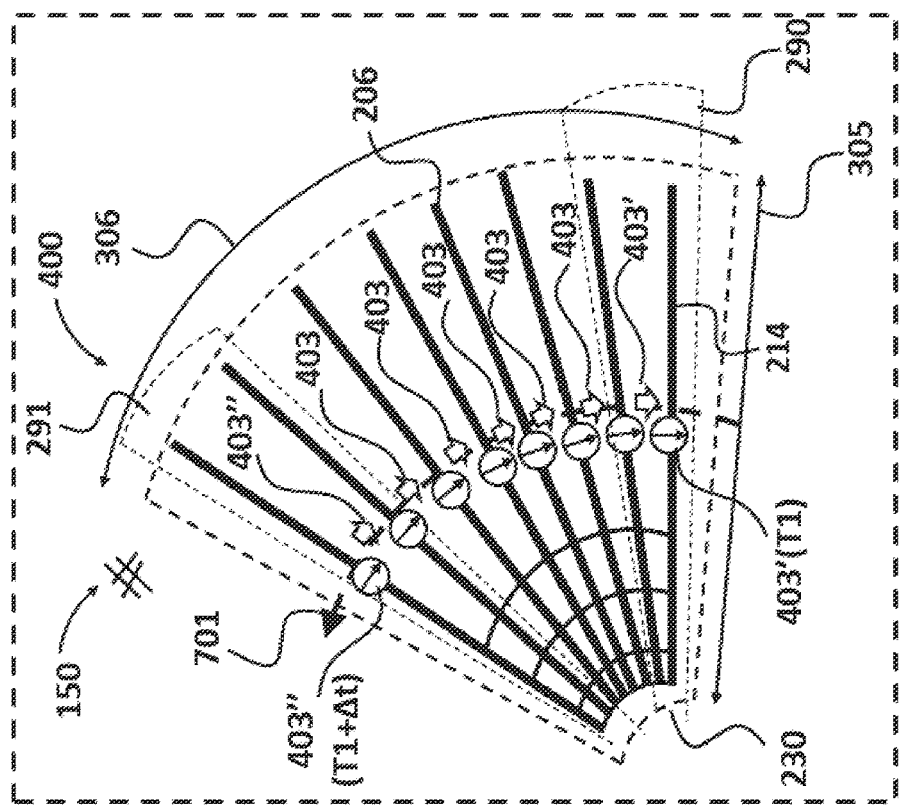
Fig. 12b
Fig. 12a

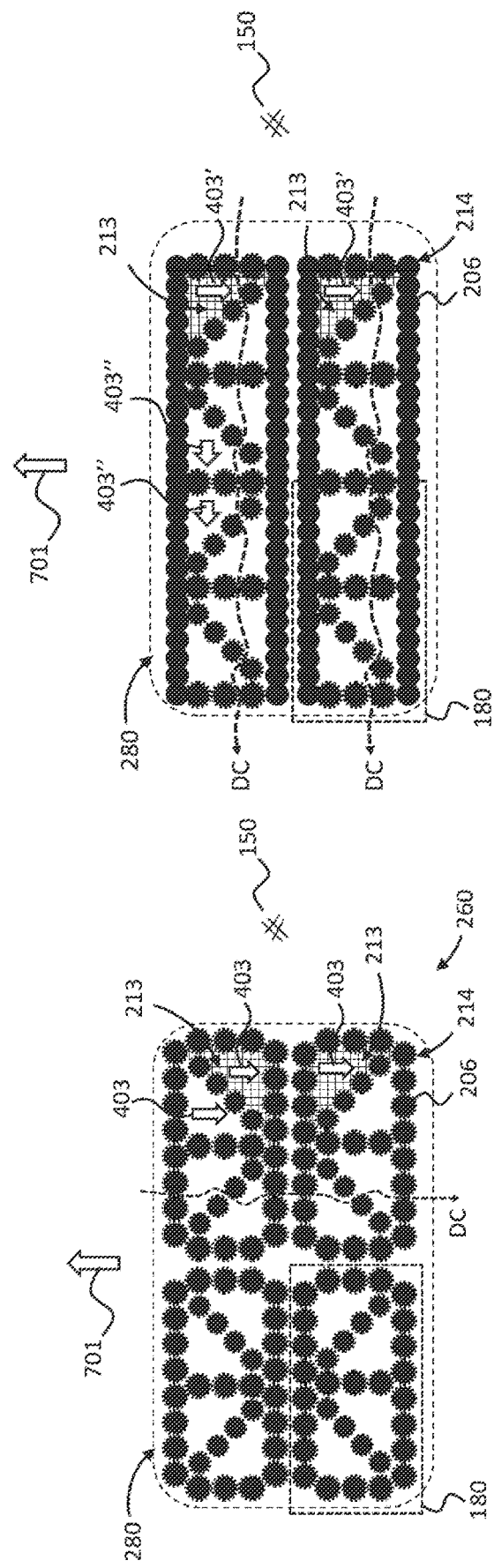

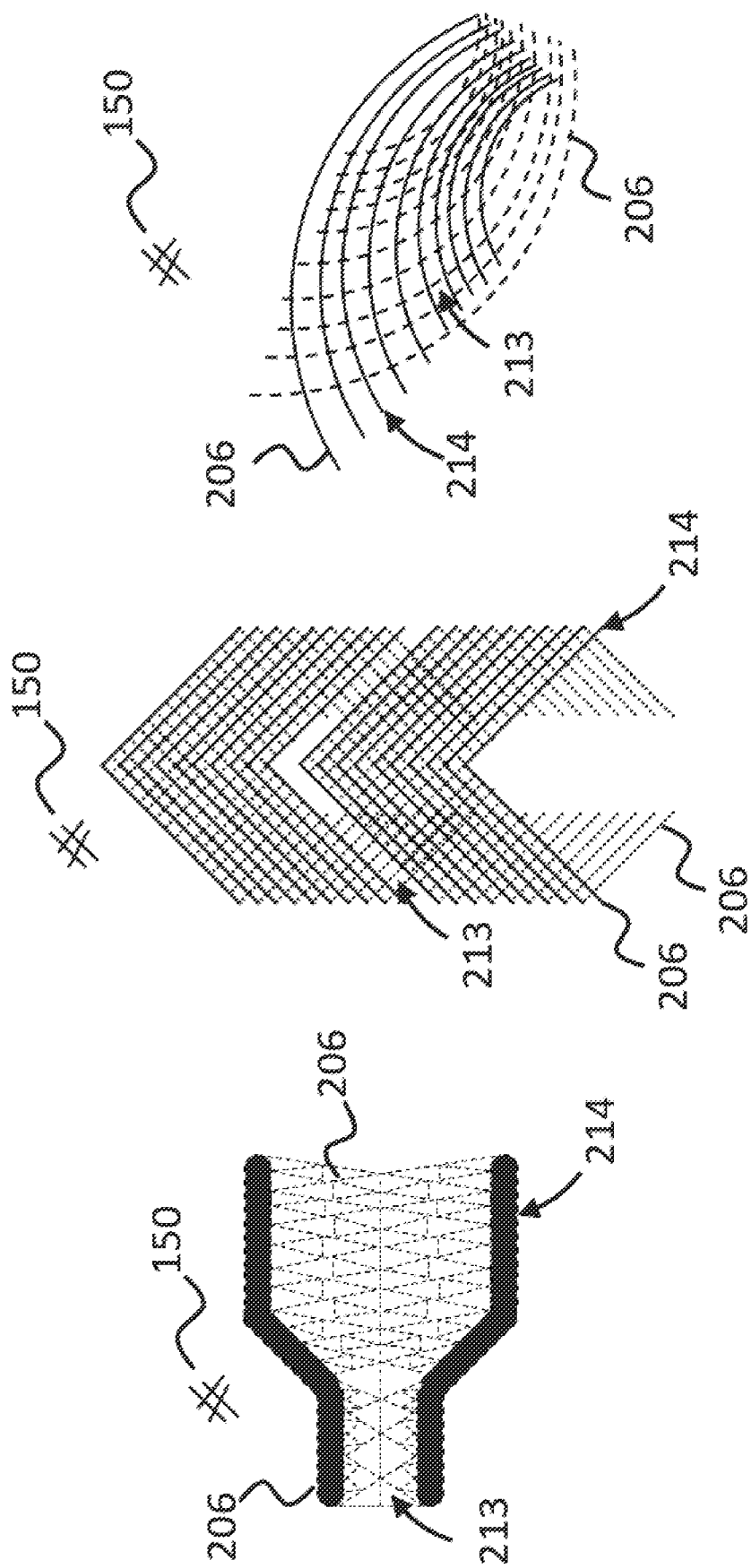

MICROWAVE TRANSFORMER AND A SYSTEM FOR FABRICATING THE SAME

TECHNICAL FIELD

The aspects of the disclosed embodiments relate to a conductive layer comprising a microwave transformer, to a method of manufacturing said conductive layer, and to a system for fabricating said conductive layer.

More specifically, the aspects of the disclosed embodiments relate to a conductive layer comprising a microwave transformer for scaling the intensity of a microwave signal of a first frequency by a scaling factor, said transformer comprising a first physical area delimited with a closed curve on the conductive layer for receiving said microwave signal from a first space angle and re-emitting a ray of said microwave signal to a second space angle.

BACKGROUND INFORMATION

Document WO2019073116A2 (StealthCase Oy) represents the current state of the art, comprising a building material being adapted for narrow aperture diffraction using, e.g. a conductive layer.

BRIEF SUMMARY

It is an aim of the present disclosure to provide a conductive layer with enhanced characteristics over the document above.

There are embodiments which aim to solve the technical problems that arise when a conductive layer is aimed to be fabricated as a signal permeable device in mass production. A first technical problem that arises is the required fabrication time. Effective solutions of the prior art have a cost in fabrication time, which makes them less suitable for cost efficient mass production. In an aim to reduce the required fabrication time, the first approach is to reduce the size of the processing area. This, on the other hand, causes two problems. The first being a reduced amount of power that can be delivered through the layer, and the second being that in a compact space, the openings in the coating don't work effectively at multiple frequency ranges anymore due to the fact that openings of different frequency ranges disturb the performance of openings of other frequency ranges when those are packed too tightly. A fourth issue that arises from tight packing of openings in the coating is that they become more visible to a human eye.

Some embodiments aim to solve the abovementioned issues with a conductive layer comprising a microwave transformer. The conductive layer according to the present disclosure addresses the problems of production speed, effective power delivery through a spatially limited aperture with a solution that is aimed to deliver multiple frequency ranges and with an advanced way to re-emit said power to reach good coverage behind the layer. Furthermore, the embodiments of the present disclosure provide a solution that is fast to manufacture in mass production and can also be applied to retrofit solutions. And in an additional embodiment, the present disclosure provides embodiments that further enhance the fabrication speed and reduce the visibility with a use of a DC-coupled low-pass filter as a laser ablated opening. The solution that can be applied to multiple frequency ranges, can also be applied to solutions of crossing polarizations.

It is an aim of the present disclosure to provide conductive layer that is arranged to enhance wireless connectivity to a space behind said layer by means of re-emitting wireless signals through said layer in an advanced way.

The aspects of the disclosed embodiments relate to a device that enhances the connectivity through a highly attenuating medium, such as a building element comprising e.g. a coated thermally effective glass pane of a window element or a highly insulated panel comprising metal coatings. In other embodiments, the present disclosure may be used to improve the connectivity through metallic doors in, e.g. electrical cabinets having wireless devices comprised thereof.

In one aspect, the present disclosure may be adapted to provide more effective transmission through a limited area at multiple frequency ranges while maintaining a broad spatial coverage of the device with a proper arrangement of microwave resonators as well as proper scaling of the re-emitted signal. In another aspect, the present disclosure is adapted to provide enhanced connectivity through said conductive layer by means of providing enhanced diversity characteristics for the re-emitted signal or signals. Said diversity characteristics may also be applied to carrier aggregated signals of a wireless communication system. In an embodiment, said signals comprising a signal of a first frequency and an aggregated component of a signal of a second frequency, and said first and second frequencies being configurable by two inter-band carriers of a wireless communication system.

In an embodiment, said diversity characteristics being provided with proper scaling of the re-emitted signal by means of translating a linear polarization component of said signal into two crossing polarization components with a phase delay, and forming a circularly polarized signal from said linear polarization. In an advanced embodiment, said device may be adapted to scale two crossing and linear polarizations of received signals into two oppositely rotating circularly polarized components of re-emitted signals while maintaining the isolation of the two received linearly polarized signals by means of a rotational transformation of microwave resonators.

In another aspect, there is provided a system being adapted to fabricate the conductive layer according to the present disclosure.

In another aspect, the system is adapted to fabricate the conductive layer of the present disclosure as insulation glass units.

In another aspect, the system is adapted to fabricate the conductive layer of the present disclosure in jumbo glasses.

In another aspect, the system is adapted to fabricate the conductive layer of the present disclosure by means of a retrofitting device.

In another aspect, the retrofitting device is adapted to fabricate the conductive layer of the present disclosure as retrofitted resonators on glasses of trains.

In another aspect, the system comprises a railway depot.

In an aim to provide, e.g. building architects, with means to design building facades with certain measurable level of radio signal permeability, there is a clear lack in the industry to provide architects with such means. Because the solutions of the prior art lack these means, the primary approach to provide working solutions has been to maximize the surface area of the conductive layer that is being treated e.g. with a laser. By arranging these dependencies according to the embodiments of the present disclosure, a solution with the enhanced properties as described above can be reached.

The motivation behind this work has been to raise the state of the art in the industry by providing a conductive layer that may be arranged to reach a level that reaches a measurable performance level that equals an equivalent open aperture in a wall. It will be shown in this specification that the prior art fails to specify products that are equal to a given sized hole in a wall, primarily due to the fact that the measurable signal permeability value according to the prior art is a combination of material loss and geometry of the structure.

Some embodiments of the present disclosure comprise a conductive layer wherein both the geometry of the device and the associated losses are arranged to reach a signal permeability value that is comparable with an equivalent hole in the wall, and at the same time to provide an enhanced coverage efficiency compared to the solutions of the prior art. Moreover, an advantage of the present disclosure is that it may be arranged to increase the production speed in mass production in accordance with advantageous embodiments.

In order to enhance the connectivity through a highly attenuating medium, such as a building element comprising e.g. a coated thermally effective glass pane of a window element or a highly insulated panel comprising metal coatings, both the amount of total power that is delivered through said medium, and the directivity of the building element need to be considered. The connectivity performance through said attenuating medium is a combination of material/reflection losses and the directivity due to the geometry of the permeable structure.

Prior art, e.g. different Frequency Selective Surfaces (FSS) have been concentrating on providing a maximal transmission coefficient in the maximum gain direction, wherein said transmission coefficient is typically determined for a directly penetrated wave, and the effects of field scattering on the horizontal coverage efficiency have been typically ignored. A large glass pane having FSS patterns on its coating becomes highly directive as it will be shown in this specification. The transmission coefficient of a glass pane having FSS structures can be determined in an anechoic chamber using two antennas, one on each side of the pane to be tested, and these antennas are aligned for Line of Sight (LoS) position with respect to each other. The transmission coefficient through a tested pane may then be measured using a Vector Network Analyzer (VNA) to determine the scattering parameters (such as "S21") for said pane. An alternative method for similar characterization is using a signal generator and a spectrum analyser. However, the results provided by this test setup is always a product of both the transmittance (loss) of the pane and the directivity of the pane and using the above test method the effects of these two factors cannot be distinguished. In other words, the above method measures only the gain of the pane in its expected maximum direction and doesn't characterize the pane thoroughly.

The above limitation applies for typical computational methods for designing FSS structures by using periodic boundaries in full wave simulation tools, where a plane wave illumination and plane wave transmission is typically forced by said boundary conditions.

Performance coatings in glass panes may come with variety of conductivities. Typical surface resistance values for coated glasses are in the range of few ohms per square. Furthermore, different electrochromic layers may provide conductivity values significantly differing from the above. What is common for said performance coatings is that the amount of conductor loss may become significant, and the behaviour of said coatings may differ from layers of good conductivity such as copper layers. Reduced conductivity may detune antennas when identical antenna geometries being implemented first on layers of good conductivity and then on layers of reduced conductivity. Furthermore, the effect of loss may become significant when aiming to maximize signal penetration through a conductive layer.

It is shown in this specification that a conductive layer having a region, where said region being arranged for diffractive bistatic scattering may provide more microwave energy through the conductive layer than a traditional FSS panel having larger value for the transmission coefficient when determined using methods similar to ones described above. It is shown that if the Total Radiated Power (TRP) through the conductive layer is not determined, e.g. integrating the Poynting vector in the full hemisphere behind the panel, the performance or efficiency of a given structure cannot be unambiguously determined, and the performance enhancement provided by the present disclosure remains unattained.

Therefore, it becomes evident that a person skilled in the art would not consider it obvious of providing a conductive layer with a region where said region being arranged for bistatic scattering that provides a scaled field intensity for a re-emitted ray, wherein said intensity being scaled with a scaling factor, and at the same time the total transmitted power through said layer being remained at high level by forcing the region for diffractive scattering by means of arranging the dimensions of said region and at the same time forcing the re-emitted microwave energy to expand widely with an enlarged horizontal coverage beam, and wherein said layer being adapted to compensate the effects of conductor loss in said conductive layer by providing said aperture with an aperture efficiency of larger than said scaling factor, or providing said aperture with larger efficiency than an equivalent square aperture.

On the Fabrication Speed

It is an aim of the present disclosure to provide a conductive layer comprising a microwave transformer in a form where the production speed of said conductive layer comprising said transformer can be raised to a level that reduces bottlenecks from a mass production line.

Traditionally, Frequency Selective Surfaces have been fabricated on glass panes by using a laser that is attached on a Computerized Numerical Control (CNC) table, where the pane is stationary, and the large glass surface is processed by providing a two-way movement for a laser scanning unit. The laser scanning unit is an arrangement to deflect the laser beam, provided by a laser source, and to provide a focal region. A typical scanning area for a laser scanning unit depends heavily on the laser configuration and processing parameters.

Given a first example, a glass pane having dimensions of 150×150 cm would be over 200 times a given scanning area of 10×10 cm, and over 900 times a given scanning area of 5×5 cm. It becomes clear that such processing approach is inefficient in mass production, and would make large bottlenecks in the mass production of, e.g. insulation glass units, where the insulation glass units may travel tens of meters per minute in the factory line along conveyors or the like. When a glass pane is required to remain stationary for processing needs of the order of a minute or even several minutes, production turnaround is significantly deteriorated, leading to large waiting times, reduced production efficiency, and increased unit costs. Moreover, manual placement of such glass units on the processing table further increase unit costs.

In a second example, if an exemplary scribing pattern of a well-known crosshatch FSS would be manufactured on a glass pane, and each scanning area would be processed one after another, said exemplary scanning areas could easily require tens of thousands of laser beam switch on/switch off—instants for the exemplary glass pane. It is obvious that given a time of tens of milliseconds for the laser beam to switch on and off, such processing approach would increase the waiting time of the order of minutes for a large glass pane.

In addition, when small tolerances are required, i.e. for a precise alignment of the start and endpoints of an ablated trace on a glass coating, the bottleneck for processing speed is pronounced. This is especially in the case if there is a requirement to deviate the position of the scanner with respect to the position of the glass pane.

Furthermore, another bottleneck for the position deviation speed of the scanner with respect to the position of the glass pane arises if the ablated structure on the coating of a glass pane is required to make multiple return loops, or considerable movement in the direction that opposes the processing direction, i.e. the direction where the position of the scanner with respect to the glass pane is increasing. In such cases the targeted coordinate point for ablation on the glass coating would drop off from the laser scanning area if the scanner would be re-positioned too fast. In practice, the ablated pattern on the coating may become heavily distorted if the mutual position between the scanner and the glass pane is deviated too fast, and the scanner is not able to remain synch with the glass pane coordinates. Both of the above-mentioned issues may arise when producing, for example, a plurality of nested and closed loops with high process speeds.

In addition to creating bottlenecks for high-speed mass production, another drawback of well-known FSS structures is that the efficiency of these is optimized by maximizing the ablated surface area on the glass pane. Said well-known crosshatch FSS is a traditional example, where the entire coating area is broken into thousands of isolated conductive segments, all being separated from each other galvanically. Said example sheet of 1.5×1.5 m may easily require 50 thousand isolated segments in order to provide high permeability for a wireless signal. Large ablated regions on conductive coatings create problems for both visual quality and production speed.

There is provided a method for fabricating a microwave transformer according to the present disclosure, wherein the transformer may be produced on-the-fly as a part of a mass production line. Furthermore, an embodiment of the method describes how the microwave transformer may be produced with a pulsed or continuous laser having the beam "always on", by which is meant that the transformer may be fabricated without using beam shutters or the like. Therefore, a significant enhancement in production speed and the simplicity of the required equipment may be provided.

Furthermore, in an aim to provide a conductive layer that is transparent to microwave signals, the fabrication speed of the solutions of the current state of the art have been compromised due to the requirement of scribing open lines on the coating with a laser. This document presents a novel solution forming the laser treated patterns as DC-coupled low-pass filters which, due to the smaller number of the required laser-treated spots in a given region, increases the production speed of the earlier solutions. Furthermore, an additional benefit of using the DC-coupled low-pass filters as a part of the openings of the conductive surface is that the visibility of a given line in a conductive layer can be reduced when a solid line is turned into said DC-coupled low-pass filter. Also, the DC-coupled low-pass filter opens a cost-efficient approach to apply bias voltages for any additional electronics components being attached to the conductive layer to provide impedance loading for microwave resonators within said coating. In the solutions of the prior art, there are typically electrically isolated segments being used to provide transparency for microwave signals, where floating conductive patches are being left in the coating. The obvious problem of the old solutions in providing a bias voltage on the floating patch can be effectively solved with the DC-coupled low-pass filter of the present disclosure.

Furthermore, an advantageous embodiment of the present disclosure enhances the connectivity by means of transforming the polarization. In a spatially limited region, a favourable approach may be to adjust the signal transparency to be more efficient at one polarization over a second polarization. In such cases, an embodiment of the present disclosure translates a linear polarization into a circular polarization. This may be adapted to two crossing linear polarizations. A particularly favourable application of said embodiment is in connection with a window with metallic window blinds, or a linear slit region, wherein the signal may be polarized by the blinds or the slit region.

It is an aim to provide means to design facades with a measurable level of radio signal permeability with a device according to the present disclosure.

The aspects of the disclosed embodiment improve the state of the art in the industry by providing a conductive layer that may be arranged to reach a level that reaches a measurable performance level that equals an equivalent open aperture in a wall or facade.

It will be shown in this specification how the prior art fails to specify products that are equal to a given sized hole in a wall, primarily due to the fact that the measurable signal permeability value according to the prior art is a combination of material loss and geometry of the structure.

In accordance with an embodiment, there is provided a conductive layer wherein both the geometry of the device and the associated losses are arranged to reach a signal permeability value that is comparable with an equivalent hole in the wall, and at the same time to provide an enhanced coverage efficiency.

It is an aim of the present invention to provide a conductive layer comprising a microwave transformer for scaling the intensity of a microwave signal of a first frequency by a scaling factor, wherein the transformer comprises a first physical area on the conductive layer for receiving said microwave signal from a first space angle and re-emitting a ray of said microwave signal to a second space angle, and the conductive layer having a second physical area, wherein the scaling factor is the ratio of the maximal intensity of the re-emitted ray and the intensity of a ray through an open aperture having a physical area equivalent to said second physical area in the same direction than the re-emitted ray.

It is an aim of the present disclosure to provide a conductive layer comprising a microwave transformer in a form where the production speed of said conductive layer comprising said transformer can be raised to a level that reduces bottlenecks from a mass production line. There are provided embodiments wherein the required equipment for fast mass production of the conductive layer of the present disclosure can be simplified by firstly, providing an improved method for the fabrication and secondly, providing an arrangement wherein the transformer may be fabricated without shutting down the laser beam with beam shutters or the like. The apparent benefits of the present disclosure can be exploited to remove production bottlenecks and hence reach lower manufacturing costs, provide visually more aesthetic products, and to provide technically enhanced products with enhanced efficiency and coverage efficiency.

According to a first aspect there is provided a conductive layer comprising a microwave transformer for scaling the intensity of a microwave signal of a first frequency by a scaling factor, wherein:

said transformer comprises a first physical area delimited with a closed curve on the conductive layer for receiving said microwave signal from a first space angle and re-emitting a ray of said microwave signal to a second space angle, and said first physical area has at least one region with electrically conductive material and at least one region without electrically conductive material, and said first physical area has a first effective area for said re-emitted ray, wherein the ratio of said first effective area to said first physical area being larger than the scaling factor, and the conductive layer has a second physical area delimited with a closed edge curve and a second effective area for said re-emitted ray, wherein the ratio of said second effective area to said second physical area is smaller than twice the scaling factor, and the ratio of said first physical area to said second physical area is smaller than 0.5, and the ratio of said first effective area to said first physical area is at least two times as large as the ratio of said second effective area to said second physical area;

wherein the scaling factor is the ratio of the maximal intensity of the re-emitted ray and the intensity of a ray through an open aperture having a physical area equivalent to said second physical area in the same direction than the re-emitted ray.

According to a second aspect there is provided a method for fabricating a conductive layer comprising a microwave transformer for scaling the intensity of a microwave signal of a first frequency by a scaling factor, wherein the method comprises:

providing a substrate with a conductive layer;

forming said transformer by forming a first physical area delimited with a closed curve on the conductive layer for receiving said microwave signal from a first space angle and re-emitting a ray of said microwave signal to a second space angle, and forming said first physical area to have at least one region with electrically conductive material and at least one region without electrically conductive material, and forming said first physical area to have a first effective area for said re-emitted ray, by arranging the ratio of said first effective area to said first physical area being larger than the scaling factor, and arranging the conductive layer to have a second physical area delimited with a closed edge curve and a second effective area for said re-emitted ray, by arranging the ratio of said second effective area to said second physical area being smaller than twice the scaling factor, and arranging the ratio of said first physical area to said second physical area to be smaller than 0.5, and arranging the ratio of said first effective area to said first physical area to be at least two times as large as the ratio of said second effective area to said second physical area;

wherein the scaling factor is the ratio of the maximal intensity of the re-emitted ray and the intensity of a ray through an open aperture having a physical area equivalent to said second physical area in the same direction than the re-emitted ray.

According to a third aspect there is provided a system for fabricating a conductive layer comprising a microwave transformer for scaling the intensity of a microwave signal of a first frequency by a scaling factor, wherein the system comprises:

means for forming said transformer comprising a first physical area delimited with a closed curve on the conductive layer for receiving said microwave signal from a first space angle and re-emitting a ray of said microwave signal to a second space angle, and means for forming said first physical area with at least one region with electrically conductive material and at least one region without electrically conductive material, and means for forming said first physical area with a first effective area for said re-emitted ray, wherein the ratio of said first effective area to said first physical area being larger than the scaling factor, and means for arranging the conductive layer with a second physical area delimited with a closed edge curve and a second effective area for said re-emitted ray, wherein the ratio of said second effective area to said second physical area being smaller than twice the scaling factor, and means for arranging the ratio of said first physical area to said second physical area being smaller than twice the scaling factor, and means for arranging the ratio of said first effective area to said first physical area being at least two times as large as the ratio of said second effective area to said second physical area;

wherein the scaling factor is the ratio of the maximal intensity of the re-emitted ray and the intensity of a ray through an open aperture having a physical area equivalent to said second physical area in the same direction than the re-emitted ray.

The present disclosure enhances the re-emission of a first received microwave signal of the first frequency and first polarization through the conductive layer without compromising the efficiency of the first signal or an additional, aggregated signal component in an arrangement where multiple signal components are received and re-emitted through the conductive layer through a limited area.

DESCRIPTION OF THE DRAWINGS

In the following, the aspects of the disclosed embodiments will be described in more detail with reference to the appended drawings, in which

FIGS. 9a to 9h
show numerous examples of the projection paths;

FIGS. 12a and 12b
show examples of rotational arrays of the resonators

FIGS. 17a and 17b
show examples of DC-coupled areas, and;

FIGS. 18a to 18c
show examples of exposure sections being arranged to provide DC-coupled areas in connection with fully opened ablation paths.

DETAILED DESCRIPTION

Electromagnetic scattering is a process where an object receives electromagnetic energy from an incident electromagnetic signal and re-radiates at least a part of this received electromagnetic energy to a solid angle or a plurality of directions having separate solid angles. The incident electromagnetic signal comprises an oscillating electromagnetic wave, which may be characterized by its polarization and oscillation frequency. Polarization is defined by the electric field orientation of said signal in a given state, and it is well known how an electromagnetic signal may be linearly, elliptically, or circularly polarized.

Electromagnetic energy carried by a propagating electromagnetic signal may be characterized by the Poynting vector, i.e. the intensity vector, of the wave front, which describes the energy flux through a unit area per time unit. Energy flux may be denoted by watts per square meter ($W/m^2$). In other words, it describes the power density over a given surface, or the intensity of the electromagnetic signal, thus giving the amount of energy that is flowing through a given surface area in a time unit.

Figure 1:
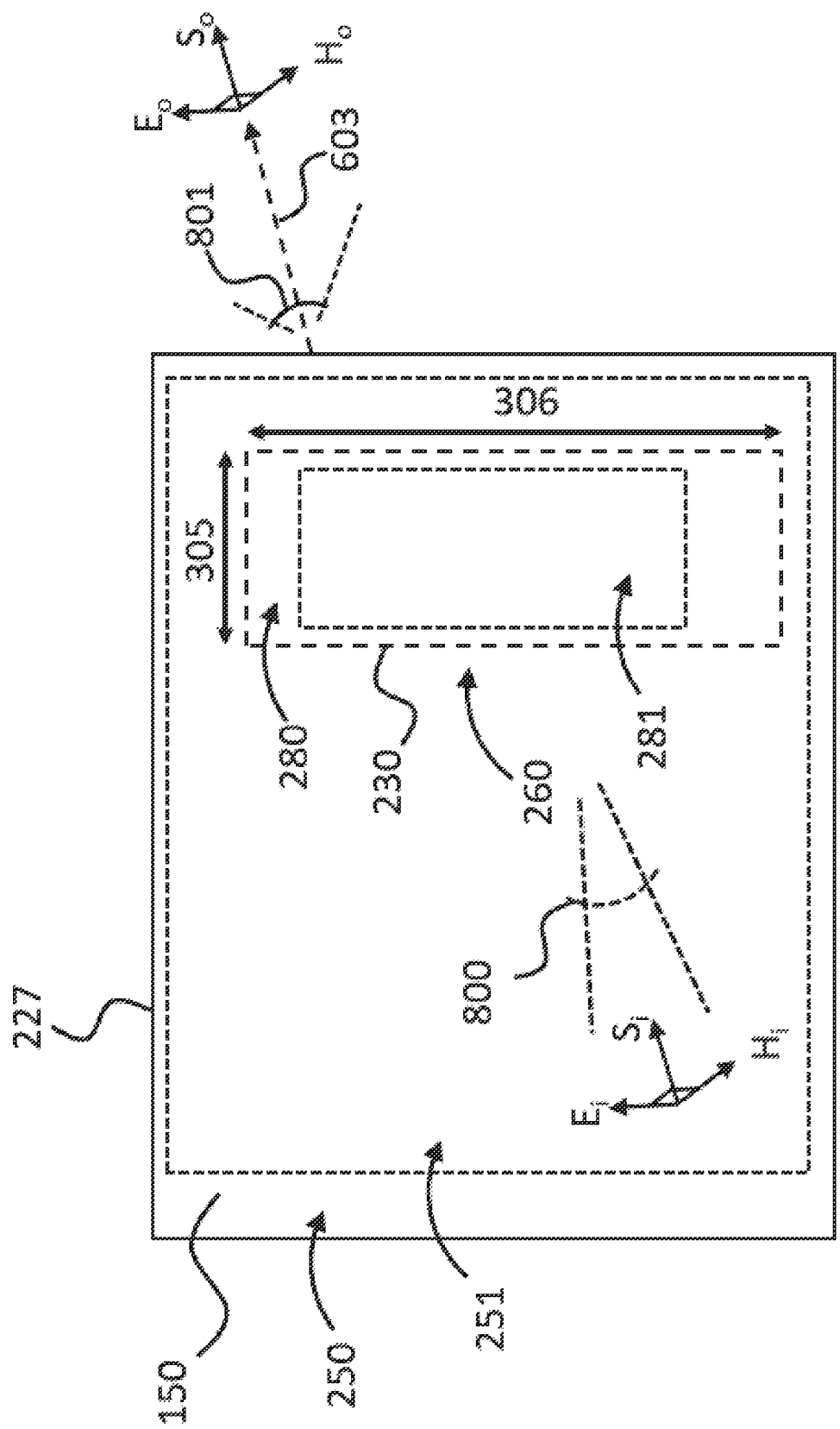
FIG. 1 shows an example of a conductive layer comprising a microwave transformer for scaling the intensity of a microwave signal.

FIG. 1 shows an abstraction of a conductive layer 150 according to the present disclosure, in accordance with an embodiment. In the example, there is provided a microwave signal of a first frequency, said signal arriving from a first space angle 800, and comprising an oscillating electric field vector ($E_i$) and a corresponding magnetic field vector ($H_i$), and a Poynting vector defining the propagation direction of the incident electromagnetic field intensity ($S_i$). There is also presented a re-emitted ray 603 in a second space angle 801, said ray comprising an oscillating electric field vector ($E_o$) and a corresponding magnetic field vector ($H_o$), and a Poynting vector defining the propagation direction of the re-emitted electromagnetic field intensity ($S_o$).

Radar cross section (RCS) is used to describe how much a scattering object captures and re-radiates electromagnetic energy from an incident electromagnetic wave which is illuminating said scattering object. Radar cross section may also be denoted as scattering cross section, and the concept of RCS is well known by anyone skilled in the art. RCS is a function of the polarizations of both the incident and the scattered field, as well as the directions of both the incident and scattered waves. A commonly used concept of RCS is the monostatic case, in which the source of the incident wave and the observation of the scattered or reflected wave occur in the same direction. However, when the behavior of the device according to the present disclosure is of interest, the bistatic radar cross section is mainly of interest. Bistatic radar cross section refers to a concept where the direction of the incident wave deviates from the direction of the scattered wave.

It may be advantageous to use the intensity of the incident and scattered electromagnetic waves to describe the conductive layer 150 comprising the microwave transformer 260 of the present disclosure due to the fact that an aim of the present disclosure is to provide an enhanced conductive layer 150 for controlling the farfield characteristics of re-emitted ray 603.

The total power received by an aperture from a given incident signal direction may be defined as the product of the effective receiving aperture and the incident field intensity. Effective aperture of a radiator, sometimes referred to as receiving aperture or an antenna aperture, may not be equal to physical dimensions of the same. An uncoated glass, or a glass with aperture in the coating can be thought of as an aperture antenna, for which an aperture efficiency may be determined.

It is well known that the aperture of an antenna may be characterized by the gain, directivity and efficiency of the antenna, and said aperture may be used to calculate how much an antenna receives power from a certain direction from a certain incident power density of an electromagnetic wave. Hence, it is well known that an aperture is a function of direction as well as polarization similarly to the gain of an antenna. For an antenna that has clearly detectable feeding terminal, said received power can be detected in this terminal. However, in case of a clearly detectable terminal is lacking, the received power may be stored in the electric and magnetic fields of the antenna, or in a plurality of mutually coupled resonators acting as antennas. In such cases the power received by said device may be characterized by the surface of an imaginary volume enclosing said device. The volume defines a surface through which both the incident and scattered waves flow. The power flow through the surface in an arbitrary solid angle may be characterized by the receiving aperture and intensity of the propagating electromagnetic wave related to the solid angle.

If the radiation pattern of a transmitting antenna (or in this case the bistatic scattering pattern through an aperture in a conductive layer or a signal permeable construction supply) is not known, the aperture efficiency in a transmitted space angle is not a measure of the transmitted total energy. This is a major source of misunderstandings in solutions of the prior art when different solutions are being compared based on the transmission coefficient value that only considers the transmission values in with the directly incident waves through a signal permeable construction supply.

For the sake of clarity, it is defined that in the scope of this specification, a physical aperture comprises physical dimensions and physical surface area of a conductive layer. Antenna area/aperture, receiving area/aperture, or effective area/aperture define an imaginary area or an aperture, which characterizes the radiation properties of an object, including receiving and emitting an electromagnetic wave. The effective aperture is related to a gain or directivity of an object, which may be characterized by the RCS, and is dependent on polarization, frequency and angles of observation of any of the related waves.

The peak effective area of an ideal uniformly illuminated lossless aperture equals its geometric area, independent of wavelength. With any other imperfection, the effective area is smaller than the geometric area. The aperture efficiency of a physical aperture (with a geometric area) is defined as the ratio of the effective area to geometric area.

In the example of FIG. 1, there is provided an example of a conductive layer 150 comprising the microwave transformer 260 for scaling the intensity of a microwave signal of a first frequency by a scaling factor, wherein the scaling factor is the ratio of the maximal intensity of the re-emitted ray 603 and the intensity of a ray through an open aperture having a physical area equivalent to said second physical area 250 in the same direction than the re-emitted ray 603.

By forming a polarization independent and uniformly illuminated aperture in a conductive panel, said aperture having an area, it can be shown that the electromagnetic power that is captured by said area is almost independent of the shape of said area. When the aperture scatters said captured electromagnetic power to the other side of said panel (or conductive layer 150), the power scattered to the other side of the panel is almost independent of the shape of said area. The total amount of electromagnetic energy that is delivered through said aperture may be calculated by performing a three-dimensional integration of the Poynting vector in the hemisphere on the other side of the plane. For a given plane wave illumination having a respective Poynting vector, the Total Radiated Power (TRP) may be calculated through said aperture. The directivity of the scattering pattern, on the other hand, may be adequately characterized by the bistatic radar cross section (RCS) in said hemisphere.

When the smallest dimension of the aperture becomes smaller than a wavelength at a first frequency, the scattering of a signal of a first polarization to the other side of the panel becomes more sensitive to small changes of said smallest dimension when compared to a case when the smallest dimension is a multiple of the wavelength of the first frequency. When the smallest dimension becomes smaller than half of a wavelength at the first frequency, this effect becomes more severe.

Resonant behavior of the aperture shape and perimeter may be used in advance to control the TRP and RCS through said aperture at the first frequency when the smallest dimension of the aperture becomes smaller than the wavelength at the first frequency.

The total amount of power captured by said area from a plane wave arriving from a given direction may be characterized by the effective receiving area of said aperture. The effective receiving area is a function of the angle of arrival.

The bistatic radar cross section through said aperture may be characterized by the effective receiving area of the aperture. Similarly to the effective receiving area, also bistatic RCS is a function of the angle of arrival. Furthermore, it is also a function of the observed scattering angle on the other side of the plane. The peak bistatic RCS on the other side of the plane is typically observed in a direction of direct path of the incident wave, as expected from physical optics.

The peak bistatic RCS through the aperture at the first frequency is almost independent of the aperture shape, when the area defined by the aperture perimeter remains constant. Resonant behavior or non-uniform aperture illumination and aperture field taper may cause small deviations. The maximal bistatic RCS through the aperture may be adequately characterized by the known RCS of an equivalent square having the same surface area than said aperture.

For a fixed surface area of the aperture, the total amount of scattered electromagnetic energy, or TRP through said aperture is almost independent of the aperture shape or the frequency of observation, when the smallest dimension of the aperture is larger than a wavelength at a first frequency.

The total amount of electromagnetic power delivered through the aperture, i.e. the 3D integral of the Poynting vector over the second hemisphere, may be adequately characterized by referencing the total amount of the scattered power to the equivalent power delivered by said equivalent square aperture having the same surface area than said aperture.

When the aperture causes loss for the transmitted energy, i.e. reflection loss, aperture tapering loss, aperture illumination loss, or material loss, the effective area of said aperture becomes smaller than the physical area of said aperture.

When said aperture is fully or partially filled with a conductive material, the effective aperture size of said aperture becomes smaller than the physical size of said aperture. This may be characterized by the aperture efficiency of said aperture. Aperture efficiency is affected by both the filling factor of the conductive material within the aperture, and the material properties such as surface resistance of the filling material. Said filling material may also comprise multiple heterogeneous or homogeneous layers, or only the surface impedance or transmittance at microwave frequencies may be appropriate to characterize said filling material.

When the aperture is fully or partially filled with a conductive material and said filling material is provided with coupled microwave resonators formed by openings in said filling material, the effective area of said aperture may be recovered. With unideal conductivity of the filling material, the factor of material loss may become significant, and it is not obvious that any resonator formed in the filling material could provide effective aperture sizes that are of the same order than the unfilled aperture. This is especially the case with coating materials used in thermally efficient window glasses. Furthermore, similar resonator geometries with good conductors, such as aluminum panels, may be significantly detuned when implemented in glass coatings, and also the effective aperture size of the aperture may be heavily degraded. We have also investigated that very narrow openings, e.g. less than 0.2 mm in width, become poor antenna radiators when arranged in a lossy conductor surface when compared to identical openings in good metals. An example of a lossy conductor is, e.g. a coating having a surface resistance of the order of 5 ohms per square, and an example of a good conductor is, e.g. copper or aluminum.

When an array of coupled microwave resonators is formed within said aperture, wherein said resonators being made sensitive to the signal of the first polarization, recovery in effective aperture size may be provided. When the smallest dimension of the aperture is smaller than the wavelength at the first frequency, and when the orientation of said smallest dimension at least partially crosses the orientation of the first polarization and said resonators being made sensitive to the signal of the first frequency, the formation of said resonators may increase the effective aperture size being larger than the physical aperture size.

In an aperture where the edges of the aperture become close to each other, i.e. when the smallest dimension of the aperture is comparable with the wavelength, the diffraction phenomenon becomes more effective. This can be exploited in building elements to provide wide coverage both outdoors towards the horizon and indoors where the location of the wireless device is unknown.

First and Second Effective Area

Figure 2A:
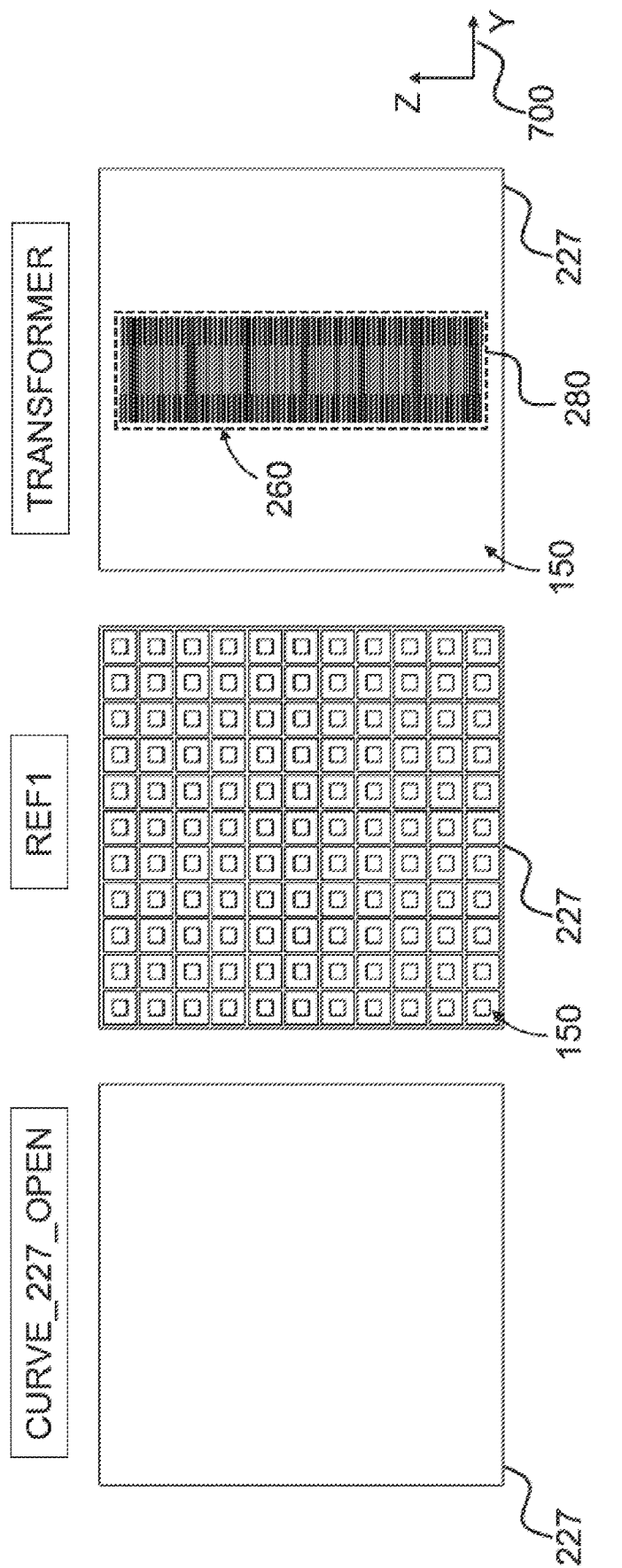
FIG. 2a shows examples of three different structures having equal outer perimeters.
Figure 2B:
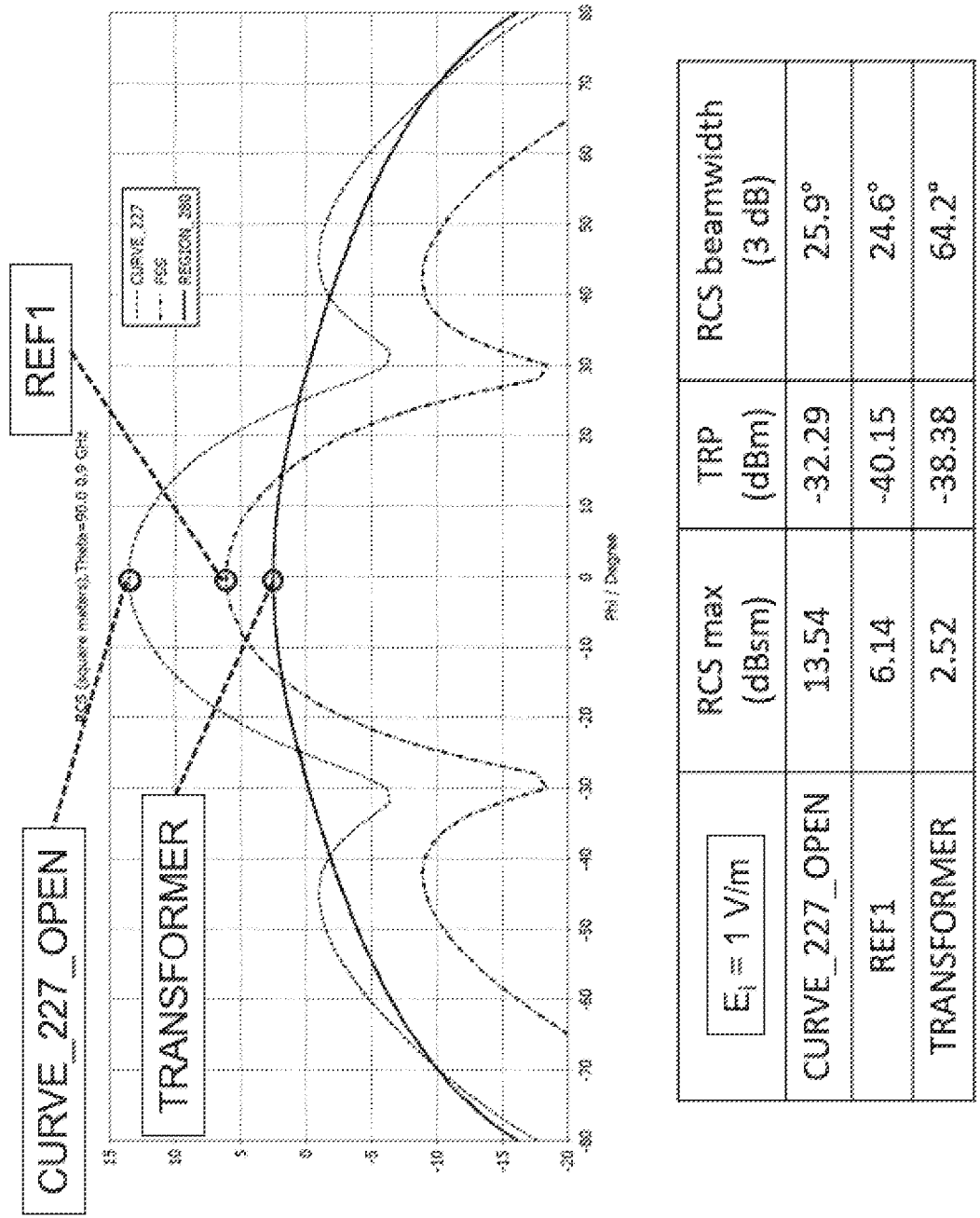
FIG. 2b shows Finite Element Method simulation results for the radar cross section, total radiated power, and beam width of three example structures.

FIG. 2a shows three different structures having equal outer perimeters, and FIG. 2b shows Finite Element Method (FEM) simulation results for these three example structures.

Figure 2C:
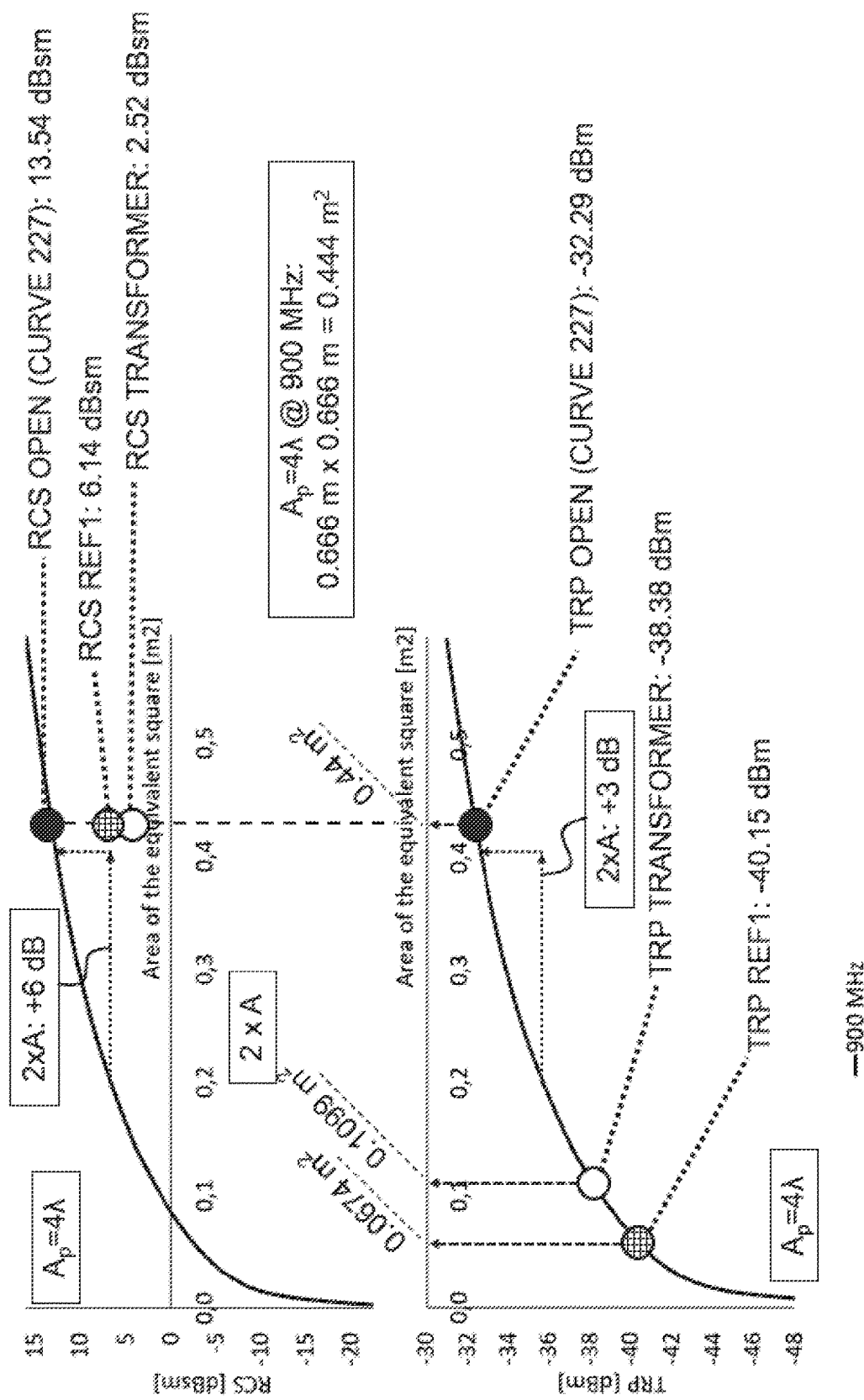
FIG. 2c shows the determination of the equivalent square aperture for the example structures using the total radiated power through an aperture.

FIG. 2c shows a FEM simulation result for the bistatic radar cross section through a square aperture, i.e. an equivalent aperture, with respect to the aperture area, and a FEM simulation result for the total radiated power (TRP) through the same square aperture. The RCS and TRP values of the structures presented in FIGS. 2a and 2b are illustrated in FIG. 2c with respect to the equivalent aperture.

The first example structure in FIG. 2a shows an open aperture in a perfectly conducting wall. This structure is referred to as "CURVE_227_OPEN", and it shows an open aperture that is delimited by the curve 227, and having a physical area equivalent to the second physical area 250. For the open aperture, the first and second physical areas are equal and indistinguishable.

The simulations for the three structures are performed at the frequency of 900 MHz, and the physical area delimited by the curve 227 is $4\lambda^2$, where $\lambda$ is the wavelength at 900 MHz. This same aperture area is used for the three other example structures. The region that is outside of curve 227 is fully covered with the perfectly conducting wall.

The second structure is referred to as "REF1", and it represents a frequency selective structure according to the prior art. It is a FSS with dual concentric rings in each unit cell. The area of this FSS structure is delimited with curve 227 that is identical to the first example on the left. This curve 227 delimits the second physical area 250 of the conductive layer 150, and the first physical area 280 is arranged equal to the second physical area.

The third example structure from the left in FIG. 2a shows an example of a conductive layer 150 comprising a microwave transformer 260 in accordance with an embodiment of the present disclosure. This is referred to as "TRANSFORMER" in FIG. 2a and FIG. 2b.

FIG. 2b shows the simulation results for the three compared structures. There is presented the scattering patterns in the XY-plane in terms of bistatic RCS, and a table showing the maximal values of RCS in the direction of the positive X axis. This is the direction of $\theta=90°$ and $\varphi=0°$. All of the structures are illuminated with a plane wave having an electric field strength of 1 V/m, and the plane wave is arriving from the direction of the normal of the conductive layer 150 from the negative X-axis. The total power that is transmitted through the apertures comprised by curves 227 are integrated in the hemisphere comprised by the positive X axis. The 3 dB beamwidths for the simulated RCS patterns in the XY-plane are also provided.

Firstly, it may be observed that the RCS of the "CURVE_227_OPEN" is 13.54 dBsm, and the beamwidth is 25.9°. This acts as a reference for the maximal power that may be transmitted through the aperture.

Secondly, it may be seen that "REF1" shows RCS of 6.14 dBsm, which can be translated into penetration loss of −7.4 dB (or transmission loss) when characterized according to a direct beam measurement method that is commonly used in the prior art. It is emphasized that this value is what is commonly being characterized in the prior art when the transmission through a FSS structure is measured with using VNA measurements with two antennas measuring the direct ray path in a face-to-face setup.

However, it is next shown how this result is a measure for the combined effect of both the aperture transmittance and the geometry of the entire aperture. This is also a reason why prior art fails to present the conductive layer 150 of the present disclosure.

The total power that is transmitted through the second physical area 250 of "REF1", when integrated over the entire hemisphere comprised by the positive X-axis, is −40.15 dBm, which is 7.86 dB less than through the same physical area of "CURVE_227_OPEN". In other words, "REF1" attenuates the total energy by an amount of 7.86 dB. The scaling factor for "REF1" is 0.182, which may be determined from the reduction of the RCS with respect to the RCS of the "CURVE_227_OPEN".

The third structure that presents an example of the present disclosure in accordance with an embodiment ("TRANSFORMER"), has a RCS value of 2.52 dBsm. In other words, the measurement that would be performed using the methods used traditionally to characterize the structures of the prior art, would imply that "TRANSFORMER", which is the structure according to the present disclosure, would have 3.62 dB lower performance than "REF1". However, as it can be seen, "TRANSFORMER" delivers −38.38 dBm power through the aperture (through curve 227), which is 1.77 dB larger total power than what is achieved with structure "REF1". The scaling factor for "TRANSFORMER" is 0.08, which may be determined from the reduction of the RCS with respect to the RCS of the "CURVE_227_OPEN" by an amount of 11.02 dB.

According to a preferred embodiment, there is provided a conductive layer 150 comprising a microwave transformer 260 for scaling the intensity of a microwave signal of a first frequency by a scaling factor, wherein the scaling factor is the ratio of the maximal intensity of the re-emitted ray 603 and the intensity of a ray through an open aperture having a physical area equivalent to said second physical area 250 in the same direction than the re-emitted ray 603, wherein said transformer 260 being arranged to provide at least 6 dB lower radar cross section for the re-emitted ray 603 than said open aperture having the physical area equivalent to said second physical area 250, and to increase the 3 dB RCS beamwidth at least by a factor of two with respect to the RCS beamwidth of said open aperture having the physical area equivalent to said second physical area 250.

It may be seen from FIG. 2b that the conductive layer 150 according to the present disclosure increases the 3 dB radar cross section beamwidth when compared to either of "REF1" or "CURVE_227_OPEN".

According to another preferred embodiment, there is provided a conductive layer 150 comprising a microwave transformer 260 for scaling the intensity of a microwave signal of a first frequency by a scaling factor, wherein the scaling factor is the ratio of the maximal intensity of the re-emitted ray 603 and the intensity of a ray through an open aperture having a physical area equivalent to said second physical area 250 in the same direction than the re-emitted ray 603, wherein said scaling factor being less than 0.25.

The functionality of the present disclosure can be reached by arranging a first physical area 280, a first effective area 281, a second physical area 250, and a second effective area 251 in accordance with the scaling factor.

In an embodiment of the present disclosure, said transformer 260 comprising the first physical area 280 delimited with a closed curve 230 on the conductive layer 150 for receiving said microwave signal from the first space angle 800 and re-emitting the ray 603 of said microwave signal to the second space angle 801, said first physical area 280 having at least one region with electrically conductive material and at least one region 214 without electrically conductive material.

In an embodiment, said first physical area 280 having a first effective area 281 for said re-emitted ray 603, wherein the ratio of said first effective area 281 to said first physical area 280 being larger than the scaling factor.

In an embodiment, the conductive layer 150 having a second physical area 250 delimited with a closed edge curve 227 and a second effective area 251 for said re-emitted ray 603, wherein the ratio of said second effective area 251 to said second physical area 250 being smaller than twice the scaling factor.

In an embodiment, the ratio of said first effective area 281 to said first physical area 280 being at least two times as large as the ratio of said second effective area 251 to said second physical area 250.

In an embodiment, the ratio of said first physical area 280 to said second physical area 250 being smaller than 0.5.

In an embodiment, said scaling factor being less than 0.25.

In an embodiment, said first physical area 280 and said second physical area 250 are overlapping.

For a practical aperture in the conductive layer 150, the effective area may be less than one due to field taper and metal edge effects. When material loss is present, the effective area and aperture efficiency are reduced.

When the aperture antenna is diffractive and/or provides a broad beam, the effective area is reduced in any direction due to the effects of the structure geometry. This, however, is not a guarantee that the total amount of transmitted energy, or TRP is reduced. By forcing the re-emitted field to expand spatially, as with the conductive layer 150 of the present disclosure, one may reach better spatial coverage, and at the same time deliver as much or more microwave energy to the other side of the conductive layer. This is particularly true when comparing a traditional large FSS pane with a device according to the present disclosure and using the VNA measurement setup described above and using a measurement for the direct line of sight (LoS) ray to make a comparison between the two different solutions. Therefore, it becomes evident that the prior art does not account for the discrepancy between total transmitted power and a product of transmitted power and device directivity.

Equivalent Area

An equivalent area is an area of an open square aperture in the conductive layer that delivers the same amount of total electromagnetic energy through the conductive layer than a device or aperture being considered. The total radiated power through the open square aperture may be accurately determined using, e.g. modern full wave electromagnetic simulation tools.

The effective area is defined for a re-radiated ray, whereas the equivalent area is defined for a 3D integral of the transmitted power to a hemisphere. The equivalent area relates to the total amount of transmitted power, whereas the effective area is determined from the bistatic RCS. For example, for a directive aperture, the effective area is at its maximum for a line of sight ray, and it's significantly smaller when it is observed from an angle that deviates from the LoS path. The equivalent area for such example aperture, however, would be independent of the observation angle of the re-emitted ray, when the direction of the incident signal would remain constant.

In an advantageous embodiment of the present disclosure, the conductive layer 150 is characterized in having the first physical area 280 with the first effective area 281 for said re-emitted ray 603, and the second physical area 250 with the second effective area 251 for said re-emitted ray 603, and the first effective area 281 being less than 10% smaller than the second effective area 251.

The equivalent area is independent of the azimuth or elevation angle of the transmitted ray, because it is the integral of the Poynting vector in the hemisphere behind the conductive layer. It is, however, a function of the incident angle and polarization of the incident ray, because each illumination direction provides a unique scattering pattern to the other side of the conductive panel.

The equivalent area depends on the angle of the illumination signal, but is independent of the angle of the transmitted signal. The effective area depends on both the illumination angle and the angle of the transmitted signal.

When the equivalent area of an aperture or a device, e.g. a coated glass pane on a metal wall is known for a given illumination signal, it can be uniquely determined how much that aperture or device is able to deliver microwave energy through the conductive layer.

FIG. 2c shows the FEM simulation result for the bistatic radar cross section through the square aperture, i.e. an equivalent aperture, with respect to the aperture area, and the FEM simulation result for the total radiated power (TRP) through the same square aperture. The RCS and TRP values of the structures presented in FIGS. 2a and 2b are illustrated in FIG. 2c with respect to the equivalent aperture.

First, it is emphasized how the geometry changes of the aperture in the conductive panel affect both the total transmitted power and the maximal RCS value, which is the one that is primarily characterized in the prior art. It is seen from FIG. 2c how doubling of the aperture area without lossy layers doubles the total amount of transmitted total power. The total power is integrated over the transmitted hemisphere. However, it is also seen that doubling the aperture area quadruples the maximal value of the RCS. An expert in the field would appreciate the fact that the value of the maximal RCS and TRP are relatively immune to the shape of the aperture, when resonance behavior is not significant.

The physical area of the aperture, that is, the area delimited with the curve 227, is $4\lambda^2$, where $\lambda$ is the wavelength of the first frequency. In this illustrative example, the first frequency is 900 MHz. The physical area of the aperture is therefore 0.444 m$^2$.

The RCS of 13.54 dBsm and the TRP of −32.29 dBm of the "CURVE_227_OPEN" aperture are presented with solid black dots. It can be verified that the physical area equals the area of the equivalent square area of 0.444 m$^2$.

The RCS of 6.14 dBsm and the TRP of −40.15 dBm of the "REF1" aperture are presented with crosshatched dots. It can be verified that the physical area of 0.444 m$^2$ delivers a total power that is equal to an equivalent square area of 0.0674 m$^2$.

The RCS of 2.52 dBsm and the TRP of −38.38 dBm of the "TRANSFORMER" are presented with white dots. It can be verified that the physical area of 0.444 m$^2$ delivers a total power that is equal to an equivalent square area of 0.1099 m². In other words, "TRANSFORMER" corresponds to 63% larger equivalent aperture area than "REF1" of the prior art.

For the open aperture ("CURVE_227_OPEN"), the first 280 and second 250 physical areas are equal to 0.444 m².

For the structure "REF1", the first physical area 280 equals 0.444 m², the second physical area 250 equals 0.444 m², and the scaling factor is 0.182.

For the structure "TRANSFORMER", the first physical area 280 equals 0.1040 m² and the second physical area 250 equals 0.444 m², and the scaling factor is 0.0791.

In an embodiment of the present disclosure, the conductive layer 150 is arranged on a substrate 151, and said first physical area 280 having a first dimension 305 and a second dimension 306, wherein said first effective area 281 being arranged to be at least twice as large as an equivalent square area of the substrate 151 wherein the conductive layer 150 on the equivalent square area is absent, and wherein both the width and height of the equivalent square area being equal to the first dimension 305. In said arrangement, the first effective area 281 is forced to expand the coverage area with the re-emitted ray 603 in order to scale the intensity of the microwave signal of the first frequency by the scaling factor, wherein said arrangement being forced to deliver an amount of electromagnetic energy through the first physical area 280.

From FIG. 2b it can be seen that the transformer 260 is arranged to expand the coverage area where the bistatic radar cross section (RCS) is less than 3 dB smaller than the peak RCS of the re-emitted ray 603 by a factor of at least two, when compared to the open aperture or the FSS structure of the prior art.

In an embodiment of the present disclosure, the transformer 260 comprises the first physical area 280, wherein said first physical area 280 having the first dimension 305 and the second dimension 306, wherein said microwave transformer 260 being arranged to expand the coverage area where the bistatic radar cross section (RCS) is less than 3 dB smaller than the peak RCS of the re-emitted ray 603, wherein said coverage area being expanded by a factor of at least two with respect to the 3 dB RCS coverage area of an equivalent physical area that is equal to the physical area of said conductive layer 250 but wherein said conductive layer 250 is absent, wherein said coverage expansion being provided with an arrangement where the ratio of the first dimension 305 to the second dimension 306 being smaller than twice the scaling factor.

On the System for Fabricating a Conductive Layer and a Transformer

Figures 3A, 3B:
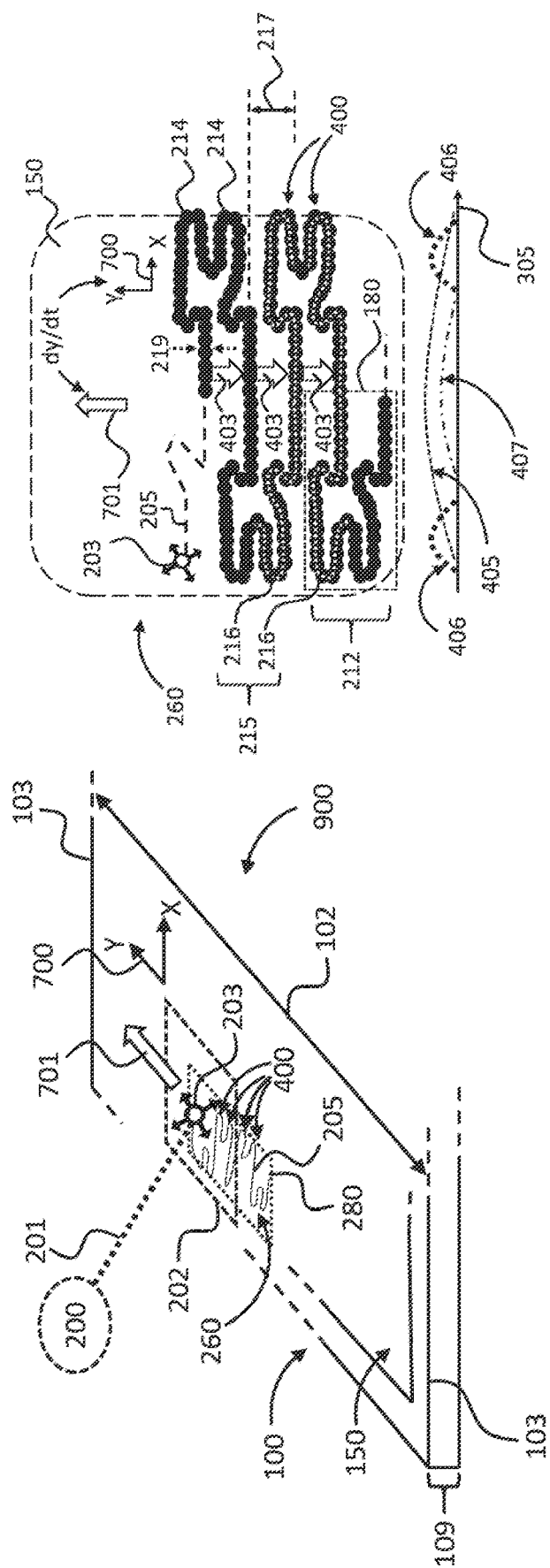
FIG. 3a shows an example of a system for fabricating a conductive layer comprising a microwave transformer.
FIG. 3b shows an example of coupled microwave resonators on a repeating sequence along a primary processing direction.

FIG. 3a shows an example of a system 900 for fabricating a conductive layer 150 comprising a microwave transformer 260.

In the illustrative example, there is provided a glass pane 100, wherein said conductive layer 150 being a coating layer on said glass pane 100. In the exemplary arrangement, the glass pane 100 is acting as the substrate material 151 for the conductive layer 150, wherein said glass pane has a thickness 109, and a first dimension 102 defining at least a length exceeding three wavelengths at the first frequency between at least two edge sections 103.

In the example of FIG. 3a, there is also provided a laser apparatus 200, wherein said laser apparatus 200 being arranged to produce at least part of the transformer 260. Said laser apparatus 200 is primarily characterized in having a laser beam 201, wherein said laser beam 201 being arranged to aim energy to the beam projection 203 on the conductive layer 150.

In an embodiment, said laser apparatus 200 is arranged to deviate the position of the beam projection 203 along the surface of the conductive layer 150, and following a projection path 205 to provide said coupled microwave resonators 400 within a scanning region 202 (or scanfield) of the laser apparatus 200.

In an embodiment of the present disclosure, said system 900 comprises means for forming said transformer 260 comprising a first physical area 280 delimited with a closed curve 230 on the conductive layer 150 for receiving said microwave signal from a first space angle 800 and re-emitting a ray 603 of said microwave signal to a second space angle 801.

In another embodiment of the present disclosure, said system 900 comprises means for forming said first physical area 280 with at least one region with electrically conductive material and at least one region 214 without electrically conductive material.

In an embodiment of the present disclosure, said means for forming said first physical area 280 with at least one region with electrically conductive material and at least one region 214 without electrically conductive material comprising at least a laser apparatus 200.

In another embodiment of the present disclosure, said system 900 comprises means for forming said first physical area 280 with a first effective area 281 for said re-emitted ray 603, wherein the ratio of said first effective area 281 to said first physical area 280 being larger than the scaling factor, and means for arranging the conductive layer 150 with a second physical area 250 delimited with a closed edge curve 227 and a second effective area 251 for said re-emitted ray 603, wherein the ratio of said second effective area 251 to said second physical area 250 being smaller than twice the scaling factor.

In another embodiment of the present disclosure, said system 900 comprises means for arranging the ratio of said first physical area 280 to said second physical area 250 being smaller than twice the scaling factor, and means for arranging the ratio of said first effective area 281 to said first physical area 280 being at least two times as large as the ratio of said second effective area 251 to said second physical area 250.

In another embodiment of the present disclosure, the system 900 comprises means for providing said conductive layer 150 or a substrate 151 comprising said conductive layer 150 with any of added metal pads, laminated circuit boards, printed electronics components, printed conductors, printed insulation layers, printed diodes, printed transistors, or printed solar cells to be connected with said microwave transformer 260.

In the example of FIG. 3a, there is provided the transformer 260 comprising the first physical area 280, wherein said first physical area 280 having at least one region with electrically conductive material and at least one region 214 without electrically conductive material, wherein said at least one region 214 without electrically conductive material comprises coupled microwave resonators 400 on a repeating sequence along a primary processing direction 701.

FIG. 3b shows an illustrative example of coupled microwave resonators 400 on a repeating sequence along a primary processing direction 701. The coordinate system 700 is shown in FIGS. 3a and 3b, wherein the coordinate system 700 is aligned on the conductive layer 150.

In an embodiment, said at least one region 214 without electrically conductive material comprises coupled microwave resonators 400 on a repeating sequence 212, wherein said repeating sequence 212 being provided with multiple replicas of a unit image 180 along a primary processing direction 701, wherein said coupled microwave resonators 400 being sensitive at least to a first polarization, and said coupled microwave resonators 400 being connected to at least one region 214 without electrically conductive material in said conductive layer 150, wherein said at least one region 214 without electrically conductive material comprise at least two sets 215 of substantially parallel and uninterrupted paths 216 within regions without electrically conductive material, wherein said uninterrupted paths 216 being separated by a first distance 217, and said uninterrupted paths 216 having an uninterrupted length of at least 20 times said first distance 217, and wherein said coupled microwave resonators 400 being coupled by means of coherent segments of surface currents 403 in said conductive layer 150, and said first distance 217 being arranged in the direction of said coherent segments of surface currents 403.

In an embodiment, said at least one region 214 without electrically conductive material comprises uninterrupted paths 216 within regions without electrically conductive material on a repeating sequence 212, wherein said uninterrupted paths 216 being separated at least by a first distance 217, and said uninterrupted paths 216 having an uninterrupted length of at least 20 times said first distance 217 and a width 219 of at least 10 times smaller than said first distance 217, and said uninterrupted paths 216 being arranged to form at least a first row of parallel radiating electric field sources at said first frequency range for scaling the intensity of said microwave signal by said scaling factor.

In an advantageous embodiment, said first distance 217 being arranged between 1 mm and 5 mm, said uninterrupted length being arranged at least 100 mm in length, and said width 219 of the uninterrupted path 216 being arranged between 1 um and 100 um.

In another advantageous embodiment, said first distance 217 being arranged between 1 mm and 3 mm, said uninterrupted length being arranged at least 60 mm in length, and said width 219 of the uninterrupted path 216 being arranged between 1 um and 100 um.

In FIG. 3b, there is provided an example of a symmetry reference, wherein the repeating sequence 212 comprises multiple mirrored copies of the uninterrupted paths 216.

In an embodiment, said uninterrupted paths 216 comprising regions of mirrored symmetry with respect to a symmetry reference of a symmetry axis, or regions of rotational symmetry with respect to a symmetry reference of a rotation point, wherein the symmetry reference being arranged to separate the symmetrical regions of said uninterrupted paths 216 by a distance smaller than half of a wavelength at the first frequency.

A Plurality of Conductive Layers

Figure 4:
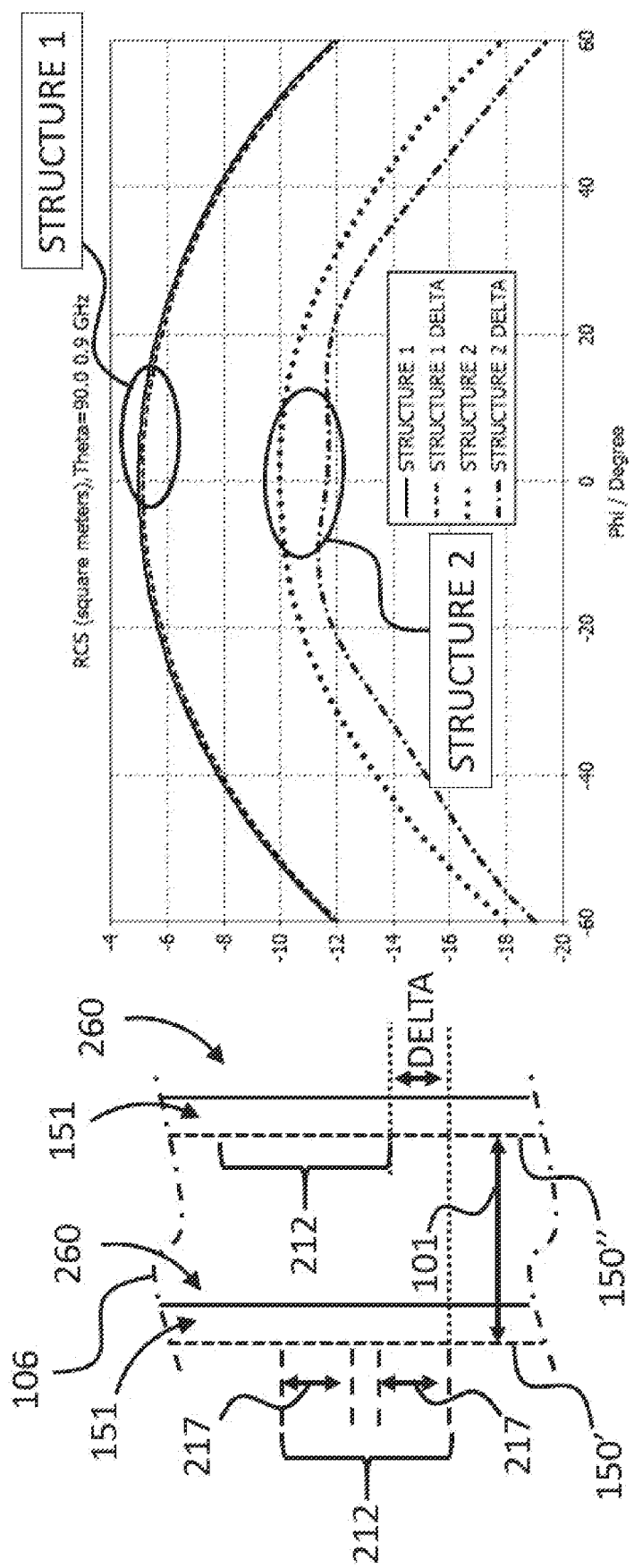
FIG. 4 shows an arrangement of the conductive layer adjacent to a secondary conductive layer.

FIG. 4 shows an arrangement of the conductive layer, in accordance with an embodiment. In FIG. 4, there is provided a primary conductive layer 150' comprising a microwave transformer 260 of the present disclosure adjacent to a secondary conductive layer 150" comprising another microwave transformer 260 of the present disclosure. The conductive layers 150 are arranged on substrates 151. In the example of FIG. 4, the substrate material is glass. There is provided a separation 101 between the primary and the secondary conductive layer. Both the primary 150' and the secondary 150" conductive layers comprise at least one region 214 without electrically conductive material comprising uninterrupted paths 216 according to an embodiment. The transformers of the two adjacent conductive layers may comprise the same repeating pattern, or they may be different.

In an embodiment, the conductive layer 150 comprising a microwave transformer 260 is arranged adjacent to another conductive layer 150 comprising another microwave transformer 260 according to the present disclosure, wherein said conductive layers 150 being arranged as an insulation glass unit 106, and said conductive layers 150 being provided with a separation 101 between the said conductive layers.

There is provided the repeating sequence 212 in both the primary 150' and the secondary 150" conductive panel, wherein said uninterrupted paths 216 being separated at least by a first distance 217 in each conductive panel. In both conductive panels, said uninterrupted paths 216 are arranged to form at least a first row of parallel radiating electric field sources at said first frequency range for scaling the intensity of said microwave signal by said scaling factor.

The FEM simulation results for the bistatic radar cross section pattern in the XZ-plane is presented in FIG. 4, wherein the RCS is simulated for a microwave signal through a stack of conductive layers according to an embodiment.

In a first example structure ("STRUCTURE 1") the first distance 217 is dimensioned to a value that is smaller than the separation 101 between the primary 150' and the secondary 150" conductive layer. Furthermore, in said arrangement, the repeating sequence 212 is dimensioned to a value being smaller than the separation 101.

In a second example structure ("STRUCTURE 2") the first distance 217 is dimensioned to a value that is larger than the separation 101 between the primary 150' and the secondary 150" conductive layer. Furthermore, in said arrangement, the repeating sequence 212 is dimensioned to a value being smaller than twice the separation 101. The first dimension 305 for both the first and second example structure was the same.

In the FEM simulations, both structures are simulated in a first arrangement where the primary and secondary conductive layers are aligned in the same position with respect to the patterns in each panel. In these simulations the patterns are similar in both panels. In the second arrangement, there is provided a delta between the repeating sequence 212 of the primary 150' and the secondary 150" conductive layer, wherein the delta is provided in the direction of the Y-axis. The delta in each simulation equals half of the length of the repeating sequence 212.

The simulation results show that by limiting the repeating sequence 212 to a value that is smaller than twice of the separation 101 between the primary 150' and the secondary 150" conductive layer, the structure becomes more robust to manufacturing tolerances. In other words, with proper dimensioning of the transformer 260, there is no need to align the transformers 260 of the stacked conductive layers in two dimensions. The alignment of the transformer 260 is required only in one coordinate axis. The benefit of this arrangement is that the production speed may be improved, and the production line may simplified. The processing of the microwave transformer 260 on the conductive layer 150 may therefore be run on the fly.

In an embodiment, said conductive layer 150 is arranged as a primary conductive layer 150' adjacent to a secondary conductive layer 150", wherein the repeating sequence 212 of the primary conductive layer 150' is smaller than twice the separation 101 between the primary conductive layer 150' and the secondary conductive layer 150".

In a preferred embodiment, said conductive layer 150 is arranged as a primary conductive layer 150' adjacent to a secondary conductive layer 150", wherein the repeating sequence 212 of the primary conductive layer 150' is smaller than the separation 101 between the primary conductive layer 150' and the secondary conductive layer 150".

In another embodiment, said conductive layer 150 is arranged as a primary conductive layer 150' adjacent to a secondary conductive layer 150", wherein the first distance 217 of the primary conductive layer 150' is smaller than the separation 101 between the primary conductive layer 150' and the secondary conductive layer 150".

In accordance with a preferred embodiment, there is provided a method for fabricating said conductive layer 150 comprising said microwave transformer 260, wherein said method being characterized in providing said substrate 151 with said conductive layer 150 in form of a glass pane 100, wherein said conductive layer 150 being a coating layer on said glass pane 100, and wherein said method comprises at least process steps of cutting glass panes 100 out of jumbo glasses 108, wherein at least one of said glass panes 100 being provided with said conductive layer 150, and assembling said glass panes 100 into insulation glass units 106.

In accordance with the presented embodiments, there may be a plurality of conductive layers 150 on a stack, wherein said stack comprises at least two conductive layers. In a single coating layer, there may be multiple conductive layers. In a laminated glass pane 100 there may be a plurality of conductive layers. In an insulation glass unit, there may be a plurality of conductive layers 150, and in a window unit there may be a plurality of conductive layers 150 on a stack.

In an embodiment, there the primary 150' and the secondary 150" conductive layer are laminated on an insulation material, wherein the thickness of the insulation material being arranged to provide the separation 101.

On the Method of Manufacturing a Conductive Layer

In accordance with an embodiment, there is provided a method for fabricating a conductive layer 150 comprising a microwave transformer 260 for scaling the intensity of a microwave signal of a first frequency by a scaling factor, wherein the scaling factor is the ratio of the maximal intensity of the re-emitted ray 603 and the intensity of a ray through an open aperture having a physical area equivalent to said second physical area 250 in the same direction than the re-emitted ray 603.

In accordance with an embodiment, said method for fabricating a conductive layer 150 comprising said microwave transformer 260 being characterized by providing a substrate 151 with said conductive layer 150 and forming said transformer 260 by forming a first physical area 280 delimited with a closed curve 230 on the conductive layer 150 for receiving said microwave signal from a first space angle 800 and re-emitting a ray 603 of said microwave signal to a second space angle 801, and forming said first physical area 280 to have at least one region with electrically conductive material and at least one region 214 without electrically conductive material, and forming said first physical area 280 to have a first effective area 281 for said re-emitted ray 603, by arranging the ratio of said first effective area 281 to said first physical area 280 being larger than the scaling factor.

In accordance with an embodiment, said method for fabricating a conductive layer 150 comprising said microwave transformer 260 being characterized by arranging the conductive layer 150 to have a second physical area 250 delimited with a closed edge curve 227 and a second effective area 251 for said re-emitted ray 603, by arranging the ratio of said second effective area 251 to said second physical area 250 being smaller than twice the scaling factor, and arranging the ratio of said first physical area 280 to said second physical area 250 to be smaller than the scaling factor, and arranging the ratio of said first effective area 281 to said first physical area 280 to be at least two times as large as the ratio of said second effective area 251 to said second physical area 250.

In accordance with an advantageous embodiment, said method for fabricating a conductive layer 150 comprising said microwave transformer 260 being characterized by arranging the conductive layer 150 to have a second physical area 250 delimited with a closed edge curve 227 and a second effective area 251 for said re-emitted ray 603, by arranging the ratio of said second effective area 251 to said second physical area 250 being smaller than twice the scaling factor, and arranging the ratio of said first physical area 280 to said second physical area 250 to be smaller than 0.5 and larger than the scaling factor, and arranging the ratio of said first effective area 281 to said first physical area 280 to be at least two times as large as the ratio of said second effective area 251 to said second physical area 250.

In accordance with another embodiment, said method for fabricating a conductive layer 150 comprising said microwave transformer 260 being characterized in arranging said scaling factor to less than 0.25, and arranging said first effective area 281 to be less than 10% smaller than said second effective area 251.

In accordance with another embodiment, said method for fabricating a conductive layer 150 comprising said microwave transformer 260 being characterized in arranging said first physical area 280 to have a first dimension 305 and a second dimension 306, and arranging said first effective area 281 to be at least twice as large as an equivalent square area of the substrate 151 wherein the conductive layer 150 on the equivalent square area is absent.

In accordance with another embodiment, said method for fabricating a conductive layer 150 comprising said microwave transformer 260 being characterized in arranging said transformer 260 for scaling the intensity of the microwave signal of the first frequency by means of bistatic scattering of the microwave signal through said first physical area 280 by increasing the maximal bistatic radar cross section of the microwave signal through said conductive layer 150 by arranging said at least one region with electrically conductive material and said at least one region 214 without electrically conductive material as microwave resonators 400, and delimiting the maximal bistatic RCS of said ray 603 through said conductive layer 150 at the first frequency to a value that is at least 6 dB below an equivalent peak bistatic radar cross section through an equivalent area of said substrate 151 that corresponds to the second physical area 250, and wherein the conductive layer 150 of the equivalent area is absent.

In a preferred embodiment, there is provided a method for fabricating said conductive layer 150 comprising said microwave transformer 260, wherein said method being characterized in forming said at least one region 214 without electrically conductive material of said first physical area 280 by applying coupled microwave resonators 400 on the conductive layer 150 along a primary processing direction 701 by using a laser apparatus 200, and applying said microwave resonators 400 using a repeating sequence 212 to apply multiple replicas of a unit image 180 along said primary processing direction 701, and arranging said coupled microwave resonators 400 being sensitive at least to a first polarization, and arranging said coupled microwave resonators 400 to be connected to at least one region 214 without electrically conductive material, wherein said at least one region 214 comprise at least two sets 215 of substantially parallel and uninterrupted paths 216 within regions without electrically conductive material, wherein said uninterrupted paths 216 being separated by a first distance 217, and said uninterrupted paths 216 having an uninterrupted length of at least 20 times said first distance 217, and wherein said coupled microwave resonators 400 being coupled by means of coherent segments of surface currents 403 in said conductive layer 150, and said first distance 217 being arranged in the direction of said coherent segments of surface currents 403.

There is also provided an alternative method for further enhancing the production speed of the first physical area 280 by using a fixed unit image 180.

In accordance with an embodiment, forming said transformer 260 being characterized by forming the first physical area 280 delimited with a closed curve 230 on the conductive layer 150 for receiving said microwave signal from a first space angle 800 and re-emitting a ray 603 of said microwave signal to a second space angle 801, and forming said first physical area 280 to have at least one region with electrically conductive material and at least one region 214 without electrically conductive material, and forming said first physical area 280 to have a first effective area 281 for said re-emitted ray 603, by arranging the ratio of said first effective area 281 to said first physical area 280 being larger than the scaling factor, and forming said at least one region 214 without electrically conductive material using a fixed unit image 180 by repeatedly stamping said unit image along a primary processing direction 701 to produce multiple replicas of resonators 400 defined by said unit image.

In an embodiment, said fixed unit image being a mechanical tool.

In another embodiment, said fixed unit image being a laser projection mask 210 comprising predefined exposure sections 206.

Figure 5:
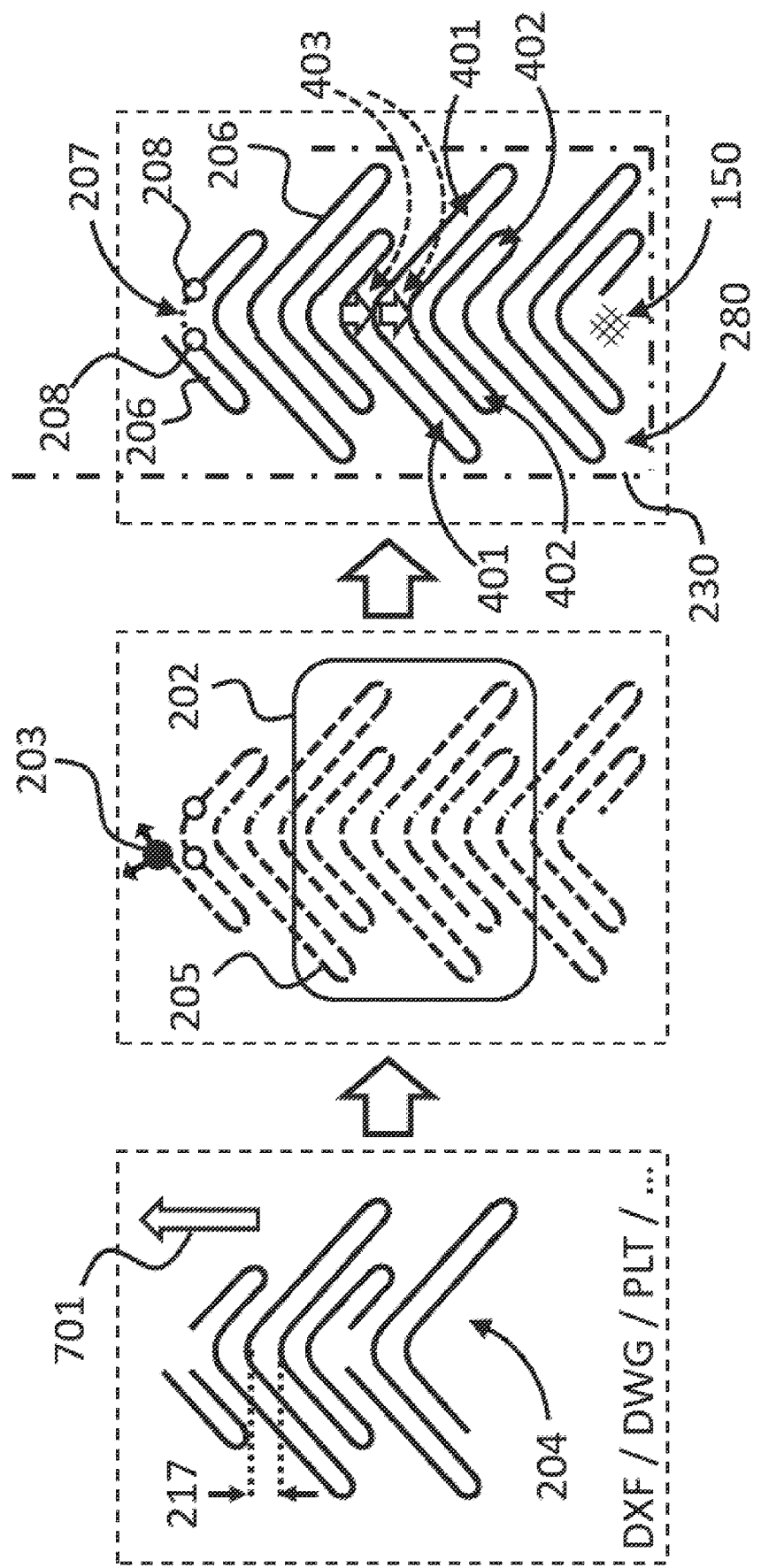
FIG. 5 shows an example of a method of fabricating the conductive layer 150 comprising said microwave transformer 260.

In FIG. 5, there is provided an example of a method of fabricating the conductive layer 150 comprising said microwave transformer 260, in accordance with an embodiment. In said example, there is presented the primary processing direction 701, a pre-defined trace 204, the projection path 205, the scanning region 202, and the beam projection 203. Furthermore, there is shown the closed curve 230 delimiting the first physical area 280, exposure sections 206 of the laser ablated areas, transition sections 207 between exposure sections 206 along the pre-defined trace 204, and transition points 208. Furthermore, there is shown a first set 401 of coupled microwave resonators and a second set 402 of coupled microwave resonators.

In an embodiment, applying said coupled microwave resonators 400 on the conductive layer 150 along the primary processing direction 701 by using the laser apparatus 200 is primarily characterized in: providing a laser beam 201 within the scanning region 202 of the laser apparatus 200, and a beam projection 203 to be positioned on the conductive layer 150 by intersecting said laser beam 201 with said conductive layer 150, and arranging said primary processing direction 701 along an axis on the surface of said conductive layer 150, deviating the position of said scanning region 202 along the surface of said conductive layer 150 at least partly on the direction of said primary processing direction 701 by moving the conductive layer 150 to a direction 702 that opposes said primary processing direction 701 and/or by moving said scanning region 202 of the laser apparatus 200 along said primary processing direction 701, and providing a pre-defined trace 204 for controlling the movement of said beam projection 203 along a projection path 205. And further in said method, using said pre-defined trace 204 to define N exposure sections 206 along said projection path 205 by using said exposure sections 206 to define segments of said projection path 205 where laser energy exceeding a threshold value is being concentrated on said beam projection 203, and using integer 1 or larger for N, and further using said projection path 205 to produce a first set 401 of mutually coupled microwave resonators by forming said at least two sets 215 of substantially parallel and uninterrupted paths 216 within regions without electrically conductive material, and forming said exposure sections 206 by repeatedly deflecting said beam projection 203 along said projection path 205 in a direction that is crossing said primary processing direction 701 by a distance of less than a pre-determined deflection, and arranging said first distance 217 to less than lambda/20 from each other to provide mutual electromagnetic coupling between said at least two sets 215 of substantially parallel and uninterrupted paths 216, wherein lambda equals the free space wavelength of the corresponding resonance frequency of a coupled microwave resonator of said first set 401 of mutually coupled microwave resonators.

In an embodiment, said pre-determined deflection being smaller than the first dimension 305 of the first physical area 280.

In an embodiment, said method being characterized in arranging the resonance frequency of said first set 401 of mutually coupled microwave resonators to the first frequency.

In accordance with an embodiment, said threshold value for the laser energy being arranged to sublimate a region of the conductive layer 150 from the location of the beam projection 203.

In an embodiment, applying said coupled microwave resonators 400 on the conductive layer 150 along the primary processing direction 701 by using the laser apparatus 200 is characterized in providing a displacement step for said beam projection 203 in the direction of said primary processing direction 701 while moving said beam projection 203 along said projection path 205, and providing an average position rate of change dy/dt exceeding 10 cm/s for said displacement step.

In an embodiment, applying said coupled microwave resonators 400 on the conductive layer 150 along the primary processing direction 701 by using the laser apparatus 200 is characterized in providing a cumulative length exceeding 5 cm for said exposure sections 206 that are crossing the direction of said primary processing direction 701 within a displacement step of 1 cm in the direction of said primary processing direction 701, or providing a cumulative length exceeding 50 cm for said exposure sections 206 that are crossing the direction of said primary processing direction 701 within a displacement step of 10 cm in the direction of said primary processing direction 701.

In an embodiment, applying said coupled microwave resonators 400 on the conductive layer 150 along the primary processing direction 701 by using the laser apparatus 200 is characterized in that the method comprises a step of connecting said at least two sets 215 of substantially parallel and uninterrupted paths 216 within regions without electrically conductive material along said projection path 205 by said transition sections 207 that connect two transition points 208 along said projection path 205, or using bends of said exposure sections, where said bends exceeding 45° angles or said bends having bending radiuses less than 5 mm.

In an embodiment, applying said coupled microwave resonators 400 on the conductive layer 150 along the primary processing direction 701 by using the laser apparatus 200 is characterized in that the method comprises a step of using said exposure sections 206 to produce a second set 402 of mutually coupled microwave resonators at a second microwave frequency range of a first polarization or at said first microwave frequency range of a second polarization by forming at least two sets 215 of substantially parallel and uninterrupted paths 216 within regions without electrically conductive material, and connecting said uninterrupted paths 216 along said projection path 205 by said transition sections 207 that connect two transition points 208 along said projection path 205, or using bends of said exposure sections, said bends exceeding 45° angles or said bends having bending radiuses less than 5 mm.

In an alternative embodiment, there is provided a method for fabricating said conductive layer 150 comprising said microwave transformer 260, wherein said method being characterized in forming said at least one region 214 without electrically conductive material of said first physical area 280 by applying coupled microwave resonators 400 on the conductive layer 150 along a primary processing direction 701 by using a laser apparatus 200, wherein said method comprises at least steps of: First, providing a plurality of scanning regions 202 on said conductive layer 150 by using at least two scanners, and providing a laser beam 201 for each of said plurality of scanning regions 202, and intersecting each of said laser beams 201 with the surface of said conductive layer 150; Second, deflecting at least one of said laser beams 201 in a direction that is crossing the direction of said primary processing direction 701; and third, synchronizing the deflection of said laser beams 201 within said plurality of scanning regions 202 with respect to a configurable coordinate axis on the surface of said conductive layer 150 by using a timer, motion sensor, image detection, or speed sensor.

In an alternative embodiment, there is provided a method for fabricating said conductive layer 150 comprising said microwave transformer 260, wherein the step of providing a substrate 151 with a conductive layer 150 comprises at least: Arranging a jumbo glass 108 to a glass cutting device 501, where said jumbo glass 108 having a conductive layer 150 formed therein; and providing a cutting layout and a cutting sequence for cutting said jumbo glass 108 into a plurality of unequally sized glass panes using a manual or an automated process of cutting layout optimization; and providing said substrate 151 as a glass pane 100 by cutting it out of said jumbo glass 108, said glass pane 100 having a thickness 109, and at least a first dimension 102 separating two edge sections 103 of said glass pane 100, said first dimension 102 being at least 50 centimeters in length, and at least one surface of said glass pane 100 having a surface area of at least 0.5 square meters; and detecting said glass pane 100 out of the plurality of unequally sized glass panes; and arranging said glass pane 100 to be processed with said laser apparatus 200 by positioning said glass pane 100 under the scanning region 202 of said laser apparatus 200 either by transferring said glass pane 100 to a laser working station or using an actuator 502 to transfer said scanning region 202 of said laser apparatus 200 over said glass pane 100.

In an embodiment, providing said substrate 151 as a glass pane 100 further comprises removal of the conductive layer from the edges of said glass pane 100 using appropriate edge deletion apparatus, and washing and/or tempering said glass pane 100 before assembling said glass pane 100 into an insulation glass unit 106.

In the example shown in FIG. 3b, there is presented a first resonant node 405 of the electric field, wherein said first resonant node 405 being arranged within said at least one region 214 without electrically conductive material.

There is also presented a second resonant node 406 of the electric field, wherein said second resonant node 406 being arranged within said at least one region 214 without electrically conductive material, and wherein said second resonant node 406 being arranged to offset the first resonant node 405 in the direction of the first dimension 305.

In an advantageous embodiment, the first physical area 280 comprises at least one region 214 without electrically conductive material, wherein the first effective area 281 being arranged with a first set 401 of resonators forming an array of the first resonant nodes 405, wherein said first resonant nodes 405 having a standing wave node, and wherein said at least one region 214 without electrically conductive material further comprises a second set 402 of resonators forming an array of the second resonant nodes 406, wherein said second resonant nodes 406 being arranged to offset the first resonant nodes 405 in the direction of the first dimension 305, and wherein said first 405 and second 406 resonant nodes being comprised by the same unit image 180.

In the example of FIG. 3b, there is also presented a third resonant node 407 of the electric field, wherein said third resonant node 407 being arranged within said at least one region 214 without electrically conductive material, and wherein said third resonant node 407 being arranged to offset either the first resonant node 405 or the second resonant node 406 in the direction of the first dimension 305, and wherein said first 405, second 406, and third 407 resonant nodes being comprised by the same unit image 180.

Figures 10A, 10B, 10C:
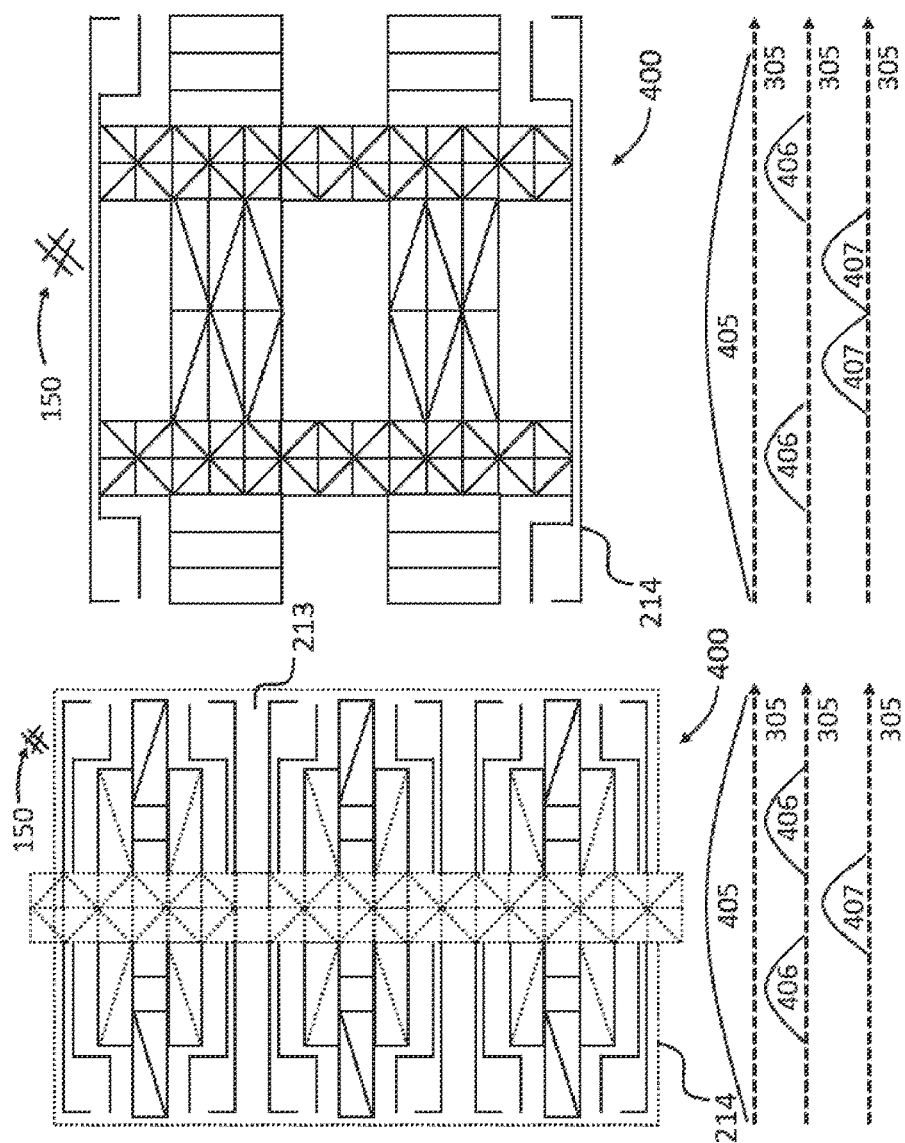
FIGS. 10a to 10c
show numerous examples of offsetting the nodes.

Additionally, FIGS. 10a-10c show different examples of offsetting the resonant nodes. In these examples, the nodes are being offset in the direction of the first dimension 305. The gained benefit from said offsetting is obtained in enhanced efficiency of each resonators, when the coherent current segments that couple each resonator arrays at the first, second, or third frequency are not interfered by resonators having the resonant node at another frequency.

In an embodiment, said at least one region 214 without electrically conductive material is arranged with a plurality of exposure sections 206, wherein said at least one region 214 without electrically conductive material comprise uninterrupted paths 216 within said regions 214 without electrically conductive material, wherein said uninterrupted paths 216 comprise self-intersecting paths.

The advantage of offsetting the resonant nodes may improve the effectiveness of each resonator. This is due to the fact that the coherent current segments 403 corresponding to each of the coupled resonators, may couple more effectively to another resonator of the same kind. In other word, coupled resonators at the first frequency become more effective when the currents of said resonators are arranged to couple mutually without disruptions. Another resonator that is targeted to operate at another frequency or polarization, may be advantageously arranged in such configuration that the coherent current segments 403 forming the mutual coupling of the resonators 400 of the first frequency are not disturbed.

In an embodiment, said at least one region 214 without electrically conductive material is arranged with a plurality of exposure sections 206, wherein said at least one region 214 without electrically conductive material comprise uninterrupted paths 216 within said regions 214 without electrically conductive material on a repeating sequence 212, wherein said uninterrupted paths 216 comprise self-intersecting paths.

In another embodiment, said at least one region 214 without electrically conductive material is arranged with a single continuous exposure section 206.

In another embodiment, said at least one region 214 without electrically conductive material is arranged with a single exposure section 206, wherein said exposure section comprises an uninterrupted path 216 within said region 214 without electrically conductive material, wherein said uninterrupted path 216 comprise a self-intersecting path.

In an alternative embodiment, there is provided a method for forming said first physical area 280 to have at least one region with electrically conductive material and at least one region 214 without electrically conductive material, said method being characterized by modifying the properties of the conductive layer 150 without removing said layer 150. Said method comprises at least providing said substrate 151 with said conductive layer 150 in form of a glass pane 100, and using a laser apparatus 200 for surface treatment or sintering of said conductive layer 150. Said method of modifying the properties of the conductive layer 150 may be advantageously used to increase the quality value of the microwave resonators 400, or to reduce transmission line loss, or the maintain a coating layer on glass without visually observable openings.

In an embodiment, the method being characterized in providing said substrate 151 with said conductive layer 150 in form of a glass pane 100, and forming said at least one region 214 without electrically conductive material by decaying the electrical conductivity of the conductive layer 150 inside said region 214 by increasing the sheet resistance of the conductive layer 150 at least by a factor of 100 using a laser apparatus 200.

In an embodiment, the method being characterized in increasing the electrical conductivity of the conductive layer 150 around said at least one region 214 without electrically conductive material using a laser apparatus 200.

Isolation of a First and Second Set of Resonators

Figure 6A:
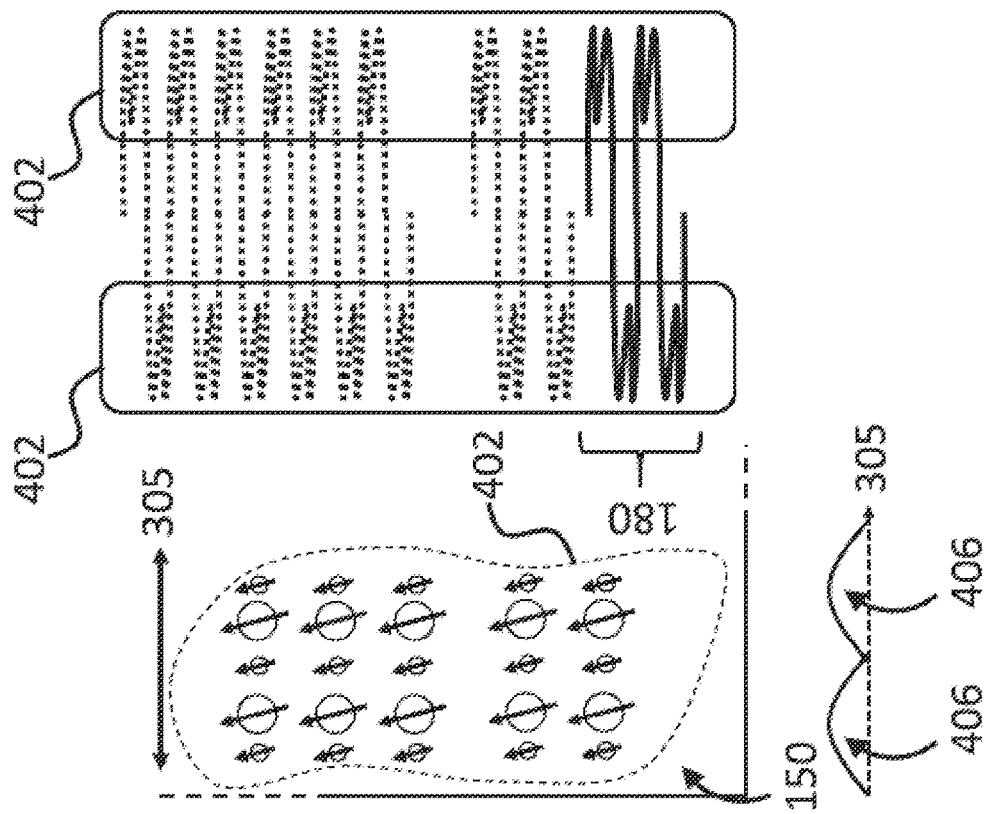
FIGS. 6a and 6b
i. show examples of the first and second set of resonators.
Figure 6B:
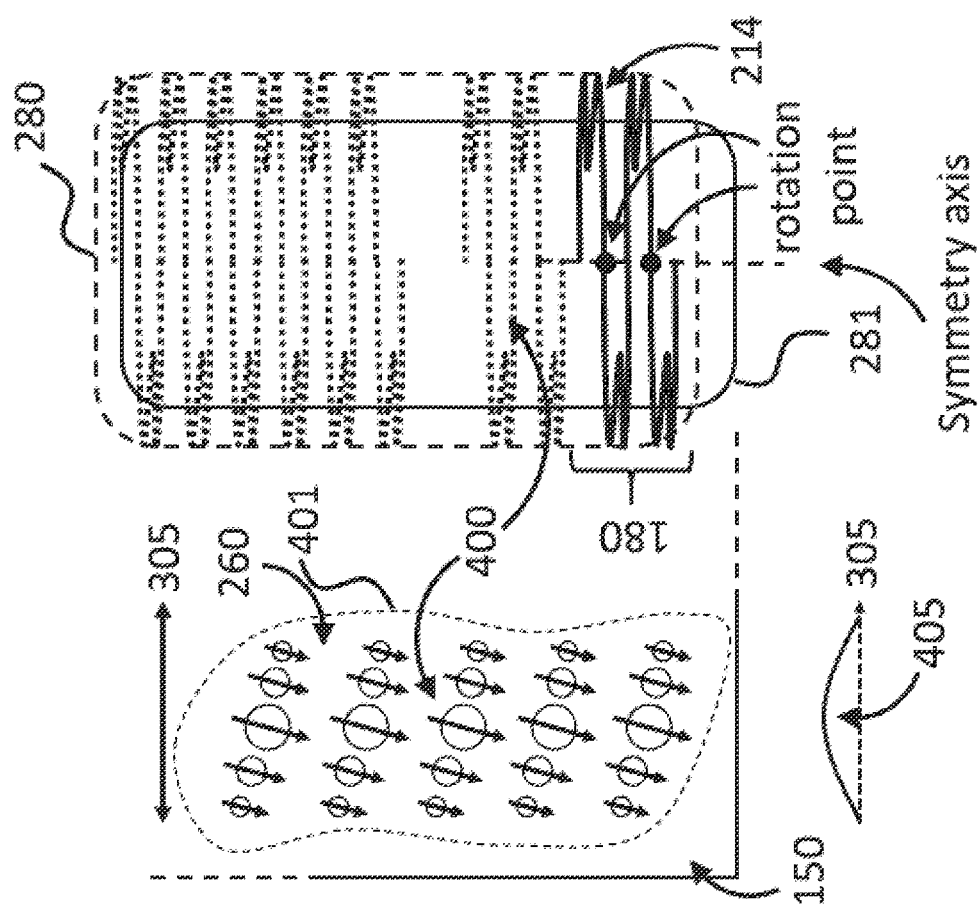

FIGS. 6a and 6b present examples of advantageous embodiments with a symmetry axis or a rotation point. FIG. 6a shows a first set of resonators 401, and FIG. 6b shows a second set of resonators within the first physical area 280, wherein the first 401 and second 402 set of resonators being isolated in the frequency domain.

In the example of FIG. 6a the first physical area 280 comprises at least one region 214 without electrically conductive material, wherein the first effective area 281 being arranged with said first set 401 of resonators forming an array of the first resonant nodes 405, wherein said first resonant nodes 405 having a standing wave node, and wherein said at least one region 214 without electrically conductive material further comprises said second set 402 of resonators forming an array of the second resonant nodes 406, wherein said second resonant nodes 406 being arranged to offset the first resonant nodes 405 in the direction of the first dimension 305, and wherein said first 405.

In an embodiment, the second set 402 of resonators being arranged to isolate an array of the second resonant nodes 406 from the array of the first resonant nodes 405 in spatial domain, frequency domain, or in polarization domain.

In an embodiment, said first 405 and second 406 resonant nodes are arranged within the same region 214 without electrically conductive material and within the first physical area 280.

In another embodiment, said first 405 and second 406 resonant nodes are arranged within separated regions 214 without electrically conductive material and within the first physical area 280.

A Process for Mass Production

In accordance with an embodiment, there is provided a system 900 for fabricating a conductive layer 150 comprising a microwave transformer 260.

In an embodiment of the present disclosure, said system 900 comprises means for forming said transformer 260 comprising a first physical area 280 delimited with a closed curve 230 on the conductive layer 150 for receiving said microwave signal from a first space angle 800 and re-emitting a ray 603 of said microwave signal to a second space angle 801. Said system 900 further comprising means for forming said first physical area 280 with at least one region with electrically conductive material and at least one region 214 without electrically conductive material. Said system 900 further comprising means for forming said first physical area 280 with at least one region with electrically conductive material and at least one region 214 without electrically conductive material comprising at least a laser apparatus 200. Said system 900 further comprising means for forming said first physical area 280 with a first effective area 281 for said re-emitted ray 603, wherein the ratio of said first effective area 281 to said first physical area 280 being larger than the scaling factor, and means for arranging the conductive layer 150 with a second physical area 250 delimited with a closed edge curve 227 and a second effective area 251 for said re-emitted ray 603, wherein the ratio of said second effective area 251 to said second physical area 250 being smaller than twice the scaling factor.

In another embodiment of the present disclosure, said system 900 comprises means for arranging the ratio of said first physical area 280 to said second physical area 250 being smaller than twice the scaling factor, and means for arranging the ratio of said first effective area 281 to said first physical area 280 being at least two times as large as the ratio of said second effective area 251 to said second physical area 250.

In another embodiment of the present disclosure, the system 900 comprises means for providing said conductive layer 150 or a substrate 151 comprising said conductive layer 150 with any of added metal pads, laminated circuit boards, printed electronics components, printed conductors, printed insulation layers, printed diodes, printed transistors, or printed solar cells to be connected with said microwave transformer 260.

In a preferred embodiment, said system 900 is arranged as a part of an insulation glass unit 106 factory.

In a preferred embodiment, said system 900 is arranged for mass production of insulation glass units 106.

Figure 7:
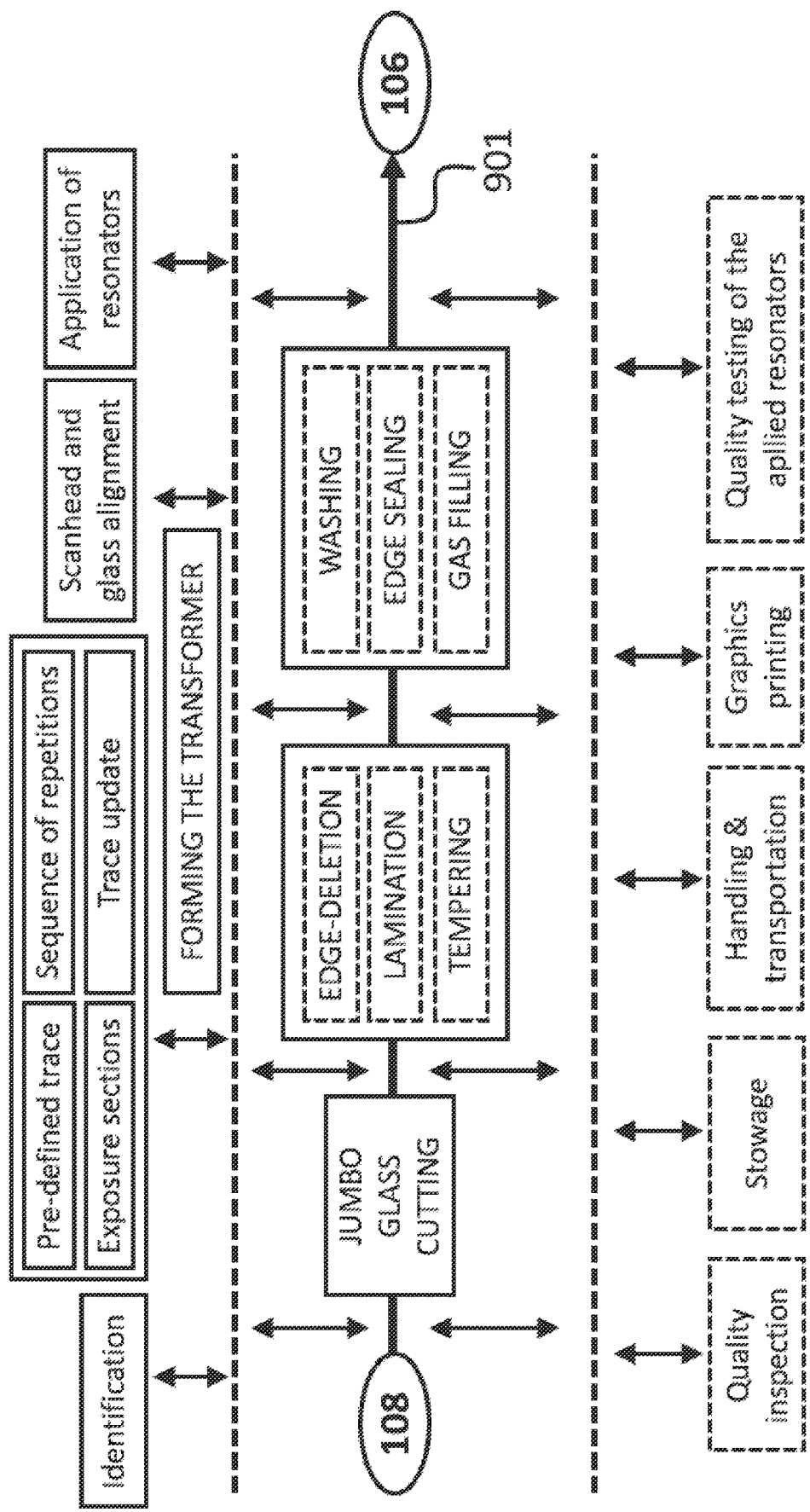
FIG. 7 shows a process flow for producing insulation glass units 106 out of jumbo glasses in a repeating process.

In FIG. 7, there is provided a process flow 901 for producing insulation glass units 106 out of jumbo glasses 108 in a repeating process, and using the method for fabricating the conductive layers 150 according to the present disclosure.

Figure 8B:
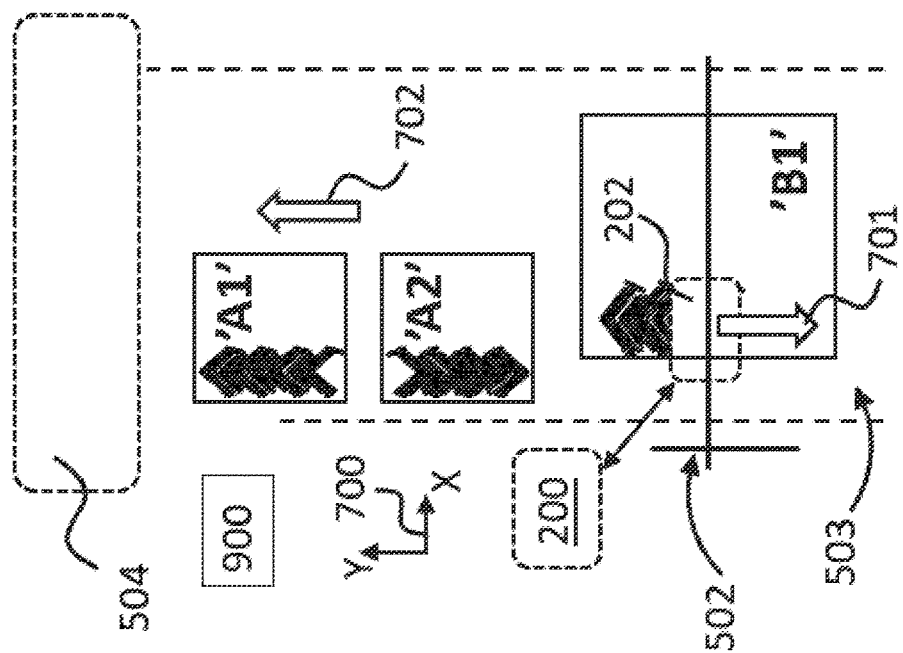
FIGS. 8a and 8b
show examples of a system for fabricating the conductive layer comprising the microwave transformer.
Figure 8A:
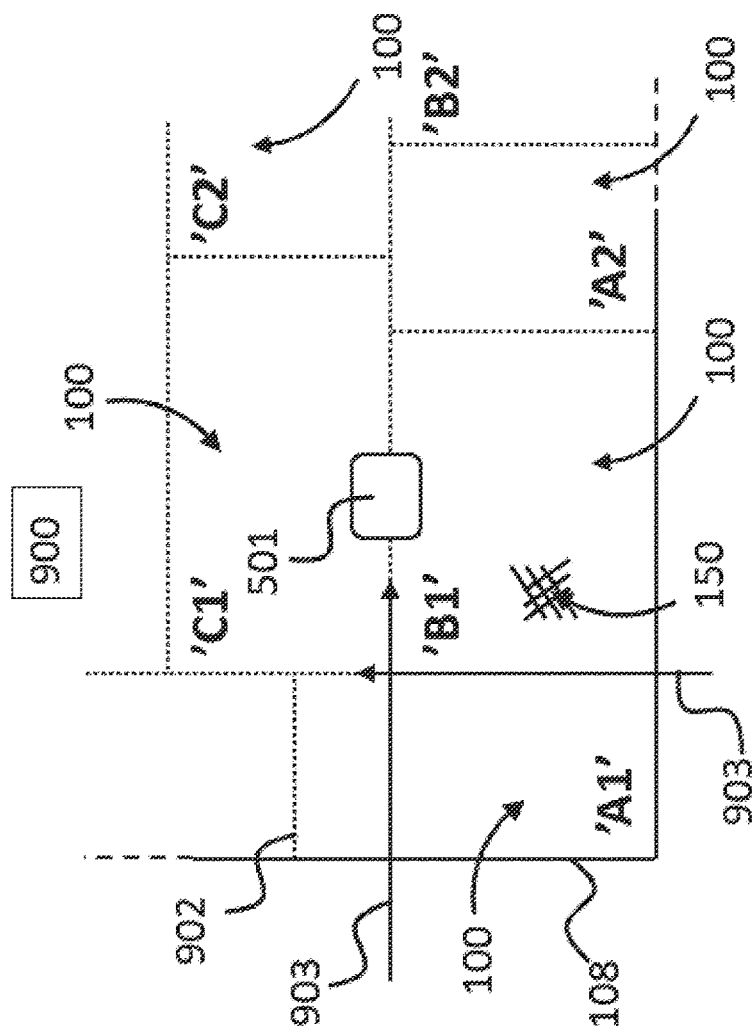

FIGS. 8a and 8b present examples of a system 900 for fabricating the conductive layer 150 comprising the microwave transformer 260.

In the example of FIG. 8a, the resonators 400 are applied while cutting the glass panes 100 out of jumbo glass 108. There is provided a glass cutting device 501, and a plurality of unequally sized glass panes 100, from which identified glass panes 100 are arranged as insulation glass units 106. The example of FIG. 8a presents glass panes 100 of a first product, referred to as 'A1' and 'A2', glass panes 100 of a second product, referred to as 'B1' and 'B2', and glass panes 100 of a third product, referred to as 'C1' and 'C2'. The dotted lines 902 illustrate borders of the glass panes in the jumbo glass 108, wherein the glass cutting device 501 is instructed to cut the glass via those lines 902. The arrows 903 illustrate some directions of movement of the glass cutting device 501. In accordance with an embodiment, the system 900 comprises means for identifying said glass panes 100 of separated products. Said products being insulation glass units 106.

In an embodiment, said means for identifying said glass panes 100 comprises automated identification system.

In another embodiment, said means for identifying said glass panes 100 comprises visual means.

In another embodiment, said means for identifying said glass panes 100 comprises a timing sequence and/or scheduling production of individual glass panes 100.

In a preferred embodiment, said system 900 comprises: means for producing insulation glass units 106 with an arrangement for cutting glass panes 100 out of jumbo glasses 108, where said glass panes 100 being arranged to be assembled into said insulation glass units 106, and means for identifying the glass panes 100 for forming transformers 260, and a dedicated process flow 901 for translating said identified glass panes 100 into said insulation glass units 106 with applied microwave resonators 400 in a repeating process, and means for forming said transformers 260 on said identified glass panes 100 during the execution of said dedicated process flow 901 with an application of microwave resonators 400.

In the example of FIG. 8b, there is provided an example of the system 900, in accordance with an embodiment. In said example, the system 900 comprises a processing station 504, a conveyor 503, and means for forming the transformer 260 on the conductive layer 150, wherein said conductive layer 150 being comprised by a glass pane 100, and said means for forming the transformer 260 comprise at least a laser apparatus 200.

In an embodiment, said laser apparatus 200 is connected to an actuator 502.

In an embodiment, said system 900 comprises: means for cutting said glass panes 100 from at least one jumbo glass 108, where said means for cutting said glass panes 100 comprises means for at least partly automated cutting layout generation and a cutting sequence generation, and a plurality of conveyors 503 to connect a plurality of processing stations 504, said plurality of processing stations comprising at least two of a glass cutting device 501, a tempering furnace 505, a glass washing unit 506, a gas filling station 507, an edge spacer assembler 508, or a lamination station 508.

In an embodiment, said system 900 comprises means for quality testing of the applied resonators 400.

In an embodiment, said means for quality testing comprises at least a device transmitting diagnostics signals at the frequencies of at least two inter-band carrier bands of a wireless communication system, and an arrangement to illuminate the applied microwave signals with said diagnostics signals, and to receive the diagnostics signals after said diagnostics signals being interacted with the applied resonators 400, and procedure to compare the fingerprints of the applied resonators 400 on the diagnostics signals to known reference values, wherein the fingerprints being defined by the magnitude and/or phase values of the diagnostics signals.

Examples of the Projection Paths

FIGS. 9a-9h, present numerous examples of the projection paths 205.

In FIG. 9a, there is provided an example of the resonators, in accordance with an embodiment. In said example, there is presented the primary processing direction 701, the projection path 205, and a sample of an exposure section 206 of the laser ablated area.

The example presents at least one region 214 without electrically conductive material, wherein said at least one region 214 comprises coupled microwave resonators 400 on a repeating sequence 212, wherein said repeating sequence 212 being provided with multiple replicas of a unit image along the primary processing direction 701, wherein said coupled microwave resonators 400 being sensitive at least to a first polarization, and said coupled microwave resonators 400 being connected to said at least one region 214 without electrically conductive material, wherein said at least one region 214 comprise at least two sets of substantially parallel and uninterrupted paths 216, wherein said at least two sets being formed by coiled segments of said parallel and uninterrupted paths 216, wherein said uninterrupted paths 216 being separated by a first distance 217, and said uninterrupted paths 216 having an uninterrupted length of at least 20 times said first distance 217, and wherein said coupled microwave resonators 400 being coupled by means of coherent segments of surface currents 403 in said conductive layer 150, and said first distance 217 being arranged in the direction of said coherent segments of surface currents 403.

The example also illustrates how substantially parallel and uninterrupted paths 216 may be coiled to arrange coupled microwave resonators 400.

Furthermore, FIG. 9b shows how the substantially parallel and uninterrupted paths 216 may be formed using the projection path 205. In said example, the substantially parallel and uninterrupted paths 216, or coiled segments of said parallel and uninterrupted paths 216 may be used to form substantially parallel sets of said paths 216.

The substantially parallel and uninterrupted path 216 is a mathematical curve that may be fitted inside a region 214 without electrically conductive material to illustrate the trace that is formed on the conductive layer 150. It may therefore be described as a section of the projection path 205, on which laser energy over a threshold has been focused on said paths 205, and where an exposure section 206 has created a region 214 without electrically conductive material.

In the example shown in FIG. 9b, there is presented a first resonant node 405 of the electric field, wherein said first resonant node 405 being arranged within said at least one region 214 without electrically conductive material. There is also presented a second resonant node 406 of the electric field, wherein said second resonant node 406 being arranged within said at least one region 214 without electrically conductive material, and wherein said second resonant node 406 being arranged to offset the first resonant node 405 in the direction of the first dimension 305.

In an advantageous embodiment, the first physical area 280 comprises at least one region 214 without electrically conductive material, wherein the first effective area 281 being arranged with a first set 401 of resonators forming an array of the first resonant nodes 405, wherein said first resonant nodes 405 having a standing wave node, and wherein said at least one region 214 without electrically conductive material further comprises a second set 402 of resonators forming an array of the second resonant nodes 406, wherein said second resonant nodes 406 being arranged to offset the first resonant nodes 405 in the direction of the first dimension 305, and wherein said first 405 and second 406 resonant nodes being comprised by the same unit image 180.

In the example of FIG. 9b, there is also presented a third resonant node 407 of the electric field, wherein said third resonant node 407 being arranged within said at least one region 214 without electrically conductive material, and wherein said third resonant node 407 being arranged to offset both the first resonant node 405 and the second resonant node 406 in the direction of the first dimension 305, and wherein said first 405, second 406, and third 407 resonant nodes being comprised by the same unit image 180.

In the examples shown in FIG. 9c and FIG. 9d, there are presented a first resonant node 405 of the electric field, wherein said first resonant node 405 being arranged within said at least one region 214 without electrically conductive material. There is also presented a second resonant node 406 of the electric field, wherein said second resonant node 406 being arranged within said at least one region 214 without electrically conductive material, and wherein said second resonant node 406 being arranged to offset the first resonant node 405 in the direction of the first dimension 305.

In the example of FIG. 9e, there is also presented a third resonant node 407 of the electric field, wherein said third resonant node 407 being arranged within said at least one region 214 without electrically conductive material, and wherein said third resonant node 407 being arranged to offset both the first resonant node 405 and the second resonant node 406 in the direction of the first dimension 305.

Furthermore, in the FIG. 9e, there is presented line 209 of reduced impedance. The line 209 of reduced impedance may be advantageously arranged to connect with the resonators 400 using a characteristic impedance that is arranged to lower the transmission line loss in a thermally efficient coating. A conventional transmission line that is arranged to 50Ω characteristic impedance can be shown to provide excessive transmission line losses. This results due to the fact that the ohmic square resistance (or sheet impedance) sums quickly in a long transmission line to deteriorate the signal strength.

In an embodiment, the conductive layer 150 comprises a line 209, wherein said line 209 comprises at least a positive line and a negative line, wherein said positive line and said negative line being formed on the conductive layer 150, and separated by an exposure section 206, and said positive or negative line having a line width, and said separating exposure section 206 having a gap width, wherein said line width being at least 30 times said gap width, and said gap width being less than 0.25 mm.

In an advantageous embodiment, said gap width being less than 0.1 mm, and said line width being larger than 5 mm.

In an advantageous embodiment, said line 209 being a coplanar line.

In another advantageous embodiment, said line 209 being a slot line.

In an advantageous embodiment, said line 209 being a connected to an external device, wherein said external device comprising means to interact with a resonator 400 on which said line 209 being connected to, wherein said interaction comprising at least electromagnetic interaction.

In another advantageous embodiment of the present disclosure, the conductive layer 150 comprises any of added metal pads, laminated circuit boards, printed electronics components, printed conductors, printed insulation layers, printed diodes, printed transistors, or printed solar cells to be connected with said microwave transformer 260, wherein said connection being arranged at least partly with a line 209, wherein said line 209 comprises at least a positive line, a negative line, wherein said positive line and a negative line being formed on the conductive layer 150, and separated by an exposure section 206, and said positive or negative line having a line width, and said separating exposure section 206 having a gap width, wherein said line width being at least 30 times said gap width, and said line width being at least 5 mm, and said line 209 being connected to at least one resonator 400 with electromagnetic means.

In another advantageous embodiment, there is provided the conductive layer 150 with the transformer 260 according to the present disclosure, wherein said conductive layer 150 or said transformer 260 further comprises means to couple an external antenna, a cable, a rigid or flexible printed circuit board (PCB) or a capacitive or inductive loading element to be coupled and/or connected with any of the resonators 400 comprised by the transformer 260.

In another embodiment, there is provided a method, wherein the method being characterized in forming a line 209 of reduced impedance on the conductive layer 150 and arranging said line 209 to be connected with at least one of said microwave resonators 400, wherein forming said line 209 of reduced impedance comprises at least forming a positive line having a line width and forming a gap to separate a negative line from the positive line, and arranging said line 209 of reduced impedance to have a characteristic impedance less than 50Ω.

In an advantageous embodiment, the characteristic impedance of the line 209 of reduced impedance is between 5Ω and 35Ω.

In another advantageous embodiment, the is provided means for matching the line 209 of reduced impedance to a range from 40Ω to 55Ω.

The examples of FIG. 9f-9h show examples of the projection path 205, in accordance with an embodiment. The example of FIG. 9g shows how the projection path 205 may be arranged to isolate the coherent segments of surface currents 403 of the first frequency from the isolated current segments of the second frequency 403' of a first polarization, and from the isolated current segments of the second frequency 403" of a second polarization. In said example, the corresponding nodes 405, 406, and 407 are isolated in spatial domain, frequency domain, and polarization domain.

The examples of FIGS. 9d, 9g and 9h show examples of the projection path 205, wherein said projection path 205 is arranged to form self-intersecting paths of the uninterrupted paths 216.

Additionally, FIGS. 10a-10c show different examples of offsetting the resonant nodes. In said examples, the nodes are being offset in the direction of the first dimension 305. The coherent current segments that couple each resonator arrays at the first frequency are flowing between the longest resonators in the direction that is perpendicular to the first dimension 305 in said example. Further, in the presented example, the coupling current segments of the second and third frequency are not interfered by resonators of the first frequency.

In the example of FIG. 10a, there is also shown an example of a DC-coupled are 213, which is arranged by offsetting the exposure sections 206 of the laser-treated path to facilitate the coupling of a DC-current in between the offset exposure sections, and to facilitate a high impedance for a surface current at the microwave frequencies.

Figure 11:
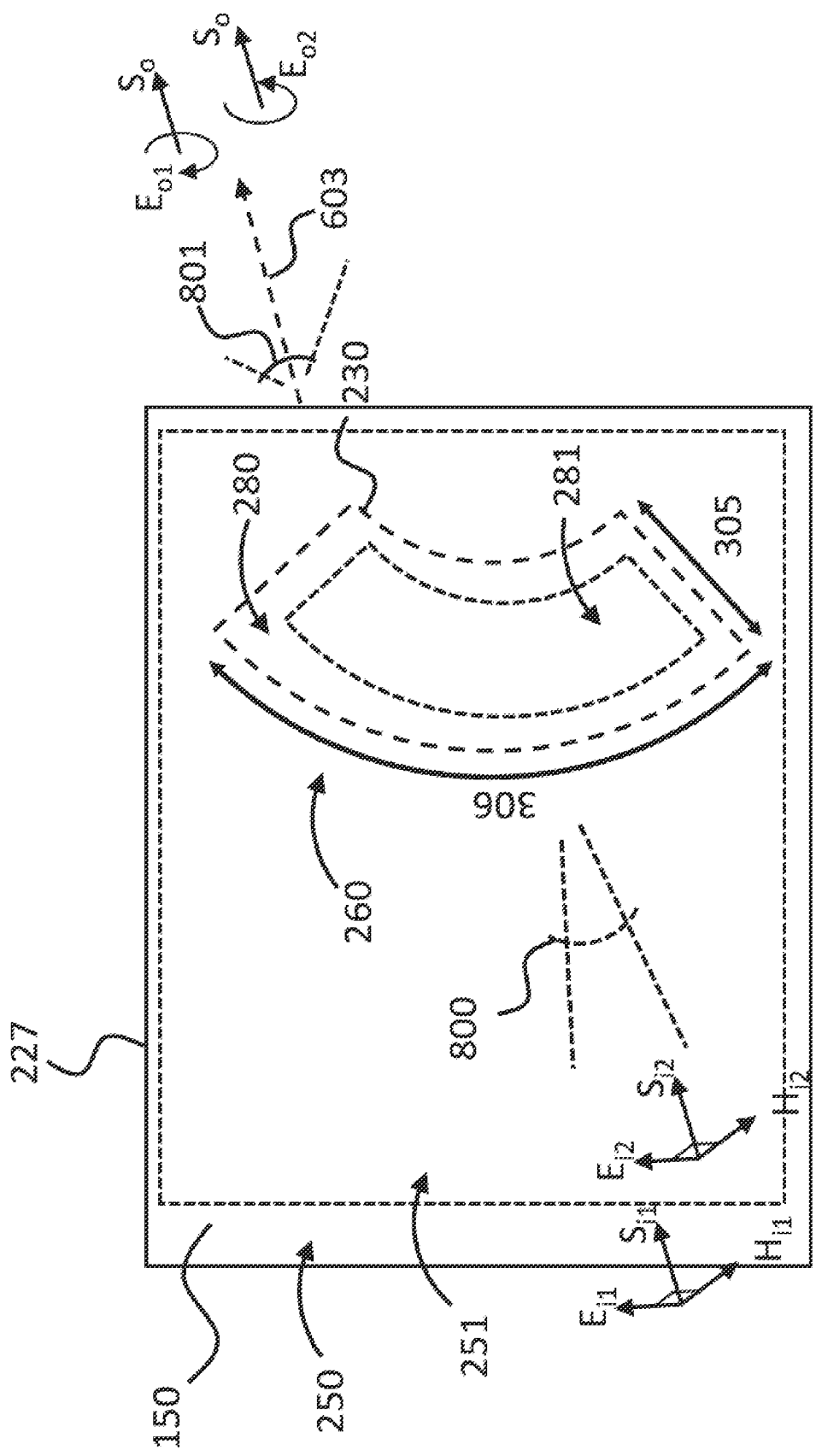
FIG. 11 shows an example of a conductive layer comprising a microwave transformer for scaling the intensity of a microwave signal.

FIG. 11 shows an abstraction of an alternative embodiment of the conductive layer 150 according to the present disclosure. In the example, there is provided the microwave transformer 260 for scaling the intensity of a first signal by transforming the energy of an incident linear polarization into a rotational polarization by dividing the received linear polarization component into two crossing polarization components with a phase delay between said components, and re-emitting said rotationally polarized signal through the conductive layer, wherein said scaling being provided by means of a rotational translation of the resonators 400.

An advantage of said polarization transformation is that, for example with metallic window blinds an electromagnetic signal of a wireless communication system becomes vertically polarized due to the metallic blinds. A conductive layer 150 according to the present disclosure, in an arrangement with metallic window blinds, can make a communication connection more reliable by reducing the sensitivity to the receiving antenna orientation in the room.

In an alternative embodiment, the rotational array of resonators 400 may be arranged to translate two received signals of the first frequency and of two crossing linear polarizations into two oppositely rotating re-emitted signals in the direction of the re-emitted ray 603.

In the example of FIG. 11, there is provided a signal of a first frequency and a first polarization, and a signal of a first frequency, and a second polarization.

In an embodiment, the signal of said second polarization is an aggregated component for the signal of the first polarization, wherein said aggregated component being configurable as a diversity or multiple-input-multiple-output (MIMO) channel of a wireless communication system.

In the example of FIG. 11, the signal of the first frequency and first polarization is arriving from the first space angle 800, and comprising an oscillating electric field vector ($E_{i1}$) defining a polarization plane, and a corresponding magnetic field vector ($H_{i1}$), and a Poynting vector defining the propagation direction of the incident electromagnetic field intensity ($S_{i1}$). There is also presented a first re-emitted signal with a re-emitted ray 603 in the second space angle 801, said ray comprising a first rotationally polarized electric field vector ($E_{o1}$), which rotationally polarized first signal comprising a rotation direction, and two linear polarization components with a phase delay.

There is also provided the signal of the first frequency and second polarization, arriving from the first space angle 800, and comprising an oscillating electric field vector ($E_{i2}$) defining a polarization plane, and a corresponding magnetic field vector ($H_{i2}$), and a Poynting vector defining the propagation direction of the incident electromagnetic field intensity ($S_{i2}$). There is also presented a second re-emitted signal in the direction of the re-emitted ray 603 of the second space angle 801, said signal comprising a second rotationally polarized electric field vector ($E_{o2}$), which rotationally polarized second signal comprising a rotation direction, and two linear polarization components with a phase delay, wherein the rotation direction of the second signal being opposite to the rotation direction of the first signal.

In an embodiment, there is provided a conductive layer 150 comprising a microwave transformer 260 for receiving and re-emitting a microwave signal and an aggregated component for said microwave signal, wherein said conductive layer 150 being arranged to re-emit said microwave signal through said conductive layer 150 with a scaled intensity, wherein said scaled intensity being scaled by a scaling factor.

In an embodiment, said microwave signal being a signal of a first frequency and a first polarization, said aggregated component being a signal of a first frequency, and a second polarization, wherein said first and second polarizations being linear and crossing polarizations of the received signals.

In an embodiment, in a rotational translation of said signals, said scaling factor being between 0.05 and 0.95.

In an embodiment, said transformer 260 comprising a first physical area 280 delimited with a closed curve 230 on the conductive layer 150 for receiving said microwave signal from a first space angle 800 and re-emitting a ray 603 of said microwave signal to a second space angle 801, wherein said transformer 260 being arranged to scale the intensity of the received linear polarization of the microwave signal in said second space angle 801 by translating a part of the energy carried by the first received polarization component into a first and a second re-emitted polarization component of the microwave signal in the direction of the re-emitted ray 603, and producing a phase offset between said first and said second re-emitted polarization components of the microwave signal, and further, said transformer 260 being arranged to scale the intensity of the received linear polarization of the aggregated component in said second space angle 801 by translating a part of the energy carried by the received polarization component of the aggregated component into a first and a second re-emitted polarization component of the aggregated component in the direction of the re-emitted ray 603, and producing a phase offset between said first and said second re-emitted polarization components of the aggregated component, and said first and second re-emitted polarization component of the microwave signal forming a first rotationally polarized signal having a first rotation direction, and said first and second re-emitted polarization component of the aggregated component forming a second rotationally polarized signal having a second rotation direction, wherein said second rotation direction being opposite to the first rotation direction.

In an embodiment, said first physical area 280 having at least one region with electrically conductive material and at least one region 214 without electrically conductive material, wherein said at least one region 214 without electrically conductive material being connected to coupled microwave resonators 400 of the first frequency, wherein at least two of said coupled microwave resonators 400 being sensitive to the first received linear polarization at said first frequency, and at least two of said coupled microwave resonators 400 being sensitive to the second received linear polarization at said first frequency, and at least two of said coupled microwave resonators 400 being arranged to couple the resonators of the first and second polarization by a rotational transformation of said resonators on the plane of the conductive layer 150 in order to create the first and second rotationally polarized signals; wherein said coupled microwave resonators 400 being coupled by means of coherent segments of surface currents 403 between said resonators 400 in said conductive layer 150.

FIGS. 12a and 12b show examples of rotational arrays of said resonators 400.

In the examples of FIGS. 12a and 12b, the primary processing direction 701 is translated into a rotational path to provide the rotational array of resonators 400 to translate one and/or two crossing and linear polarizations into one and/or two oppositely rotating signals of the first frequency.

In the example of FIG. 12b, according to an embodiment, there is provided the first set of mutually coupled resonators 401 and the second set of mutually coupled resonators 402, wherein said first and second set of resonators being offset in the direction of the radius of the rotational path of the primary processing direction 701.

FIG. 12a shows an example of a a first sector 290 and a second sector 291 of the rotationally translated microwave resonators 400, wherein a coherent current segment 403' is arranged to be launched at the first moment of time (T1), when the microwave signal of the first linear polarization is received by at least the two resonators being sensitive to said polarization, and said at least two resonators being comprised by the first sector 290. A time-hopping sequence of coupling currents 403 occurs rotationally by the arrangement of the resonators in a rotational array in said conductive layer 150, such that at least two of the resonators being comprised by the second sector 291 receive part of the energy carried by the signal of the first polarization, and with an arrangement where said second sector 291 is rotated to facilitate sensitivity to the second and crossing polarization, a time delay causes the total re-emitted signal of the rotational array to facilitate rotational polarization. The resonators of the second sector 291 that are arranged to be sensitive to the second polarization, start to resonate with a time delay (T1+ΔT) with respect to the resonators of the first sector 290.

In an embodiment, said at least two coupled microwave resonators 400 being sensitive to the first received linear polarization at said first frequency being comprised by a first sector 290 of the rotationally translated microwave resonators 400, and said at least two of said coupled microwave resonators 400 being sensitive to the second received linear polarization at said first frequency being comprised by a second sector 291 of the rotationally translated microwave resonators 400, and said first 290 and second 291 sectors being separated by the rotational translation, and the resonators of said sectors being coupled by means of the coherent segments of surface currents 403 between rotationally translated resonators 400 that couple the resonators of the first sector 290 to the resonators of the second sector 291.

In an embodiment, said first physical area 280 having a first dimension 305 and a second dimension 306, wherein said microwave transformer 260 being arranged to expand the coverage area of the microwave signal at the first frequency where the bistatic radar cross section (RCS) is less than 3 dB smaller than the peak RCS of the re-emitted ray 603 of said microwave signal, wherein said coverage area being expanded by a factor of at least two with respect to the 3 dB RCS coverage area of an equivalent physical area that is equal to the physical area of said conductive layer 250 but wherein said conductive layer 250 is absent, wherein said coverage expansion being provided with an arrangement where the ratio of the first dimension 305 to the second dimension 306 being smaller than 0.5.

In an embodiment, said conductive layer 150 being arranged on a substrate 151, wherein said first effective area 281 of the microwave signal at the first frequency being arranged to be at least twice as large as an equivalent square area of said substrate 151 at the first frequency wherein the conductive layer 150 on the equivalent square area is absent, and wherein both the width and height of the equivalent square area being equal to the first dimension 305.

In an embodiment, the first physical area 280 further comprises microwave resonators of a second frequency range, wherein the resonators of the second frequency comprise a region of rotational translation, and wherein said resonators of the second frequency being arranged to offset the coherent segments of surface currents 403 that couple at least two resonators of the first frequency.

In an embodiment, there is also provided a conductive layer 150 comprising a microwave transformer 260 for receiving a first microwave signal of a first frequency and having a first linear polarization component, and a second microwave signal of the first frequency and having a second linear polarization component, wherein said conductive layer 150 being arranged to re-emit said microwave signals through said conductive layer 150 with a scaled intensity, wherein the intensity of said first and said second linear components being scaled from the received signals by a scaling factor, wherein said transformer 260 comprising a first physical area 280 delimited with a closed curve 230 on the conductive layer 150 for receiving said microwave signals from a first space angle 800 and re-emitting said signals to a second space angle 801, wherein said transformer 260 being arranged to scale the intensity of the first signal in said second space angle 801 by a scaling factor of less than 0.5 in a polarization plane defined by said first linear polarization component of said first microwave signal in said first space angle 800, and to scale the intensity of the second signal in said second space angle 801 by a scaling factor of less than 0.5 in a polarization plane defined by said second linear polarization component of said second microwave signal in said first space angle 800, wherein said transformer 260 comprising at least one region 214 without electrically conductive material, said region 214 being connected to a first set of mutually coupled microwave resonators 401, where the resonance frequency of said first set of resonators 401 being arranged to the first frequency, and the resonators 400 of said first set of resonators 401 being arranged to scale the intensity of the first signal by transforming said first signal into right-handed circular polarization (RHCP) in said second space angle 801, and to scale the intensity of the second signal by transforming said second signal into left-handed circular polarization (LHCP) in said second space angle 801, wherein said RHCP and LHCP signals being created by means of rotational translation of the first set of mutually coupled microwave resonators 401, wherein said mutually coupled resonators being coupled by means of coherent segments of surface currents 403 between the resonators 400 of said first set of resonators 401 in said conductive layer 150.

In an embodiment, said conductive layer 150 being arranged to receive a third microwave signal of a second frequency range and having a first linear polarization component, and a fourth microwave signal of a second frequency range and having a second linear polarization component, wherein said conductive layer 150 being arranged to re-emit said microwave signals of the second frequency through said conductive layer (150) with an arrangement where of coupled microwave resonators 400 wherein the signals of the second frequency being received by microwave resonators 400 that are resonant at the second frequency range and being coupled by coherent current segments 403 at the second frequency range, and said resonators 400 of the second frequency range being arranged to transform the first and second linear polarization components of the signals of the second frequency range to rotationally polarized signals by means of a rotational transformation of said resonators 400 of the second frequency range, and the coherent current segments 403 of the coupled resonators of the second frequency range being arranged to offset the coherent current segments 403 of the coupled resonators of the first frequency range.

Figure 13:
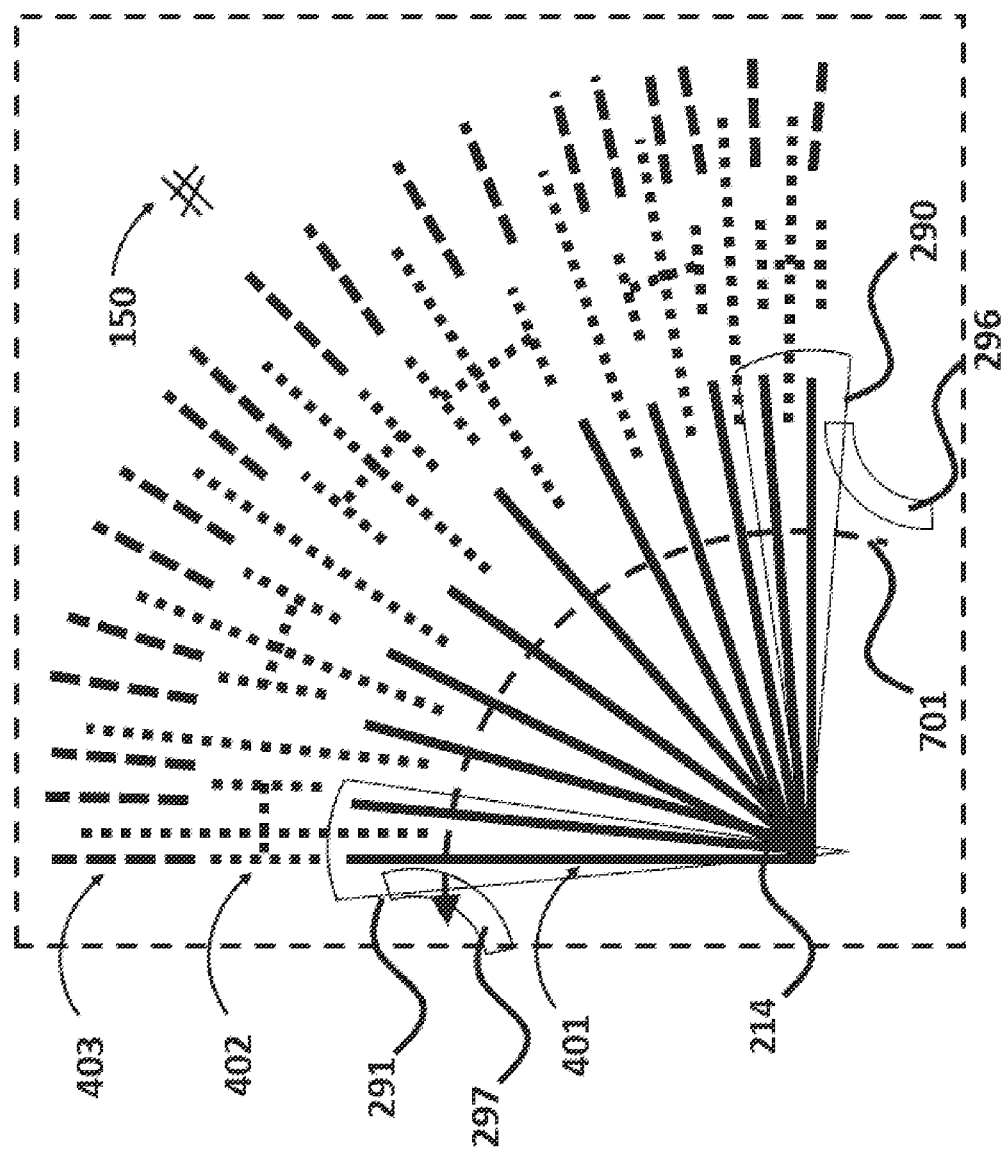
FIG. 13 shows an example of a rotational array with first and second sector being connected to conductive members.

FIG. 13 shows another example of the rotational array, wherein the rotational array comprises conductive members to facilitate connection to a wireless radio device.

In an embodiment, at least two of the coupled microwave resonators of the first set of resonators 401 being sensitive to the first received linear polarization at said first frequency, wherein said at least two resonators being comprised by a first sector 290, and at least two of the coupled microwave resonators of the first set of resonators 401 being sensitive to the second received linear polarization at said first frequency, wherein said at least two resonators being comprised by a second sector 291, and said first 290 and second 291 sectors being separated by the rotational translation, and the resonators of said sectors being coupled by means of the coherent segments of surface currents 403 between rotationally translated resonators 400 that couple the resonators of the first sector 290 to the resonators of the second sector 291, wherein a first conductive member 296 being arranged to couple electromagnetically to said first sector 290, wherein said first conductive member 296 being connected to a wireless radio module.

Figure 14B:
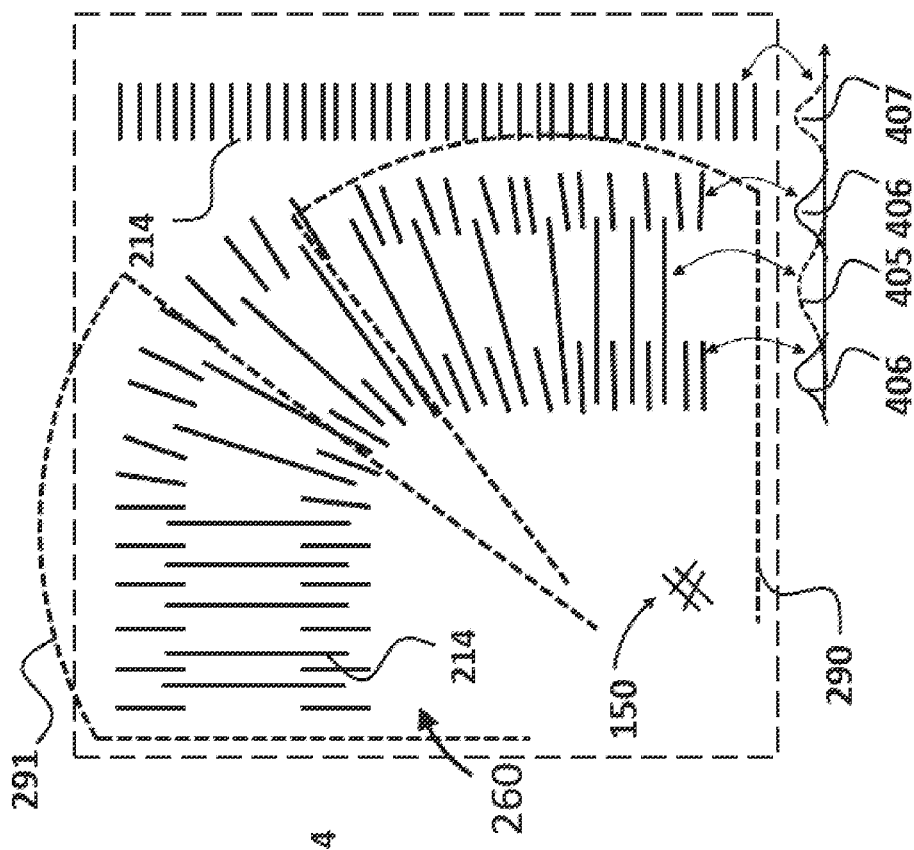
FIGS. 14a and 14b
show examples of rotational transformations.
Figure 14A:
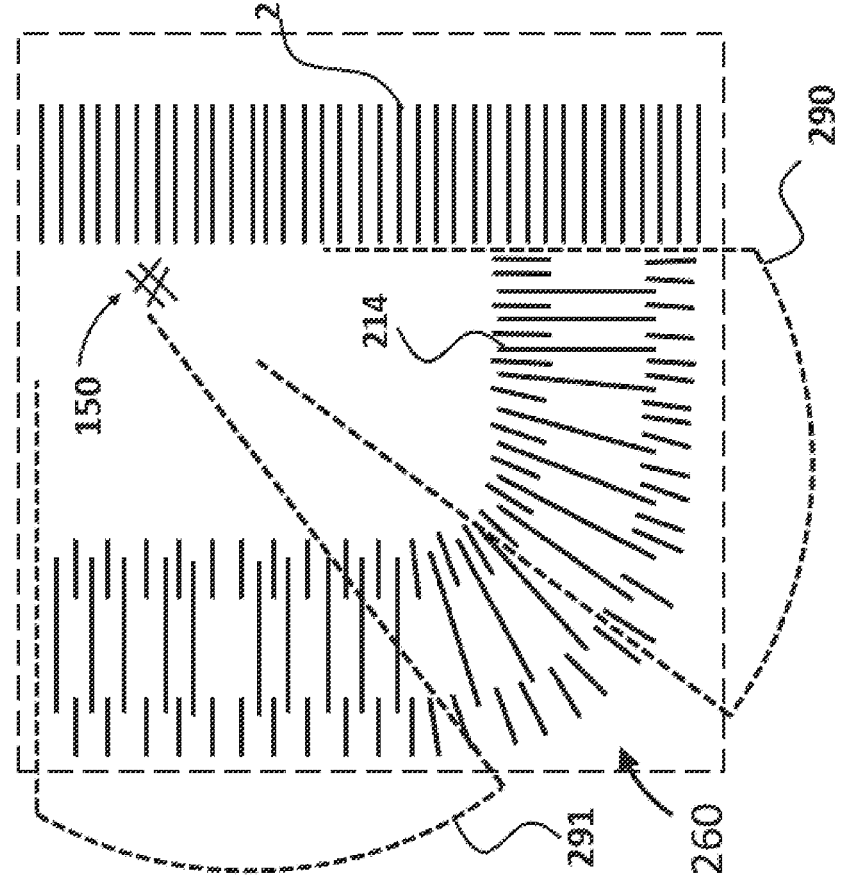

FIGS. 14a and 14b show examples of the rotational transformations of the transformer 260.

In an alternative embodiment, there is also provided a method for fabricating a conductive layer 150 comprising a microwave transformer 260 for receiving a rotationally polarized microwave signal of a first frequency from a first side of said conductive layer 150, and translating said rotationally polarized signal into linearly polarized signal to the other side of the conductive layer 150, characterized in providing the conductive layer 150 according to the present disclosure, and configuring said conductive layer 150 in electromagnetic coupling with a first conductive member 296, and configuring said first conductive member 296 to couple electromagnetically to a first sector 290 of the rotationally translated microwave resonators 400 in said conductive layer 150 to facilitate the translation of the received rotationally polarized signal into a linearly polarized component by means of the coherent segments of surface currents 403 between said resonators 400 in said conductive layer 150.

In an additional embodiment, said method being characterized in translating said conductive layer 150 into a device that is capable of transmitting two oppositely rotating circularly polarized microwave signals at the first frequency by providing the microwave resonators 400 in electromagnetic coupling with a first conductive member 296, and configuring said first conductive member 296 to couple electromagnetically to a first sector 290 of the rotationally translated microwave resonators 400 in said conductive layer 150 to facilitate the translation of the received rotationally polarized signal into a linearly polarized component by means of the coherent segments of surface currents 403 between said resonators 400 in said conductive layer 150.

Further in said method, providing a first sector 290 of the rotationally translated microwave resonators 400 of the first frequency in electromagnetic coupling with a first conductive member 296, and configuring said first conductive member 296 to couple to a first sector 290 of the rotationally translated microwave resonators 400, and providing a second sector 291 of the rotationally translated microwave resonators 400 of the first frequency in electromagnetic coupling with a second conductive member 297, and configuring said second conductive member 297 to couple to a second sector 291 of the rotationally translated microwave resonators 400, and providing said first 296 and second 297 conductive member in connection with a phasing arrangement, wherein in said phasing arrangement an input signal at the first terminal being arranged to facilitate a signal of right-hand circular polarization to be emitted by the first set of resonators 401, and an input signal at the second terminal being arranged to facilitate a signal of left-hand circular polarization to be emitted by the first set of resonators 401, and said phasing arrangement being arranged to provide isolation of at least 10 dB between said first and second terminal.

Said method being further characterized in providing said resonators 400 on a repeating sequence along a primary processing direction 701, by arranging said primary processing direction along a radial curve.

Said method being further characterized in providing said resonators 400 with a rotational symmetry with respect to a symmetry reference, and with a mirrored symmetry with respect of a symmetry plane.

Retrofittable Transformer

In accordance with an embodiment, there is provided a method for fabricating said conductive layer 150 comprising said microwave transformer 260, wherein said conductive layer 150 being on a glass substrate 151, wherein said method is characterized by providing said substrate 151 with said conductive layer 150 as a part of an insulation glass unit 106, and forming said transformer 260 on the conductive layer 150 using retrofitting means.

Figure 15A:
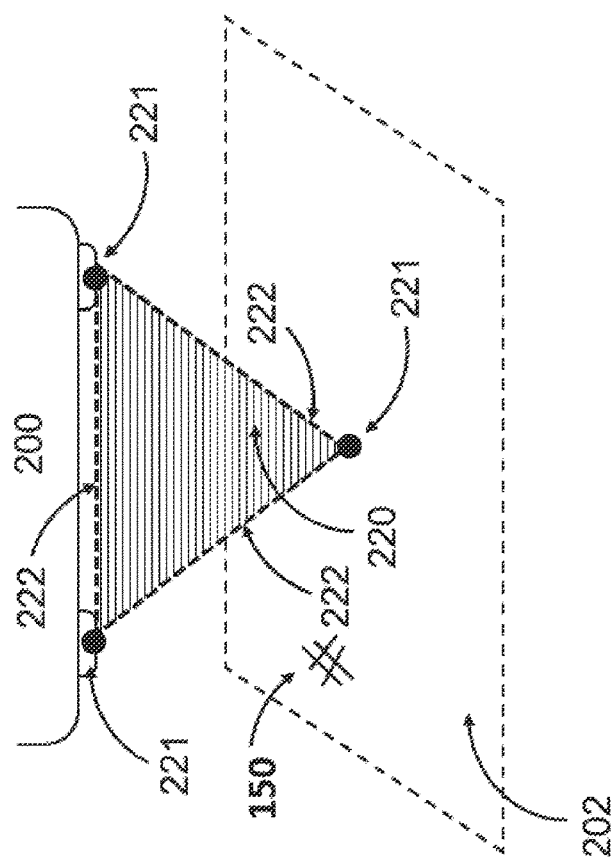
FIGS. 15a and 15b
show examples of using an area to align the laser apparatus.
Figure 15B:
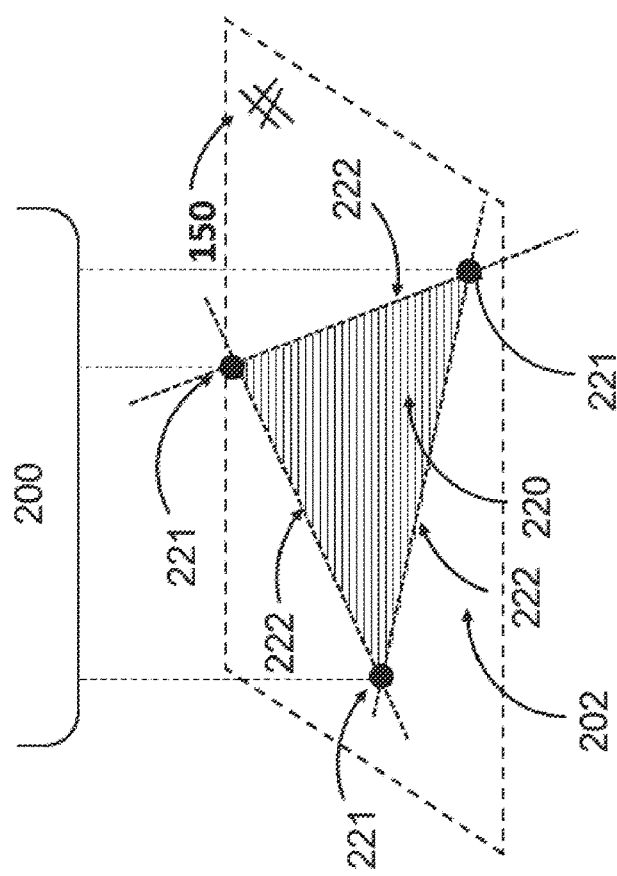

FIGS. 15a and 15b show a method of using an area 220 to align the laser apparatus 200 with the conductive layer 150.

In an embodiment, said retrofitting means comprises at least a step of using an area 220 to align the laser apparatus 200 and the surface of said substrate 151 and to position the scanning region 202 with the conductive layer 150, wherein said area being obtained with at least three points 221 having a projection on said conductive layer 150, wherein each two of said three points form a line in between said points, and each two of said lines cross each other, and said at least three points form said area, and said area being larger than 2 cm$^2$, and the angle between any two of said three lines being less than 160 degrees, wherein said area being positioned on the surface of the substrate 151.

In an embodiment, said retrofitting means comprises at least a step of using an area 220 to align the laser apparatus 200 and the surface of said substrate 151 and to position the scanning region 202 with the conductive layer 150, wherein said area on the substrate 151 being obtained with at least three points 221 having a linear projection on said conductive layer 150, and said at least three points 221 forming said area 220 in a plane that is perpendicular to the surface of the substrate 151, wherein each two of said three points form a line in between said points, and each two of said lines cross each other, and said at least three points form said area, and said area being larger than 2 cm2, and the angle between any two of said three lines being less than 160 degrees, and said three points being formed with a laser line, wherein one point marks the position of a laser emitter, one point marks the position of a laser detector, and a third point marks a position on the surface of the substrate 151.

In an embodiment, said retrofitting means comprises at least means to emit a laser signal from the first point 221, and to translate the reflection from the third point 221 located on the glass pane 100 into distance and alignment information of the laser apparatus 200 with respect to the glass pane 100, wherein the reflected signal being detected at the second point 221.

In accordance with another embodiment, there is provided a method for fabricating said conductive layer 150 comprising said microwave transformer 260, wherein said conductive layer 150 being on a glass substrate 151, wherein said method is characterized in providing said substrate 151 with said conductive layer 150 as a part of an insulation glass unit 106, and forming said transformer 260 on the conductive layer 150 using the system 900 for fabricating said conductive layer 150 comprising a microwave transformer 260, wherein said system 900 is a portable system that is adapted for retrofitting.

In accordance with another embodiment, there is provided a method for fabricating said conductive layer 150 comprising said microwave transformer 260, wherein said conductive layer 150 being on a glass substrate 151, wherein said method is characterized in providing said substrate 151 with said conductive layer 150 as a part of an insulation glass unit 106, and forming said transformer 260 on the conductive layer 150 using the system 900 for fabricating said microwave transformer 260, wherein said system 900 is a portable system that is adapted for retrofitting.

In an alternative method of retrofitting said microwave transformer 260, there is provided a method characterized in providing said substrate 151 with said conductive layer 150 as a part of a train window, and forming said transformer 260 on the conductive layer 150 using retrofitting means, wherein said retrofitting means comprising at least phases of providing a train on a train depot, and arranging the scanning region 202 of the laser apparatus 200 on the surface of a window of said train, and positioning a shadowing object on the side of the train window that opposes the side of the laser apparatus 200, and applying said resonators 400 and deviating the position of said scanning region 202 along the surface of said conductive layer 150 at least partly along a primary processing direction 701, wherein said primary processing direction 701 is arranged in a vertical direction.

In an alternative embodiment, there is provided a device as a railgun, wherein said railgun is arranged to facilitate the application of the microwave transformer 260 on a train glass with retrofitting means, when the train is positioned within the scanning region of the laser apparatus 200.

DC-Coupled Low-Pass Filter for Enhanced Speed and Less Visible Traces

In an embodiment, there is provided an alternative method of providing the regions 214 without electrically conductive material. In an aim to provide a laser treated path without said electrically conducive material 214, the path may be treated with laser apparatus to facilitate the formation of a frequency dependent region that allows the direct-current (DC) flow in between adjacent laser treated spots, i.e. exposure sections 206. When the laser spots are being fired at processing parameters that sublimate a region of the conductive layer inside the laser beam projection 203 such that a minor region in between two adjacent spots that are arranged to offset each other is formed, said minor region between two spots may be arranged as a low-pass filter.

In an aim to provide the microwave transformer of the present disclosure as a retrofitted solution, the use of the DC-coupled low-pass filter is of particular benefit. It has been investigated that, when a hermetically sealed insulation glass unit has spacers in between, and made of plastic material, a retrofitted ablation trace may cause formation of the ablation remnants on the surface of said spacer. With the present DC-coupled low-pass filter, the amount of ablated spots is significantly reduced. This leads also into another benefit of producing smaller amount of remnants, which may leave to improved production quality in retrofitting solutions.

Figure 16B:
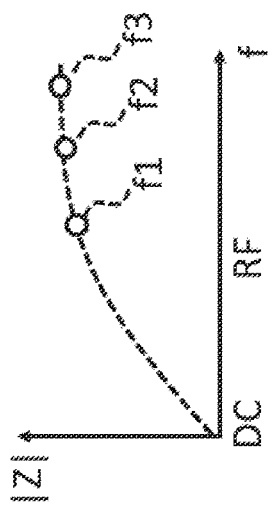
FIGS. 16a to 16c
show examples of DC-coupled low-pass filters.
Figure 16C:
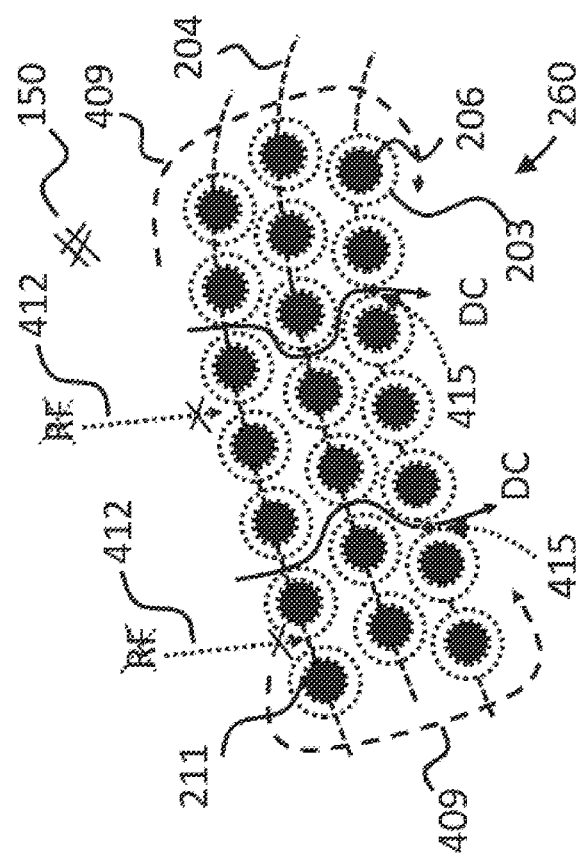
Figure 16A:
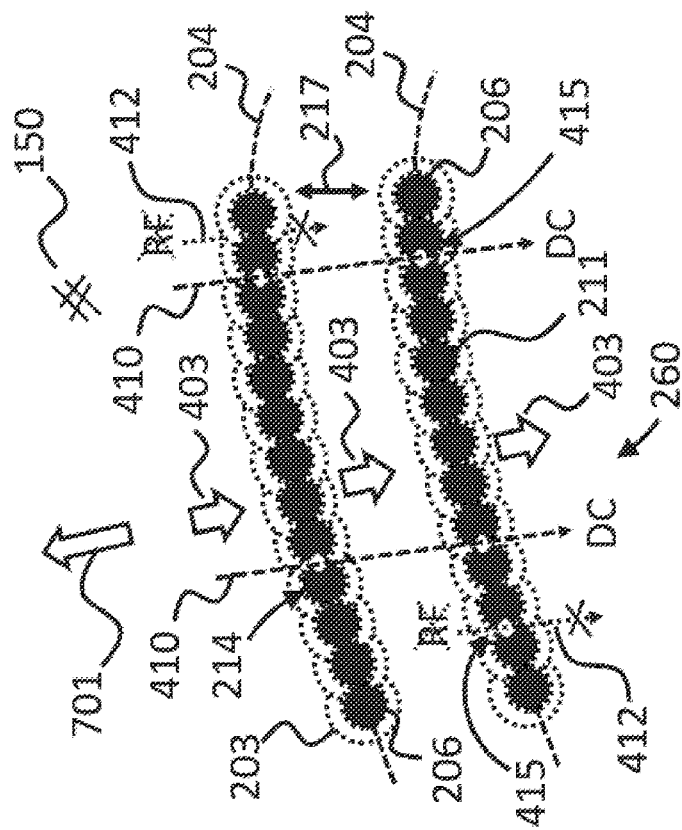

In FIGS. 16*a*-16*c*, there are provided examples of a DC-coupled low-pass filter, in accordance with embodiments. In FIGS. 16*a* and 16*c* there are provided examples of laser-treated segments that are arranged as DC-coupled low-pass filters. In FIG. 16*b* there is provided an illustrative example of the frequency-dependent impedance for a surface current aimed to flow from one side of an array 211 of exposure sections that are configured as DC-coupled low-pass filters. The first frequency of the microwave signal is denoted as "f1", the second frequency is denoted as "f2", and a third frequency is denoted as "f3". In an embodiment the first, second, and third frequency are inter-band carriers of a wireless communication system. An example of such communication system may be, e.g. 4G or 5G.

In the examples of FIGS. 17*a* and 17*b*, there are provided further examples of the DC-coupled low-pass filter. In the example of FIG. 17*a*, there are shown DC-coupled areas 213 that are formed by arranging the DC-coupled low-pass filter at least partly to form a perimeter of a surface area. In the example of FIG. 17*b*, there are shown coherent current segments 403' and 403" that are arranged to flow in a direction that crosses the offsetting direction of the exposure sections 206, wherein the current segments 403' and 403" may be isolated in frequency and/or polarization domain.

The DC current 410 may see a low-impedance path in between the spots of the array 211. The radio frequency (RF) current 410 in the conductive layer exhibits a high impedance, which is formed by the inductive and/or resistive regions caused by the offset of the exposure sections.

In the examples of FIG. 18*a*-18*c* there are shown examples of exposure sections that are arranged to provide DC-coupled areas in connection with fully opened ablation paths. The DC-coupled low-pass filters may be arranged to cross the laser ablated traces that are formed with fully opened traces. In said examples, the conductive layer comprises areas that may be arranged to isolate one polarization at a first frequency range, and to pass through two crossing polarization at the second frequency range.

The region 214 without electrically conductive material may be described as a section of the projection path 205 of the laser beam projection 203, on which laser energy over a threshold has been focused on said paths 205, and where an exposure section 206 has created a region 214 without electrically conductive material. Said threshold of the laser energy is a sublimation threshold, or ablation threshold, at which the conductive layer is vaporized from solid form, when aimed at the beam projection 203.

In accordance with an embodiment, said threshold value for the laser energy being arranged to sublimate a region of the conductive layer 150 from the location of the beam projection 203.

In an embodiment, there is provided a conductive layer 150 comprising a microwave transformer 260, said transformer 260 being arranged for bistatic scattering of a microwave signal of a first frequency through said conductive layer 150, characterized in that said transformer 260 comprising a first physical area 280 delimited with a closed curve 230 on the conductive layer 150 for receiving said microwave signal from a first space angle 800 and re-emitting a ray 603 of said microwave signal to a second space angle 801, and; said first physical area 280 having at least one region with electrically conductive material and at least one region 214 without electrically conductive material, wherein said at least one region 214 without electrically conductive material being arranged as a DC-coupled low-pass filter to form a first effective area 281 for said re-emitted ray 603 at the first frequency, and said DC-coupled low-pass filter being arranged with a plurality of exposure sections 206 of a laser beam, wherein said exposure sections 206 being offset from each other by a distance that facilitates a DC current flow in between said exposure sections 206 in a direction that crosses the offsetting direction, and; said offsetting distance being arranged to facilitate a high-impedance path for a surface current at the first frequency in the direction that crosses the offsetting direction.

In another embodiment, said exposure sections 206 being offset by a distance that is less than twice the diameter of the laser beam projection 203 that is being used to fabricate said exposure sections 206 to provide a narrow region of the conductive layer 150 in between said offset exposure sections 206.

In another embodiment, said exposure sections 206 being offset by a distance that is less than 500 um and the diameter of the exposure sections 206 being less than 100 um to provide a narrow region of the conductive layer 150 in between said offset exposure sections 206 to facilitate a filter impedance 415 between said offset exposure sections 206, wherein said filter impedance 415 being arranged to exhibit a low-pass frequency response with DC-coupled component.

In another embodiment, said exposure sections 206 being arranged as an array 211 of exposure sections, wherein said array 211 of exposure sections comprise exposure sections 206 that are being offset from each other, and said exposure sections 206 being arranged by sublimating a region of the conductive layer 150 with laser energy exceeding the sublimation threshold of the conductive layer 150, and the regions within said laser beam projections 203 where the laser energy undercuts said sublimation threshold being arranged to overlap each other to facilitate the formation of the DC-coupled low-pass filter for surface currents flowing in between said exposure sections 206.

In an embodiment, the DC-coupled low-pass filters may be combined with segments of the ablated areas that are treated to be fully open. Said arrangement may be used to provide regions with frequency- and polarization dependent characteristics.

In another embodiment, said DC-coupled low-pass filter of the at least one region 214 without electrically conductive material being connected to coupled microwave resonators 400, wherein said resonators 400 being sensitive at least to a first polarization at the first frequency.

In another embodiment, said DC-coupled low-pass filter of the at least one region 214 without electrically conductive material being formed as coupled microwave resonators 400, wherein said resonators 400 being resonant at the first frequency.

In another embodiment, said at least one region 214 without electrically conductive material that forms the DC-coupled low-pass filter being arranged to form a first set 401 of resonators forming an array of first resonant nodes 405 with an array 211 of exposure sections.

In another embodiment, said at least one region 214 without electrically conductive material that forms the DC-coupled low-pass filter being arranged to form a second set 402 of resonators forming an array of second resonant nodes 406 with an array 211 of exposure sections.

In another embodiment, said at least one region 214 without electrically conductive material being arranged to form regions of the first 401 or second 402 set of resonators with continuous paths of the exposure sections 206, and said continuous paths of the exposure sections 206 being arranged to cross the array 211 of exposure sections that form a region with DC-coupled low-pass filter.

In another embodiment, said at least one region 214 without electrically conductive material that forms the DC-coupled low-pass filter being arranged to mark a plurality of DC-coupled areas 213 on said conductive layer 150 to facilitate said first effective area 281 within said first physical area 280.

In another embodiment, said DC-coupled areas 213 being arranged configurable for a DC bias voltage. Said DC bias voltage may be applied to power a radio device, sensor, or an antenna tuning component such as a transistor or a semiconductor diode.

In the example of FIG. 16c, there is shown an arrangement where the array 211 of exposure sections is arranged as a slot radiator that is configured to be a shorted surface at the DC frequencies.

In an embodiment, the common-mode current 409 at the first frequency is arranged to bypass the array 211, wherein the array 211 is arranged as a slot radiator at the first frequency. In said arrangement, the filter 415 is arranged to provide the high impedance for the surface current at the first frequency, which translates the array 211 as a virtual aperture at the first frequency.

In another embodiment, said DC-coupled low-pass filter being arranged as a frequency dependent loading impedance for a slot radiator in said conducive layer 150.

There is also provided a method for increasing the bistatic radar cross section through a conductive layer 150 by forming a microwave transformer 260 on said conductive layer 150, wherein said transformer 260 being arranged for bistatic scattering of a microwave signal of a first frequency through said conductive layer 150, characterized by providing a substrate (151) with a conductive layer 150; forming said transformer 260 by forming a plurality of DC-coupled areas 213 on said conductive layer 150 by marking regions of said areas 213 with a DC-coupled low-pass filter, and forming said DC-coupled low-pass filter with an array 211 of exposure sections of a laser beam on said layer 150 by offsetting a plurality of exposure sections 206 of said array 211 by a distance to facilitate a DC current flow in between said exposure sections 206 in a direction that crosses said offset direction, and limiting said offsetting distance to facilitate a filtering impedance 415 with high-impedance path for a surface current at the first frequency in the direction that crosses the offsetting direction.

In an embodiment of said method, limiting said offsetting distance to a distance that is less than twice the diameter of the laser beam projection 203 on said conductive layer 150 that is being used to fabricate said exposure sections 206.

In another embodiment of said method, forming said exposure sections 206 by sublimating regions of the conductive layer 150 within laser beam projections 203 on said conductive layer 150 by concentrating laser energy exceeding the sublimation threshold of the conductive layer 150, and overlapping the areas of the beam projections 203 where the laser energy undercuts said sublimation threshold to form narrow paths of the conductive layer that facilitate said high-impedance path between the exposure sections 206.

In an embodiment, applying coupled microwave resonators 400 on the conductive layer 150 along the primary processing direction 701 by using the laser apparatus 200 is characterized in: providing a laser beam 201 within the scanning region 202 of the laser apparatus 200, and a beam projection 203 to be positioned on the conductive layer 150 by intersecting said laser beam 201 with said conductive layer 150, and arranging said primary processing direction 701 along an axis on the surface of said conductive layer 150, deviating the position of said scanning region 202 along the surface of said conductive layer 150 at least partly on the direction of said primary processing direction 701 by moving the conductive layer 150 to a direction that opposes said primary processing direction 701 and/or by moving said scanning region 202 of the laser apparatus 200 along said primary processing direction 701, and providing a predefined trace 204 for controlling the movement of said beam projection 203 along a projection path. And further in said method, using said pre-defined trace 204 to define N exposure sections 206 along said projection path 205 by using said exposure sections 206 to define segments of said projection path 205 where laser energy exceeding a sublimation threshold value is being concentrated on said beam projection 203, and using integer 1 or larger for N, and further using said projection path 205 to produce a first set 401 of mutually coupled microwave resonators by forming said at least two sets 215 of substantially parallel and uninterrupted paths 216 within regions without electrically conductive material, and forming said exposure sections 206 by repeatedly deflecting said beam projection 203 along said projection path in a direction that is crossing said primary processing direction 701 by a distance of less than a predetermined deflection, and defining integer N to offset a plurality of said exposure sections 203 from each other.

In another embodiment of said method, arranging said filtering impedance 415 to exhibit a stopband comprising said first frequency of the microwave signal with an inductive path in between said exposure sections 206.

In an alternative embodiment, the method for producing the conductive layer may be characterized by using at least two different laser configurations to apply said microwave resonators 400, wherein said at least two different configurations comprise using a first set of parameters comprising at least laser wavelength, spot size, peak power, pulse repetition frequency, pulse duration, and spot overlap distance; and a second set of parameters comprising at least laser wavelength, spot size, peak power, pulse repetition frequency, pulse duration, and spot overlap distance, wherein at least one of the parameters of the first and second set differ from each other, and; using the first set of parameters to apply the resonators 400 that are sensitive to the first polarization at the first frequency, and; using the second set of parameters to at least partly apply the resonators 400 that are sensitive to the second polarization at the second frequency by forming the regions 214 without electrically conductive material as an array of exposure sections 211 by forming said array as a DC-coupled low-pass filter with at least two exposure sections 206 of the laser beam by offsetting said at least two exposure sections to facilitate a DC-coupled passband and a high-impedance stopband at said second frequency in between said at least two exposure sections 206 for a surface current flowing in the direction of the coherent current segments of the second frequency 403'.

Some of the advantageous embodiments of the present disclosure are presented below.

In an advantageous embodiment, there is provided a conductive layer 150 comprising a microwave transformer 260 for receiving and re-emitting a microwave signal and an aggregated component for said microwave signal, wherein said conductive layer 150 being arranged to re-emit said microwave signal through said conductive layer 150 with a scaled intensity, wherein said scaled intensity being scaled by a scaling factor, characterized in that said scaling being arranged by expanding the coverage beam of said re-emitted microwave signal with said microwave transformer 260, and said microwave signal being a signal of a first frequency, said aggregated component being a signal of a second frequency, and said first and second frequencies being configurable by two inter-band carriers of a wireless communication system, and said scaling factor being less than 0.25.

And further in said conductive layer, said transformer 260 comprising a first physical area 280 delimited with a closed curve 230 on the conductive layer 150 for receiving said microwave signal from a first space angle 800 and re-emitting a ray 603 of said microwave signal to a second space angle 801, and said first physical area 280 having at least one region with electrically conductive material and at least one region 214 without electrically conductive material, wherein said at least one region 214 without electrically conductive material being connected to coupled microwave resonators 400, wherein said resonators 400 being sensitive at least to a first polarization and provided on a repeating sequence 212 as multiple replicas of a unit image 180 along a primary processing direction 701, and wherein said unit image 180 comprises a first set 401 of resonators and a second set 402 of resonators.

In an embodiment, said first set 401 of resonators forming an array of first resonant nodes 405, wherein said first resonant nodes 405 having a standing wave node within said first physical area 280, and wherein the resonators of said first set 401 being coupled by means of coherent segments of surface currents 403 in said conductive layer 150, wherein the direction of said coherent current segments 403 being arranged in a direction of a first distance 217, and said first distance 217 being arranged to separate at least two sets 215 of substantially parallel and uninterrupted paths 216 within regions without electrically conductive material, comprised by said at least one region 214 without electrically conductive material, wherein said uninterrupted paths 216 being separated by said first distance 217, and said uninterrupted paths 216 having an uninterrupted length of at least 20 times said first distance 217, wherein said uninterrupted paths 216 comprising regions of mirrored symmetry with respect to a symmetry reference of a symmetry axis, or regions of rotational symmetry with respect to a symmetry reference of a rotation point.

In an embodiment, said second set 402 of resonators forming an array of second resonant nodes 406, wherein said second resonant nodes 406 having a standing wave node within said first physical area 280, and the second set 402 of resonators being arranged to isolate the array of the second resonant nodes 406 from the array of the first resonant nodes 405 in spatial domain, frequency domain, or in polarization domain, wherein said first physical area 280 having a first dimension 305 and a second dimension 306, and a first effective area 281 for said re-emitted ray 603, wherein the first effective area 281 at the first frequency being arranged with said first set 401 of resonators, and wherein the ratio of said first effective area 281 to said first physical area 280 being arranged larger than the scaling factor by offsetting said second resonant nodes 406 and the first resonant nodes 405 in the direction of the first dimension 305 and wherein said coverage expansion being provided with an arrangement where the ratio of the first dimension 305 to the second dimension 306 being smaller than twice the scaling factor.

In an embodiment, the symmetry reference being arranged to separate the symmetrical regions of said uninterrupted paths 216 by a distance smaller than half of a wavelength at the first frequency, and the second frequency is a multiple of the first frequency.

In an embodiment, the conductive layer 150 having a second physical area 250 delimited with a closed edge curve 227 and a second effective area 251 for said re-emitted ray 603, wherein the scaling factor is the ratio of the maximal intensity of the re-emitted ray 603 and the intensity of a ray through an open aperture having a physical area equivalent to said second physical area 250 in the same direction than the re-emitted ray 603 such that the ratio of said second effective area 251 to said second physical area 250 being smaller than twice the scaling factor, and the ratio of said first physical area 280 to said second physical area 250 being smaller than 0.5, and said first effective area 281 being less than 10% smaller than said second effective area 251, and the ratio of said first effective area 281 to said first physical area 280 being at least two times as large as the ratio of said second effective area 251 to said second physical area 250.

In an alternative embodiment, the conductive layer 150 may be arranged as a spectral filter having specific characteristics at microwave frequencies, ultraviolet frequencies, visible light frequencies, and at infrared frequencies, wherein the visible light and microwave frequencies having a bandpass region, and, the infrared and ultraviolet frequencies having a bandstop region, and the ultraviolet region comprising a variable transmission/reflection regions that are arranged to be obtrusive for bird's eye.

In an arrangement, the ultraviolet reflectivity being arranged to be obtrusive at least to eyes of a hawk, eagle or a pigeon.

In an embodiment, the conductive layer 150 being comprised by an insulation glass unit 106, wherein said insulation glass unit 106 being arranged as a spectral filter for electromagnetic energy, wherein the conductive layer 150 having a second physical area 250 delimited with a closed edge curve 227, wherein the closed edge curve 227 being defined by the perimeter of the insulating glass unit 106, and said second physical area 250 having a passband region with at least one transmittance maximum at 380-800 nm wavelength region, and at least one stopband with depressed transmittance for infrared (IR) frequencies, and at least one stopband region with depressed transmittance for ultraviolet (UV) frequencies, and bandpass regions at the first and second frequencies, said bandpass regions being arranged through said transformer 260, and bandstop regions at the first and second frequencies, said bandstop regions being arranged in regions outside said first physical area 280, wherein said at least one stopband region with depressed transmittance for ultraviolet (UV) frequencies being arranged as areas of non-uniform reflectivity of ultraviolet frequencies between 300-400 nm wavelength region.

In an embodiment, said conductive layer 150 being arranged as a spectral filter for electromagnetic energy, wherein said conductive layer 150 comprising a passband region with at least one transmittance maximum at 380-800 nm wavelength region, and at least one stopband with depressed transmittance for infrared (IR) frequencies, and at least one region with depressed transmittance for ultraviolet (UV) frequencies, wherein said at least one region with depressed transmittance for ultraviolet (UV) frequencies comprising areas of non-uniform reflectivity of ultraviolet frequencies between 300-400 nm wavelength region.

In a retrofitting device, in accordance with an embodiment, there is provided a retrofitting device to fabricate the microwave transformer 260.

The retrofitting device of the present disclosure comprises a laser apparatus 200, and a linear rail or a motorized arm being configured to fabricate the transformer 260 with an arrangement where the primary processing direction 701 is aimed in a vertical direction along the surface of a substrate 151 comprising said conductive layer 150.

In an embodiment, the retrofitting device is a portable device.

In an embodiment, the retrofitting device is a mobile device.

In an embodiment, the retrofitting device comprises means to attach the laser apparatus 200 with a mechanical connection with a glass pane 100 comprising the conductive layer 150.

In an embodiment, the retrofitting device comprises suction caps arranged to stabilize the position and orientation of the device.

In an embodiment, said device further comprises means to fine-tune the distance and orientation of the laser apparatus 200 to the surface of the glass pane 100.

In an embodiment, the device comprises means for detecting the distance and orientation of the laser apparatus 200 with respect to the glass pane 100 with an area 220.

In an embodiment, said area 220 being arranged as a projection on the surface of the glass pane 100, wherein the glass pane forms a substrate 151.

In an embodiment, said area 220 being arranged in a plane that is perpendicular to the surface of the glass pane 100, wherein the glass pane forms a substrate 151, wherein said area being formed with at least three lines 222, wherein said lines 222 being formed with at least three points 221.

In an arrangement, a laser emitter being arranged as a first point 221, and a laser detector being arranged as a second point 221, and a reflection point on the surface of the glass pane 100 being arranged as the third point.

In an arrangement, the laser detector being arranged to translate the reflection from the third point into distance and alignment information of the laser apparatus 200 with respect to the glass pane 100.

In an advantageous embodiment, there is provided a conductive layer 150 comprising a microwave transformer 260 for scaling the intensity of a microwave signal of a first frequency by a scaling factor, said transformer 260 comprising a first physical area 280 delimited with a closed curve 230 on the conductive layer 150 for receiving said microwave signal from a first space angle 800 and re-emitting a ray 603 of said microwave signal to a second space angle 801, said first physical area 280 having at least one region with electrically conductive material and at least one region 214 without electrically conductive material, and said first physical area 280 having a first effective area 281 for said re-emitted ray 603, wherein the ratio of said first effective area 281 to said first physical area 280 being larger than the scaling factor, and further wherein the conductive layer 150 having a second physical area 250 delimited with a closed edge curve 227 and a second effective area 251 for said re-emitted ray 603, wherein the ratio of said second effective area 251 to said second physical area 250 being smaller than twice the scaling factor, and the ratio of said first physical area 280 to said second physical area 250 being smaller than 0.5, wherein the scaling factor is the ratio of the maximal intensity of the re-emitted ray 603 and the intensity of a ray through an open aperture having a physical area equivalent to said second physical area 250 in the same direction than the re-emitted ray 603.

In an embodiment, the ratio of said first effective area 281 to said first physical area 280 being at least two times as large as the ratio of said second effective area 251 to said second physical area 250.

In an embodiment, said scaling factor being less than 0.25.

In an embodiment, said first effective area 281 being less than 10% smaller than said second effective area 251.

In an embodiment, said first physical area 280 having a first dimension 305 and a second dimension 306, wherein said microwave transformer 260 being arranged to expand the coverage area where the bistatic radar cross section (RCS) is less than 3 dB smaller than the peak RCS of the re-emitted ray 603, wherein said coverage area being expanded by a factor of at least two with respect to the 3 dB RCS coverage area of an equivalent physical area that is equal to the physical area of said conductive layer 250 but wherein said conductive layer 250 is absent, wherein said coverage expansion being provided with an arrangement where the ratio of the first dimension 305 to the second dimension 306 being smaller than twice the scaling factor.

In an embodiment, said conductive layer 150 being arranged on a substrate 151, and said first physical area 280 having a first dimension 305 and a second dimension 306, wherein said first effective area 281 being arranged to be at least twice as large as an equivalent square area of the substrate 151 wherein the conductive layer 150 on the equivalent square area is absent, and wherein both the width and height of the equivalent square area being equal to the first dimension 305.

In an embodiment, said at least one region 214 without electrically conductive material comprises coupled microwave resonators 400 on a repeating sequence 212, wherein said repeating sequence 212 being provided with multiple replicas of a unit image 180 along a primary processing direction 701, wherein said coupled microwave resonators 400 being sensitive at least to a first polarization, and said coupled microwave resonators 400 being connected to said at least one region 214 without electrically conductive material, wherein said at least one region 214 comprise at least two sets 215 of substantially parallel and uninterrupted paths 216 within regions without electrically conductive material, wherein said uninterrupted paths 216 being separated by a first distance 217, and said uninterrupted paths 216 having an uninterrupted length of at least 20 times said first distance 217, and wherein said coupled microwave resonators 400 being coupled by means of coherent segments of surface currents 403 in said conductive layer 150, and said first distance 217 being arranged in the direction of said coherent segments of surface currents 403.

In an embodiment, said at least one region 214 without electrically conductive material comprises uninterrupted paths 216 within regions without electrically conductive material on a repeating sequence 212, wherein said uninterrupted paths 216 being separated at least by a first distance 217, and said uninterrupted paths 216 having an uninterrupted length of at least 20 times said first distance 217 and a width 219 of at least 10 times smaller than said first distance 217, and said uninterrupted paths 216 being arranged to form at least a first row of parallel radiating electric field sources at said first frequency range for scaling the intensity of said microwave signal by said scaling factor.

In an embodiment, said uninterrupted paths 216 comprising regions of mirrored symmetry with respect to a symmetry reference of a symmetry axis, or regions of rotational symmetry with respect to a symmetry reference of a rotation point, wherein the symmetry reference being arranged to separate the symmetrical regions of said uninterrupted paths 216 by a distance smaller than half of a wavelength at the first frequency.

In an embodiment, said conductive layer 150 being arranged as a primary conductive layer 150' adjacent to a secondary conductive layer 150", wherein the repeating sequence 212 of the primary conductive layer 150' is smaller than the separation 101 between the primary conductive layer 150' and the secondary conductive layer 150".

In an embodiment, said conductive layer 150 being arranged as a primary conductive layer 150' adjacent to a secondary conductive layer 150", wherein the first distance 217 of the primary conductive layer 150' is smaller than the separation 101 between the primary conductive layer 150' and the secondary conductive layer 150".

In an embodiment, said conductive layer 150 being part of a wall, a door, a window, a housing container, a train, a ship, a vehicle, an elevator shaft, a shipping container, an electrical cabinet, or a safety locker.

In an embodiment, the ratio of said first effective area 281 to said first physical area 280 being at least 0.5.

In accordance with an embodiment, there is provided a method for fabricating a conductive layer 150 comprising a microwave transformer 260 for scaling the intensity of a microwave signal of a first frequency by a scaling factor, wherein the method comprises: providing a substrate 151 with a conductive layer 150; forming said transformer 260 by forming a first physical area 280 delimited with a closed curve 230 on the conductive layer 150 for receiving said microwave signal from a first space angle 800 and re-emitting a ray 603 of said microwave signal to a second space angle 801, and forming said first physical area 280 to have at least one region with electrically conductive material and at least one region 214 without electrically conductive material, and forming said first physical area 280 to have a first effective area 281 for said re-emitted ray 603, by arranging the ratio of said first effective area 281 to said first physical area 280 being larger than the scaling factor, and arranging the conductive layer 150 to have a second physical area 250 delimited with a closed edge curve 227 and a second effective area 251 for said re-emitted ray 603, by arranging the ratio of said second effective area 251 to said second physical area 250 being smaller than twice the scaling factor, wherein the scaling factor is the ratio of the maximal intensity of the re-emitted ray 603 and the intensity of a ray through an open aperture having a physical area equivalent to said second physical area 250 in the same direction than the re-emitted ray 603.

There is provided a method for fabricating a conductive layer 150 comprising a microwave transformer 260) for receiving and re-emitting a microwave signal of a first frequency and first polarization and a microwave signal of a second frequency and second polarization, wherein said conductive layer 150 being arranged to re-emit said microwave signal of the first frequency through said conductive layer 150 with a scaled intensity, wherein said scaled intensity being scaled by a scaling factor, characterized in providing a substrate 151 with a conductive layer 150; forming said transformer 260 by forming a first physical area 280 delimited with a closed curve 230 on the conductive layer 150, said first physical area 280 having a first 305 and a second 306 dimension, for receiving said microwave signal of the first frequency from a first space angle 800 and re-emitting a ray 603 of said microwave signal to a second space angle 801, and forming said first physical area 280 to have at least one region with electrically conductive material and at least one region 214 without electrically conductive material, and arranging said scaling factor to less than 0.25 by arranging said transformer (260) for scaling the intensity of the microwave signal of the first frequency.

Further in said method, scaling the intensity of the microwave signal of the first frequency by means of bistatic scattering of the microwave signal through said first physical area 280 by: increasing the maximal bistatic radar cross section of the microwave signal through said conductive layer 150 by arranging said at least one region with electrically conductive material and said at least one region 214 without electrically conductive material as microwave resonators 400, and delimiting the maximal bistatic RCS of said ray 603 through said conductive layer 150 at the first frequency to a value that is at least 6 dB below an equivalent peak bistatic radar cross section through an equivalent area of said substrate 151 that corresponds to the second physical area 250, and wherein the conductive layer 150 of the equivalent area is absent.

And further in said method, arranging the conductive layer 150 to have a second physical area 250 delimited with a closed edge curve 227 and a second effective area 251 for said re-emitted ray 603, by arranging the ratio of said second effective area 251 to said second physical area 250 being smaller than twice the scaling factor, and arranging the ratio of said first effective area 281 to said first physical area 280 to be at least two times as large as the ratio of said second effective area 251 to said second physical area 250, and forming said first physical area 280 to have a first effective area 281 for said re-emitted ray 603, by arranging the ratio of said first effective area 281 to said first physical area 280 being larger than the scaling factor, and arranging the ratio of said first physical area 280 to said second physical area 250 to be smaller than 0.5.

And further, providing the increase in RCS and delimitation of RCS by: using a laser apparatus 200 to apply said microwave resonators 400 as a repeating sequence of a unit image 150 and arranging said resonators 400 to be sensitive at least to the first polarization and said resonators 400 being coupled by means of coherent segments of surface currents 403 in said conductive layer 150, and separating said resonators 400 by a first distance 217 and arranging said distance 217 in the direction of said coherent segments of surface currents 403, and arranging said first effective area 281 for the first frequency with a first set of resonators 401 forming an array of the first resonant nodes 405, wherein said first resonant nodes 405 having a standing wave node in the first physical area 280 and being coupled by coherent current segments 403 of the first frequency, and arranging a second set 402 of resonators forming an array of the second resonant nodes 406 in said first physical area 280 wherein said second resonant nodes (406) being coupled by coherent current segments 403' of the second frequency, and offsetting the nodes forming the coherent current segments of the first frequency 403 from the nodes forming the coherent current segments of the second frequency 403' in a direction that deflects the direction of coherent current segments of the first frequency 403 with an arrangement where said first 405 and second 406 resonant nodes being comprised by the same unit image 180, wherein the scaling factor is the ratio of the maximal intensity of the re-emitted ray 603 through the conductive layer 150 having an outer boundary defined by the second physical area 250 and the intensity of a ray through an open aperture having a physical area equivalent to said second physical area 250 in the same direction than the re-emitted ray 603.

In another advantageous embodiment, the method being characterized in arranging the ratio of said first physical area 280 to said second physical area 250 to be smaller than 0.5, and arranging the ratio of said first effective area 281 to said first physical area 280 to be at least two times as large as the ratio of said second effective area 251 to said second physical area 250.

In an embodiment, the method being characterized in arranging said scaling factor to less than 0.25, and arranging said first effective area 281 to be less than 10% smaller than said second effective area 251.

In an embodiment, the method being characterized in arranging said first physical area 280 to have a first dimension 305 and a second dimension 306, and arranging said first effective area 281 to be at least twice as large as an equivalent square area of the substrate 151 wherein the conductive layer 150 on the equivalent square area is absent.

In an embodiment, the method being characterized in arranging said transformer 260 for scaling the intensity of the microwave signal of the first frequency by means of bistatic scattering of the microwave signal through said first physical area 280 by increasing the maximal bistatic radar cross section of the microwave signal through said conductive layer 150 by arranging said at least one region with electrically conductive material and said at least one region 214 without electrically conductive material as microwave resonators 400, and delimiting the maximal bistatic RCS of said ray 603 through said conductive layer 150 at the first frequency to a value that is at least 6 dB below an equivalent peak bistatic radar cross section through an equivalent area of said substrate 151 that corresponds to the second physical area 250, and wherein the conductive layer 150 of the equivalent area is absent.

In an embodiment, the maximal bistatic radar cross section of said ray 603 at the first frequency being delimited to a value that is at least 6 dB below an equivalent peak bistatic radar cross section through an equivalent area of a substrate 151 that corresponds to a second physical area 250, wherein said substrate 151 being a glass pane 100, and the perimeter of the glass pane 100 forming a closed edge curve 227 that delimits the second physical area 250, and the maximal bistatic radar cross section of the aggregated component at the second frequency being arranged to exceed the maximal bistatic radar cross section of the microwave signal of the first frequency in the direction of said ray 603 with an arrangement where the number of the resonators 400 in the second set of resonators 402 being arranged to exceed the number of resonators 400 in the first set of resonators 401 within the first physical area 280, and the number of the standing wave nodes of the array of said second resonant nodes 402 in said first physical area 280 being multiple compared to the number of the standing wave nodes of the array of said first resonant nodes 401 within said first physical area 280, and said resonant nodes 402 being arranged to offset said first resonant nodes 401.

In an embodiment, the method being characterized in forming said at least one region 214 without electrically conductive material of said first physical area 280 by applying coupled microwave resonators 400 on the conductive layer 150 along a primary processing direction 701 by using a laser apparatus 200, and applying said microwave resonators 400 using a repeating sequence 212 to apply multiple replicas of a unit image 180 along said primary processing direction 701, and arranging said coupled microwave resonators 400 being sensitive at least to a first polarization, and arranging said coupled microwave resonators 400 to be connected to at least one region 214 without electrically conductive material, wherein said at least one region 214 comprise at least two sets 215 of substantially parallel and uninterrupted paths 216 within regions without electrically conductive material, wherein said uninterrupted paths 216 being separated by a first distance 217, and said uninterrupted paths 216 having an uninterrupted length of at least 20 times said first distance 217, and wherein said coupled microwave resonators 400 being coupled by means of coherent segments of surface currents 403 in said conductive layer 150, and said first distance 217 being arranged in the direction of said coherent segments of surface currents 403.

In an embodiment, the method being characterized in providing said substrate 151 with said conductive layer 150 as a part of an insulation glass unit 106, and forming said transformer 260 on the conductive layer 150 using retrofitting means.

In an embodiment, the method being characterized in providing said substrate 151 with said conductive layer 150 in form of a glass pane 100, wherein said conductive layer 150 being a coating layer on said glass pane 100, and wherein said method comprises at least process steps of cutting glass panes 100 out of jumbo glasses 108, wherein at least one of said glass panes 100 being provided with said conductive layer 150, and assembling said glass panes 100 into insulation glass units 106.

In an embodiment, the method being characterized in providing said substrate 151 with said conductive layer 150 in form of a glass pane 100, and forming said at least one region 214 without electrically conductive material by decaying the electrical conductivity of the conductive layer 150 inside said region 214 by increasing the sheet resistance of the conductive layer 150 at least by a factor of 100 using a laser apparatus 200.

In an embodiment, the method being characterized in increasing the electrical conductivity of the conductive layer 150 around said at least one region 214 without electrically conductive material using a laser apparatus 200.

In an embodiment, the method being characterized in forming a line 209 of reduced impedance on the conductive layer 150 and arranging said line 209 to be connected with at least one of said microwave resonators 400, wherein forming said line 209 of reduced impedance comprises at least forming a positive line having a line width and forming a gap to separate a negative line from the positive line, and arranging said line 209 of reduced impedance to have a characteristic impedance less than 50Ω.

In an embodiment, the method being characterized in increasing the electrical conductivity of the line 209 using a laser apparatus 200.

In accordance with an embodiment, there is provided a system 900 for fabricating a conductive layer 150 comprising a microwave transformer 260 for scaling the intensity of a microwave signal of a first frequency by a scaling factor, wherein the system comprises means for forming said transformer 260 comprising a first physical area 280 delimited with a closed curve 230 on the conductive layer 150 for receiving said microwave signal from a first space angle 800 and re-emitting a ray 603) of said microwave signal to a second space angle 801, and means for forming said first physical area 280 with at least one region with electrically conductive material and at least one region 214 without electrically conductive material, and means for forming said first physical area 280 with a first effective area 281 for said re-emitted ray 603, wherein the ratio of said first effective area 281 to said first physical area 280 being larger than the scaling factor, and means for arranging the conductive layer 150 with a second physical area 250 delimited with a closed edge curve 227 and a second effective area 251 for said re-emitted ray 603, wherein the ratio of said second effective area 251 to said second physical area 250 being smaller than twice the scaling factor, and means for arranging the ratio of said first physical area 280 to said second physical area 250 being smaller than twice the scaling factor, and means for arranging the ratio of said first effective area 281 to said first physical area 280 being at least two times as large as the ratio of said second effective area 251 to said second physical area 250; wherein the scaling factor is the ratio of the maximal intensity of the re-emitted ray 603 and the intensity of a ray through an open aperture having a physical area equivalent to said second physical area 250 in the same direction than the re-emitted ray 603.

In an embodiment, the system 900 comprises means for providing said conductive layer 150 or a substrate 151 comprising said conductive layer 150 with any of added metal pads, laminated circuit boards, printed electronics components, printed conductors, printed insulation layers, printed diodes, printed transistors, or printed solar cells to be connected with said microwave transformer 260.

In an embodiment, said first physical area 280 having a first effective area 281 for said re-emitted ray 603, wherein the ratio of said first effective area 281 to said first physical area 280 being larger than the scaling factor.

In an embodiment, said first physical area 280 having a first effective area 281 for said re-emitted ray 603, wherein the ratio of said first effective area 281 to said first physical area 280 being larger than twice the scaling factor.

In an alternative embodiment, the conductive layer 150 of the present disclosure comprises a rotational translation of mutually coupled microwave resonators 400 to transform a linear polarization into rotational polarization by means of said rotationally translated resonators 400, wherein said resonators 400 being arranged to resonate at the first frequency range.

In an alternative embodiment, the first physical area 280 comprising said rotationally translated resonators 400 comprising at least one section that has a form of an arc.

In an alternative embodiment, the first physical area 280 comprising said rotationally translated resonators 400 being arranged to exhibit a circular perimeter.

In an alternative embodiment, the first physical area 280 comprising said rotationally translated resonators 400 being arranged to exhibit a sector having an arc-shaped perimeter.

The invention claimed is:

1. A conductive layer comprising a microwave transformer for receiving and re-emitting a microwave signal and an aggregated component for said microwave signal, wherein said conductive layer being configured to re-emit said microwave signal through said conductive layer with a scaled intensity, wherein said scaled intensity being scaled by a scaling factor, wherein:
   said scaling being arranged by expanding the coverage beam of said re-emitted microwave signal with said microwave transformer, and
   said microwave signal being a signal of a first frequency, said aggregated component being a signal of a second frequency, and said first and second frequencies being configurable by two inter-band carriers of a wireless communication system, said scaling factor being less than 0.25, and
   said transformer comprising a first physical area delimited with a closed curve on the conductive layer for receiving said microwave signal from a first space angle and re-emitting a ray of said microwave signal to a second space angle, and said first physical area having at least one region with electrically conductive material and at least one region without electrically conductive material, wherein said at least one region without electrically conductive material being connected to coupled microwave resonators, wherein said resonators being sensitive at least to a first polarization and provided on a repeating sequence as multiple replicas of a unit image along a primary processing direction, and wherein said unit image comprises
   1. a first set of resonators forming an array of first resonant nodes, wherein said first resonant nodes having a standing wave node within said first physical area, and wherein the resonators of said first set being coupled by coherent segments of surface currents in said conductive layer, wherein the direction of said coherent current segments being arranged in a direction of a first distance, and said first distance being configured to separate at least two sets of substantially parallel and uninterrupted paths within regions without electrically conductive material, comprised by said at least one region without electrically conductive material, wherein said uninterrupted paths being separated by said first distance, and said uninterrupted paths having an uninterrupted length of at least 20 times said first distance, wherein said uninterrupted paths comprising regions of mirrored symmetry with respect to a symmetry reference of a symmetry axis, or regions of rotational symmetry with respect to a symmetry reference of a rotation point, and 2. a second set of resonators forming an array of second resonant nodes, wherein said second resonant nodes having a standing wave node within said first physical area, and the second set of resonators being configured to isolate the array of the second resonant nodes from the array of the first resonant nodes in spatial domain, frequency domain, or in polarization domain;

wherein said first physical area has a first dimension and a second dimension, and a first effective area for said re-emitted ray, wherein the first effective area at the first frequency being arranged with said first set of resonators, and wherein the ratio of said first effective area to said first physical area being arranged larger than the scaling factor by offsetting said second resonant nodes and the first resonant nodes in the direction of the first dimension and wherein said coverage expansion being provided with an arrangement where the ratio of the first dimension to the second dimension being smaller than twice the scaling factor.

2. The conductive layer according to claim 1, wherein said resonators being arranged at least from their one side with an array of exposure sections, where said array of exposure sections being arranged as a DC-coupled low-pass filter, wherein said filter being arranged with at least two exposure sections of the laser beam, wherein said at least two exposure sections comprise regions without electrically conductive material and a filtering impedance between said at least two exposure sections, wherein said filtering impedance being arranged by an offset of said at least two exposure sections to facilitate a DC-coupled passband in between said at least two exposure sections, and a stopband comprising said first frequency of the microwave signal, wherein said stopband being arranged with a high-impedance section formed between said at least two exposure sections, wherein said DC-coupled low-pass filter being arranged for surface currents flowing in the direction of said coherent segments of surface currents.

3. The conductive layer according to claim 1, wherein the conductive layer has a second physical area delimited with a closed edge curve and a second effective area for said re-emitted ray, wherein the scaling factor is the ratio of the maximal intensity of the re-emitted ray and the intensity of a ray through an open aperture having a physical area equivalent to said second physical area in the same direction than the re-emitted ray such that:

the ratio of said second effective area to said second physical area being smaller than twice the scaling factor, and the ratio of said first physical area to said second physical area being smaller than 0.5, and said first effective area being less than 10% smaller than said second effective area, and the ratio of said first effective area to said first physical area being at least two times as large as the ratio of said second effective area to said second physical area.

4. The conductive layer according to claim 3, wherein said first physical area having a first dimension and a second dimension, wherein said microwave transformer being configured to expand the coverage area where the bistatic radar cross section is less than 3 dB smaller than the peak RCS of the re-emitted ray, wherein said coverage area being expanded by a factor of at least two with respect to the 3 dB RCS coverage area of an equivalent physical area that is equal to the physical area of said conductive layer but wherein said conductive layer is absent, wherein said coverage expansion being provided with an arrangement where the ratio of the first dimension to the second dimension being smaller than twice the scaling factor.

5. The conductive layer according to claim 1, wherein said first physical area having a first dimension and a second dimension, wherein said microwave transformer being configured to expand the coverage area where the bistatic radar cross section is less than 3 dB smaller than the peak RCS of the re-emitted ray, wherein said coverage area being expanded by a factor of at least two with respect to the 3 dB RCS coverage area of an equivalent physical area that is equal to the physical area of said conductive layer but wherein said conductive layer is absent, wherein said coverage expansion being provided with an arrangement where the ratio of the first dimension to the second dimension being smaller than twice the scaling factor.

6. The conductive layer according to claim 1, wherein said conductive layer is arranged on a substrate, wherein said first effective area being arranged to be at least twice as large as an equivalent square area of the substrate wherein the conductive layer on the equivalent square area is absent, and wherein both the width and height of the equivalent square area being equal to the first dimension.

7. The conductive layer according to claim 1, wherein a third resonant node is arranged within said at least one region without electrically conductive material, and wherein said third resonant node being configured to offset either the first resonant node or the second resonant node in the direction of the first dimension, and wherein said first, second, and third resonant nodes being comprised by the same unit image.

8. The conductive layer according to claim 1, wherein said conductive layer is arranged as a primary conductive layer adjacent to a secondary conductive layer according to claim 1, wherein the repeating sequence of the primary conductive layer is smaller than the separation between the primary conductive layer and the secondary conductive layer.

9. The conductive layer according to claim 1, wherein said conductive layer is arranged as a primary conductive layer adjacent to a secondary conductive layer according to claim 1, wherein the first distance of the primary conductive layer is smaller than the separation between the primary conductive layer and the secondary conductive layer.

10. The conductive layer according to claim 1, wherein said conductive layer is a part of a wall, a door, a window, a housing container, a train, a ship, a vehicle, an elevator shaft, a shipping container, an electrical cabinet, or a safety locker.

11. The conductive layer according to claim 1, wherein the ratio of said first effective area to said first physical area being at least 0.5.

12. The conductive layer according claim 1, wherein the conductive layer is comprised by an insulation glass unit, wherein said insulation glass unit being arranged as a spectral filter for electromagnetic energy, wherein the conductive layer having a second physical area delimited with a closed edge curve, wherein the closed edge curve being defined by the perimeter of the insulating glass unit, and said second physical area having:
- a passband region with at least one transmittance maximum at 380-800 nm wavelength region, and at least one stopband with depressed transmittance for infrared (IR) frequencies, and at least one stopband region with depressed transmittance for ultraviolet (UV) frequencies, and
- bandpass regions at the first and second frequencies, said bandpass regions being arranged through said transformer, and
- bandstop regions at the first and second frequencies, said bandstop regions being arranged in regions outside said first physical area,
- wherein said at least one stopband region with depressed transmittance for ultraviolet (UV) frequencies being arranged as areas of non-uniform reflectivity of ultraviolet frequencies between 300-400 nm wavelength region.

13. The conductive layer according claim 1, wherein the maximal bistatic radar cross section of said ray at the first frequency being delimited to a value that is at least 6 dB below an equivalent peak bistatic radar cross section through an equivalent area of a substrate that corresponds to a second physical area, wherein
- said substrate being a glass pane, and the perimeter of the glass pane forming a closed edge curve that delimits the second physical area, and
- the maximal bistatic radar cross section of the aggregated component at the second frequency being configured to exceed the maximal bistatic radar cross section of the microwave signal of the first frequency in the direction of said ray with an arrangement where
  1. the number of the resonators in the second set of resonators being configured to exceed the number of resonators in the first set of resonators within the first physical area, and
  2. the number of the standing wave nodes of the array of said second resonant nodes in said first physical area being multiple compared to the number of the standing wave nodes of the array of said first resonant nodes within said first physical area, and
  3. said resonant nodes being configured to offset said first resonant nodes.

14. A method for fabricating a conductive layer comprising a microwave transformer for receiving and re-emitting a microwave signal of a first frequency and first polarization and a microwave signal of a second frequency and second polarization, wherein said conductive layer being configured to re-emit said microwave signal of the first frequency through said conductive layer with a scaled intensity, wherein said scaled intensity being scaled by a scaling factor, the method comprising:
- providing a substrate with a conductive layer;
- forming said transformer by forming a first physical area delimited with a closed curve on the conductive layer, said first physical area having a first and a second dimension, for receiving said microwave signal of the first frequency from a first space angle and re-emitting a ray of said microwave signal to a second space angle, and
- forming said first physical area to have at least one region with electrically conductive material and at least one region without electrically conductive material, and
- arranging said scaling factor to less than 0.25 by arranging said transformer for scaling the intensity of the microwave signal of the first frequency by bistatic scattering of the microwave signal through said first physical area by:
  1. increasing the maximal bistatic radar cross section of the microwave signal through said conductive layer by arranging said at least one region with electrically conductive material and said at least one region without electrically conductive material as microwave resonators, and
  2. delimiting the maximal bistatic RCS of said ray through said conductive layer at the first frequency to a value that is at least 6 dB below an equivalent peak bistatic radar cross section through an equivalent area of said substrate that corresponds to the second physical area, and wherein the conductive layer of the equivalent area is absent by
     i. arranging the conductive layer to have a second physical area delimited with a closed edge curve and a second effective area for said re-emitted ray, by arranging the ratio of said second effective area to said second physical area being smaller than twice the scaling factor, and
     ii. forming said first physical area to have a first effective area for said re-emitted ray, by arranging the ratio of said first effective area to said first physical area being larger than the scaling factor, and
     iii. arranging the ratio of said first effective area to said first physical area to be at least two times as large as the ratio of said second effective area to said second physical area, and
     iv. arranging the ratio of said first physical area to said second physical area to be smaller than 0.5;
  3. providing the increase in RCS as of step 1 and delimitation of RCS as of step 2 by:
     v. using a laser apparatus to apply said microwave resonators as a repeating sequence of a unit image and arranging said resonators to be sensitive at least to the first polarization and said resonators being coupled by coherent segments of surface currents in said conductive layer, and
     vi. separating said resonators by a first distance and arranging said distance in the direction of said coherent segments of surface currents, and
     vii. arranging said first effective area for the first frequency with a first set of resonators forming an array of the first resonant nodes, wherein said first resonant nodes having a standing wave node in the first physical area and being coupled by coherent current segments of the first frequency, and
     viii. arranging a second set of resonators forming an array of the second resonant nodes in said first physical area wherein said second resonant nodes being coupled by coherent current segments (403') of the second frequency, and
     ix. offsetting the nodes forming the coherent current segments of the first frequency from the nodes forming the coherent current segments of the second frequency (403') in a direction that deflects the direction of coherent current segments of the first frequency with an arrangement where said first and second resonant nodes being comprised by the same unit image, wherein the scaling factor is the ratio of the maximal intensity of the re-emitted ray through the conductive layer having an outer boundary defined by the second physical area and the intensity of a ray through an open aperture having a physical area equivalent to said second physical area in the same direction than the re-emitted ray.

15. The method according to claim 14, further comprising arranging said scaling factor to less than 0.25, and arranging said first effective area to be less than 10% smaller than said second effective area by arranging said first effective area to be at least twice as large as an equivalent square area of the substrate wherein the conductive layer on the equivalent square area is absent.

16. The method according to claim 14, further comprising using at least two different laser configurations to apply said microwave resonators, wherein said at least two different configurations comprise using a first set of parameters comprising at least laser wavelength, spot size, peak power, pulse repetition frequency, pulse duration, and spot overlap distance; and a second set of parameters comprising at least laser wavelength, spot size, peak power, pulse repetition frequency, pulse duration, and spot overlap distance, wherein at least one of the parameters of the first and second set differ from each other, and;

using the first set of parameters to apply the resonators that are sensitive to the first polarization at the first frequency, and;

using the second set of parameters to at least partly apply the resonators that are sensitive to the second polarization at the second frequency by forming the regions without electrically conductive material as an array of exposure sections by forming said array as a DC-coupled low-pass filter with at least two exposure sections of the laser beam by offsetting said at least two exposure sections to facilitate a DC-coupled passband and a high-impedance stopband at said second frequency in between said at least two exposure sections for a surface current flowing in the direction of the coherent current segments of the second frequency.

17. The method according to claim 14, further comprising forming said at least one region without electrically conductive material of said first physical area by applying coupled microwave resonators on the conductive layer along a primary processing direction by using a laser apparatus, wherein said method comprises at least steps of:
1. providing a plurality of scanning regions on said conductive layer by using at least two scanners, and providing a laser beam for each of said plurality of scanning regions, and intersecting each of said laser beams with the surface of said conductive layer;
2. deflecting at least one of said laser beams in a direction that is crossing the direction of said primary processing direction; and
3. synchronizing the deflection of said laser beams within said plurality of scanning regions with respect to a configurable coordinate axis on the surface of said conductive layer by using a timer, motion sensor, image detection, or speed sensor.

18. The method according to claim 14, further comprising in forming said at least one region without electrically conductive material of said first physical area by applying coupled microwave resonators on the conductive layer along a primary processing direction by using a laser apparatus, by providing a laser beam within the scanning region of the laser apparatus, and a beam projection to be positioned on the conductive layer by intersecting said laser beam 201 with said conductive layer, and arranging said primary processing direction along an axis on the surface of said conductive layer, deviating the position of said scanning region along the surface of said conductive layer at least partly on the direction of said primary processing direction by moving the conductive layer to a direction that opposes said primary processing direction and/or by moving said scanning region of the laser apparatus along said primary processing direction, and providing a pre-defined trace for controlling the movement of said beam projection along a projection path and, using said pre-defined trace to define N exposure sections along said projection path by using said exposure sections to define segments of said projection path where laser energy exceeding a threshold value is being concentrated on said beam projection, and using integer 1 or larger for N, and further using said projection path to produce a first set of mutually coupled microwave resonators by forming said at least two sets of substantially parallel and uninterrupted paths within regions without electrically conductive material, and forming said exposure sections by repeatedly deflecting said beam projection along said projection path in a direction that is crossing said primary processing direction by a distance of less than a pre-determined deflection, and arranging said first distance to less than lambda/20 from each other to provide mutual electromagnetic coupling between said at least two sets of substantially parallel and uninterrupted paths, wherein lambda equals the free space wavelength of the corresponding resonance frequency of a coupled microwave resonator of said first set of mutually coupled microwave resonators, wherein said threshold value for the laser energy being configured to sublimate a region of the conductive layer from the location of the beam projection, and said pre-determined deflection being smaller than the first dimension of the first physical area.

19. A system for fabricating a conductive layer comprising a microwave transformer for scaling the intensity of a microwave signal of a first frequency by a scaling factor, wherein the system is configured to:
form, by a laser apparatus, said transformer comprising a first physical area delimited with a closed curve on the conductive layer for receiving said microwave signal from a first space angle and re-emitting a ray of said microwave signal to a second space angle, said laser apparatus being connected to an actuator, and form said first physical area with at least one region with electrically conductive material and at least one region without electrically conductive material, and form said first physical area with a first effective area for said re-emitted ray, wherein the ratio of said first effective area to said first physical area is larger than the scaling factor, and arrange the conductive layer with a second physical area delimited with a closed edge curve and a second effective area for said re-emitted ray, wherein the ratio of said second effective area to said second physical area being smaller than twice the scaling factor, and arrange the ratio of said first physical area to said second physical area being smaller than twice the scaling factor, and arrange the ratio of said first effective area to said first physical area to at least two times as large as the ratio of said second effective area to said second physical area;

produce insulation glass units with an arrangement for cutting glass panes out of jumbo glasses, where said glass panes being configured to be assembled into said insulation glass units, and identify the glass panes for forming transformers, and a dedicated process flow for translating said identified glass panes into said insulation glass units with applied microwave resonators in a repeating process, and form said transformers on said identified glass panes during the execution of said dedicated process flow with an application of microwave resonators, and quality test of the applied resonators by at least
1. a device transmitting diagnostics signals at the frequencies of at least two inter-band carrier bands of a wireless communication system, and
2. an arrangement to illuminate the applied microwave signals with said diagnostics signals, and to receive the diagnostics signals after said diagnostics signals being interacted with the applied resonators, and
3. procedure to compare the fingerprints of the applied resonators on the diagnostics signals to known reference values, wherein the fingerprints being defined by the magnitude and/or phase values of the diagnostics signals, wherein the scaling factor is the ratio of the maximal intensity of the re-emitted ray and the intensity of a ray through an open aperture having a physical area equivalent to said second physical area in the same direction than the re-emitted ray, and said scaling factor being less than 0.25.

20. The system according to claim 19, wherein the system is further configured to provide said conductive layer or a substrate comprising said conductive layer with any of added metal pads, laminated circuit boards, printed electronics components, printed conductors, printed insulation layers, printed diodes, printed transistors, or printed solar cells to be connected with said microwave transformer.

* * * * *